United States Patent
Bae et al.

(10) Patent No.: US 11,868,741 B2
(45) Date of Patent: Jan. 9, 2024

(54) PROCESSING ELEMENT, NEURAL PROCESSING DEVICE INCLUDING SAME, AND MULTIPLICATION OPERATION METHOD USING SAME

(71) Applicant: Rebellions Inc., Seongnam-si (KR)

(72) Inventors: Jaewan Bae, Seongnam-si (KR); Jinwook Oh, Seongnam-si (KR); Karim Charfi, Seongnam-si (KR)

(73) Assignee: Rebellions Inc., Seongnam-si (KR)

( * ) Notice: Subject to any disclaimer, the term of this patent is extended or adjusted under 35 U.S.C. 154(b) by 0 days.

(21) Appl. No.: 17/807,082

(22) Filed: Jun. 15, 2022

(65) Prior Publication Data
US 2022/0405560 A1 Dec. 22, 2022

(30) Foreign Application Priority Data
Jun. 17, 2021 (KR) .................. 10-2021-0078867
May 30, 2022 (KR) .................. 10-2022-0066221

(51) Int. Cl.
*G06F 7/533* (2006.01)
*G06N 3/063* (2023.01)
(Continued)

(52) U.S. Cl.
CPC ............... *G06F 7/533* (2013.01); *G06F 7/50* (2013.01); *G06F 7/535* (2013.01); *G06F 7/5443* (2013.01); *G06N 3/063* (2013.01)

(58) Field of Classification Search
CPC ............ G06F 7/533; G06F 7/44–446; G06F 7/462–467; G06F 7/487; G06F 7/4876;
(Continued)

(56) References Cited

U.S. PATENT DOCUMENTS 7,028,068 B1 * 4/2006 Goveas ............... G06F 9/30036
712/E9.071
10,963,220 B2 * 3/2021 Ovsiannikov ......... G06F 9/3001
(Continued)

FOREIGN PATENT DOCUMENTS

WO   WO-9714090 A1 * 4/1997 ........... G06F 7/5324

OTHER PUBLICATIONS

S. Kuang and J. Wang, "Design of Power-Efficient Configurable Booth Multiplier," in IEEE Transactions on Circuits and Systems I: Regular Papers, vol. 57, No. 3, pp. 568-580, Mar. 2010, doi: 10.1109/TCSI.2009.2023763. (Year: 2010).*
(Continued)

*Primary Examiner* — Emily E Larocque
*Assistant Examiner* — Carlo Waje
(74) *Attorney, Agent, or Firm* — BROADVIEW IP LAW, PC

(57) ABSTRACT

The present disclosure discloses a processing element and a neural processing device including the processing element. The processing element includes a weight register configured to store a weight, an input activation register configured to store input activation, a flexible multiplier configured to generate result data by performing a multiplication operation of the weight and the input activation by using a first multiplier of a first precision or using both the first multiplier and a second multiplier of the first precision in response to a calculation mode signal and a saturating adder configured to generate a partial sum by using the result data.

19 Claims, 37 Drawing Sheets

(51) Int. Cl.
*G06F 7/50* (2006.01)
*G06F 7/535* (2006.01)
*G06F 7/544* (2006.01)

(58) Field of Classification Search
CPC ...... G06F 7/4915; G06F 7/496; G06F 7/4983; G06F 7/52–5338; G06F 7/5443; G06F 7/57–575
See application file for complete search history.

(56) References Cited

U.S. PATENT DOCUMENTS

| 2007/0192399 | A1* | 8/2007 | Krithivasan | G06F 7/5338 708/620 |
| 2018/0321938 | A1* | 11/2018 | Boswell | G06F 9/3012 |
| 2020/0167128 | A1* | 5/2020 | Zhao | G06F 7/533 |
| 2022/0027152 | A1* | 1/2022 | Ware | G06F 7/57 |

OTHER PUBLICATIONS

K. L. S. Swee and L. H. Hiung, "Performance comparison review of 32-bit multiplier designs," 2012 4th International Conference on Intelligent and Advanced Systems (ICIAS2012), 2012, pp. 836-841, doi: 10.1109/ICIAS.2012.6306130. (Year: 2012).*

A. S. Abraham and S. Anand, "An ASIC design of an optimized multiplication using twin precision," 2017 International Conference on Intelligent Computing and Control Systems (ICICCS), 2017, pp. 455-461, doi: 10.1109/ICCONS.2017.8250763. (Year: 2017).*

V. Camus, C. Enz and M. Verhelst, "Survey of Precision-Scalable Multiply-Accumulate Units for Neural-Network Processing," 2019 IEEE International Conference on Artificial Intelligence Circuits and Systems (AICAS), 2019, pp. 57-61, doi: 10.1109/AICAS.2019.8771610. (Year: 2019).*

* cited by examiner

FIG. 15

| depth | | | | | | | | | | |
|---|---|---|---|---|---|---|---|---|---|---|
| 1 | s0n | s0 | s0 | w0' | w0 | w0 | w0 | w0 | s0 | s0 | ~rppg_1 |
| 2 | s1n | w1' | w1 | w1 | w1 | w1 | s1 | s1 | s1 | s1 | ~rppg_2 |
| 3 | s2n | s2 | s2 | w2' | w2 | w2 | w2 | w2 | s2 | s2 | ~rppg_3 |
| 4 | s3n | w3' | w3 | w3 | w3 | w3 | s3 | s3 | s3 | s3 | ~rppg_4 |
| 5 | s4n | s4 | s4 | w4' | w4 | w4 | w4 | w4 | s4 | s4 | ~rppg_5 |
| 6 | s5n | w5' | w5 | w5 | w5 | w5 | s5 | s5 | s5 | s5 | ~rppg_6 |
| 7 | s6n | s6 | s6 | w6' | w6 | w6 | w6 | w6 | s6 | s6 | ~rppg_7 |
| 8 | s7n | w7' | w7 | w7 | w7 | w7 | s7 | s7 | s7 | s7 | ~rppg_8 |
| 9 | s8n | s8 | s8 | w8' | w8 | w8 | w8 | w8 | s8 | s8 | ~rppg_9 |
| 10 | s9n | w9' | w9 | w9 | w9 | w9 | s9 | s9 | s9 | s9 | ~rppg_10 |
| 11 | s10n | s10 | s10 | w10' | w10 | w10 | w10 | w10 | s10 | s10 | ~rppg_11 |
| 12 | s11n | w11' | w11 | w11 | w11 | w11 | s11 | s11 | s11 | s11 | ~rppg_12 |
| 13 | s12n | s12 | s12 | w12' | w12 | w12 | w12 | w12 | s12 | s12 | ~rppg_13 |
| 14 | s13n | w13' | w13 | w13 | w13 | w13 | s13 | s13 | s13 | s13 | ~rppg_14 |
| 15 | s14n | s14 | s14 | w14' | w14 | w14 | w14 | w14 | s14 | s14 | ~rppg_15 |
| 16 | s15n | w15' | w15 | w15 | w15 | w15 | s15 | s15 | s15 | s15 | ~rppg_16 |

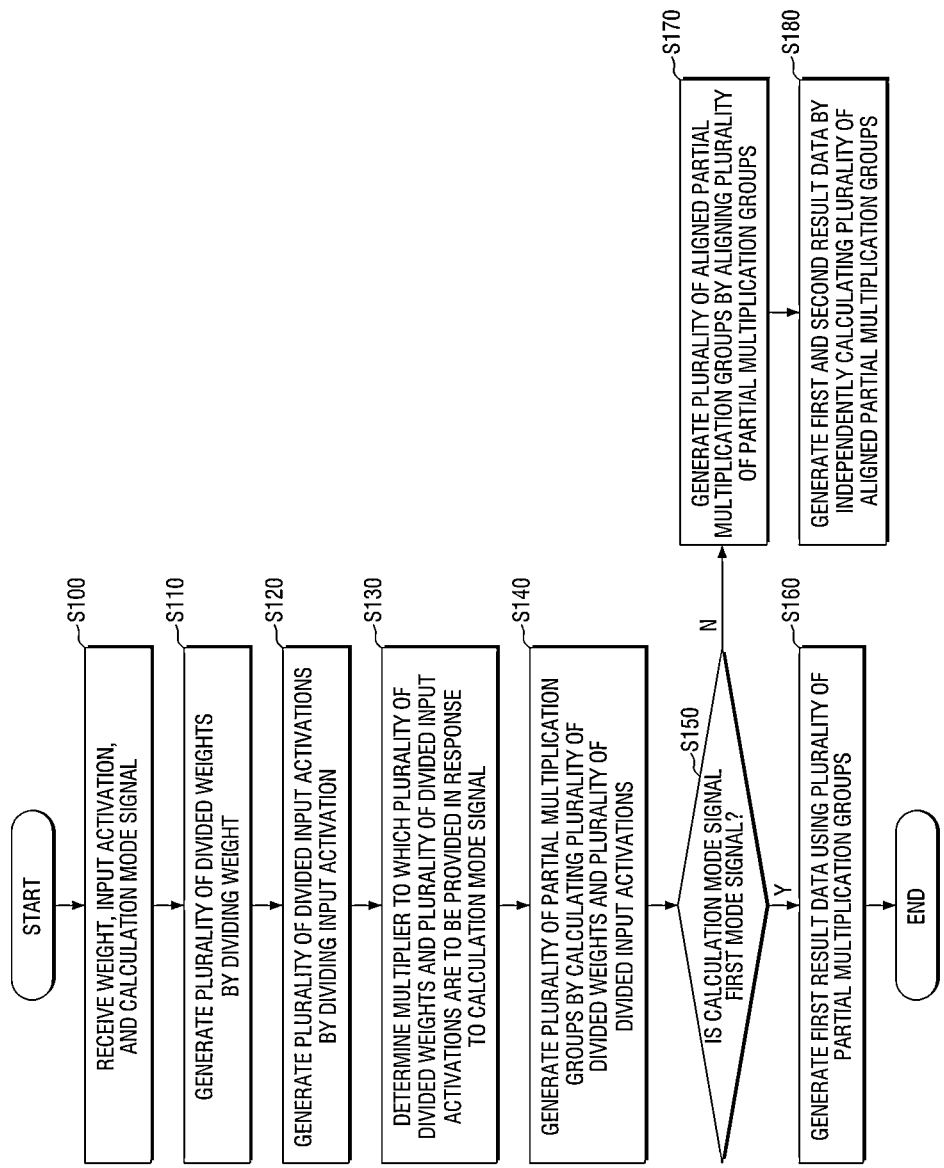

PROCESSING ELEMENT, NEURAL PROCESSING DEVICE INCLUDING SAME, AND MULTIPLICATION OPERATION METHOD USING SAME

CROSS-REFERENCE TO RELATED APPLICATION

This application claims priority under 35 U.S.C § 119 to Korean Patent Application No. 10-2021-0078867 filed on Jun. 17, 2021, and to Korean Patent Application No. 10-2022-0066221 filed on May 30, 2022, in the Korean Intellectual Property Office, the entire contents of which are hereby incorporated by reference.

BACKGROUND

1. Field

The present disclosure relates to a processing element, a neural processing device including the processing element, and a multiplication operation method using the neural processing device. Specifically, the present disclosure relates to a processing element that performs a relatively high precision operation by using a relatively low precision multiplier, a neural processing device including the processing element, and a multiplication operation method using the neural processing device.

2. Description of the Related Art

For the past few years, artificial intelligence technology has been the core technology of the Fourth Industrial Revolution and the subject of discussion as the most promising technology worldwide. The biggest issue with such artificial intelligence technology is computing performance. It is of utmost importance for artificial intelligence technology, which realizes human learning ability, reasoning ability, perceptual ability, natural language implementation ability, etc., to process a large amount of data quickly.

The central processing units (CPUs) or graphics processing unit (GPUs) of off-the-self computers were used for deep-learning training and inference in early artificial intelligence, but had limitations on the tasks of deep-learning training and inference with high workloads, and thus, neural processing units (NPUs) that are structurally specialized for deep learning tasks have received a lot of attention.

The neural processing unit can generally utilize data of a particular precision. The higher the number of bits of data, the more precisely the data can be represented, but more hardware resources may be required accordingly.

SUMMARY

An object of the present disclosure is to provide a processing element that performs calculation of a relatively high precision by using a relatively-low-precision multiplier.

Another object of the present disclosure is to provide a neural processing device that performs calculation of a relatively high precision by using a relatively-low-precision multiplier.

Another object of the present disclosure is to provide a method of calculating a relatively high precision by using a relatively-low-precision multiplier.

Objects of the present disclosure are not limited to the objects described above, and other objects and advantages of the present disclosure not described may be understood by the following description, and will be more clearly understood by the embodiments of the present disclosure. In addition, it will be apparent that the objects and advantages of the present disclosure may be implemented by the means and combinations thereof indicated in the claims.

According to some aspects of the present disclosure, there is provided a processing element including a weight register configured to store a weight, an input activation register configured to store input activation, a flexible multiplier configured to generate result data by performing a multiplication operation of the weight and the input activation by using a first multiplier of a first precision or using both the first multiplier and a second multiplier of the first precision in response to a calculation mode signal and a saturating adder configured to generate a partial sum by using the result data.

In some embodiments of the present disclosure, the flexible multiplier performs a multiplication operation of the weight and the input activation by using the first multiplier when the calculation mode signal is a first mode signal associated with the first precision, and performs the multiplication operation of the weight and the input activation by using both the first multiplier and the second multiplier when the calculation mode signal is a second mode signal associated with a second precision greater than the first precision.

In some embodiments of the present disclosure, the flexible multiplier includes an aligner that a first aligned partial multiplication group and a second aligned partial multiplication group by aligning digits of the first partial multiplication group generated by the first multiplier and a second partial multiplication group generated by the second multiplier when the calculation mode signal is the second mode signal.

In some embodiments of the present disclosure, the flexible multiplier includes a first booth reduction tree configured to calculate the first aligned partial multiplication group, and a second booth reduction tree configured to calculate the second aligned partial multiplication group and a depth of the first aligned partial multiplication group is greater than a depth of the second aligned partial multiplication group.

In some embodiments of the present disclosure, the flexible multiplier includes a first booth reduction tree configured to calculate the first aligned partial multiplication group, and a second booth reduction tree configured to calculate the second aligned partial multiplication group and a calculable depth of the first booth reduction tree is greater than a calculable depth of the second booth reduction tree.

In some embodiments of the present disclosure, the flexible multiplier includes one first booth reduction tree configured to calculate the first aligned partial multiplication group, and a plurality of second booth reduction trees configured to calculate the second aligned partial multiplication group.

In some embodiments of the present disclosure, when the weight and the input activation are each 32-bit data, the first precision is INT4, and the second precision is INT8, the flexible multiplier includes one first booth reduction tree that calculates the first aligned partial multiplication group, and four second booth reduction trees that calculate the second aligned partial multiplication group.

In some embodiments of the present disclosure, the flexible multiplier includes a booth reduction tree that generates the result data by using partial multiplication groups generated by the first multiplier and the second multiplier.

In some embodiments of the present disclosure, the booth reduction tree includes a depth reducer that reduces depths of the partial multiplication groups, and an adder that performs an addition operation of the partial multiplication groups of which depths are reduced by the depth reducer.

In some embodiments of the present disclosure, each of the first multiplier and the second multiplier is composed of k multipliers.

In some embodiments of the present disclosure, k is 8 if the weight and the input activation are each 32-bit data, the first precision is INT4, and the second precision is INT8.

In some embodiments of the present disclosure, the flexible multiplier includes an aligner that generates a first aligned partial multiplication group and a second aligned partial multiplication group by using partial multiplication groups generated by the first multiplier and the second multiplier, a first booth reduction tree that calculates the first aligned partial multiplication group, a second booth reduction tree that calculates the second aligned partial multiplication group, and a pre-adder that performs an addition operation on an operation result of the second booth reduction tree, and a calculation result of the first booth reduction tree and a calculation result of the pre-adder are provided to the saturating adder.

In some embodiments of the present disclosure, the flexible multiplier includes a bit division logic that generates a first divided weight of the first precision by using the weight and generates a first divided input activation of the first precision by using the input activation.

In some embodiments of the present disclosure, when the calculation mode signal is a first mode signal associated with the first precision, the first multiplier generates the result data by using the first divided weight and the first divided input activation.

In some embodiments of the present disclosure, when the calculation mode signal is a second mode signal associated with a second precision greater than the first precision, the bit division logic generates a first high-order divided weight and a first low-order divided weight by using the first divided weight, and generates a first high-order divided input activation and a first low-order divided input activation by using the first divided input activation.

In some embodiments of the present disclosure, the first low-order divided weight and the first low-order divided input activation each include an extra bit for having a positive value.

According to some aspects of the present disclosure, there is provided a neural processing device including at least one neural core, wherein the neural core includes a processing unit that performs calculation, and a L0 memory for storing input/output data of the processing unit, the processing unit includes a PE array including at least one processing element, and the PE array includes a flexible multiplier that receives a weight and an input activation and generates a plurality of partial multiplication groups by using a first multiplier of a first precision or both the first multiplier and a second multiplier of the first precision in response to a calculation mode signal and generates result data by using the plurality of partial multiplication groups, and a saturating adder that receives the result data and generates a partial sum.

In some embodiments of the present disclosure, the flexible multiplier generates the result data by performing an addition operation of the plurality of partial multiplication groups by using a Booth algorithm.

In some embodiments of the present disclosure, the flexible multiplier groups the plurality of partial multiplication groups into a plurality of aligned partial multiplication groups based on digits thereof, and generates the result data by performing an addition operation on the plurality of aligned partial multiplication groups.

According to some aspects of the present disclosure, there is provided a multiplication operation method including: receiving a weight, an input activation, and a calculation mode signal, generating a plurality of divided weights by using the weight, generating a plurality of divided input activations by using the input activation, determining a multiplier to which the plurality of divided weights and the plurality of divided input activations are to be provided in response to the calculation mode signal, generating a first aligned partial multiplication group and a second aligned partial multiplication group by aligning digits of a first partial multiplication group and a second partial multiplication group generated by the multiplier, and generating result data by independently calculating the first aligned partial multiplication group and the second aligned partial multiplication group.

Advantageous Effects

According to the present disclosure, when calculation of a relatively high precision is performed, a relatively-low-precision multiplier may be used, and thus, hardware complexity of a processing element and a neural processing device may be reduced.

Specific effects of the present disclosure will be described together with the above description while describing specific details for implementing the present disclosure below.

BRIEF DESCRIPTION OF THE DRAWINGS

FIGS. 14 and 15 are diagrams illustrating a process of reducing depths of a first partial multiplication group to a 16th partial multiplication group, according to some embodiments of the present disclosure.

FIG. 37 is a diagram illustrating a method of performing a multiplication operation by using a processing element, according to some embodiments of the present disclosure.

DETAILED DESCRIPTION

Figure 1:
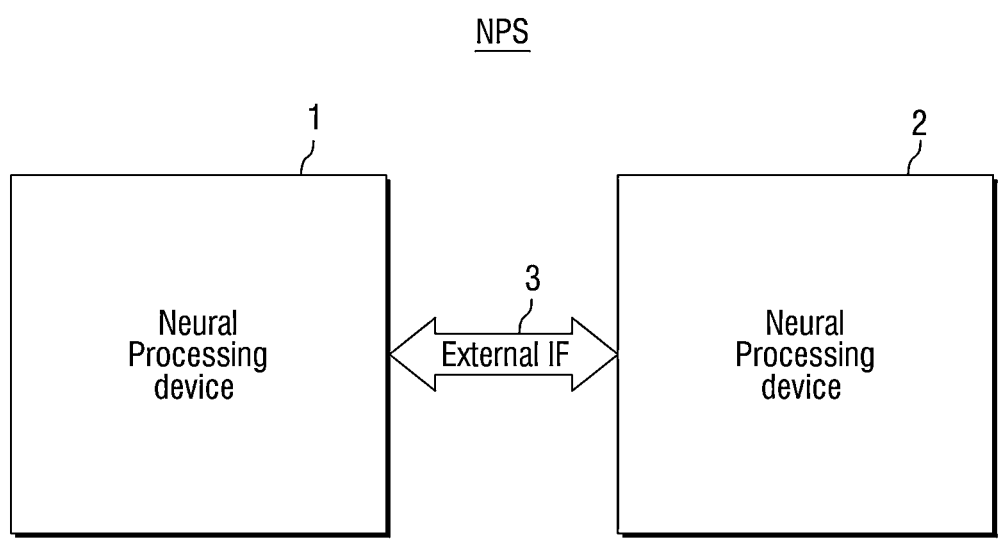
FIG. 1 is a block diagram for illustrating a neural processing system in accordance with some embodiments of the present disclosure.

Hereinafter, neural processing devices according to some embodiments of the present disclosure will be described with reference to FIGS. 1 to 36.

The present disclosure will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the attached figures, the thickness of layers and regions is exaggerated for clarity.

It will be understood that when an element or layer is referred to as being "connected to," or "coupled to" another element or layer, it can be directly connected to or coupled to another element or layer or intervening elements or layers may be present. In contrast, when an element is referred to as being "directly connected to" or "directly coupled to" another element or layer, there are no intervening elements or layers present. Like numbers refer to like elements throughout. As used herein, the term "and/or" includes any and all combinations of one or more of the associated listed items.

It will also be understood that when a layer is referred to as being "on" another layer or substrate, it can be directly on the other layer or substrate, or intervening layers may also be present. In contrast, when an element is referred to as being "directly on" another element, there are no intervening elements present.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

Hereinafter, a neural processing device in accordance with some embodiments of the present disclosure will be described with reference to FIGS. 1 to 28.

FIG. 1 is a block diagram for illustrating a neural processing system in accordance with some embodiments of the present disclosure.

With reference to FIG. 1, a neural processing system NPS in accordance with some embodiments of the present disclosure may include a first neural processing device 1, a second neural processing device 2, and an external interface 3.

The first neural processing device 1 may be a device that performs calculations using an artificial neural network. The first neural processing device 1 may be, for example, a device specialized in performing the task of deep learning calculations. However, the present embodiment is not limited thereto.

The second neural processing device 2 may be a device having the same or similar configuration as the first neural processing device 1. The first neural processing device 1 and the second neural processing device 2 may be connected to each other via the external interface 3 and share data and control signals.

Although FIG. 1 shows two neural processing devices, the neural processing system NPS in accordance with some embodiments of the present disclosure is not limited thereto. That is, in a neural processing system NPS in accordance with some embodiments of the present disclosure, three or more neural processing devices may be connected to one another via the external interface 3. Also, conversely, a neural processing system NPS in accordance with some embodiments of the present disclosure may include only one neural processing device.

Figure 2:
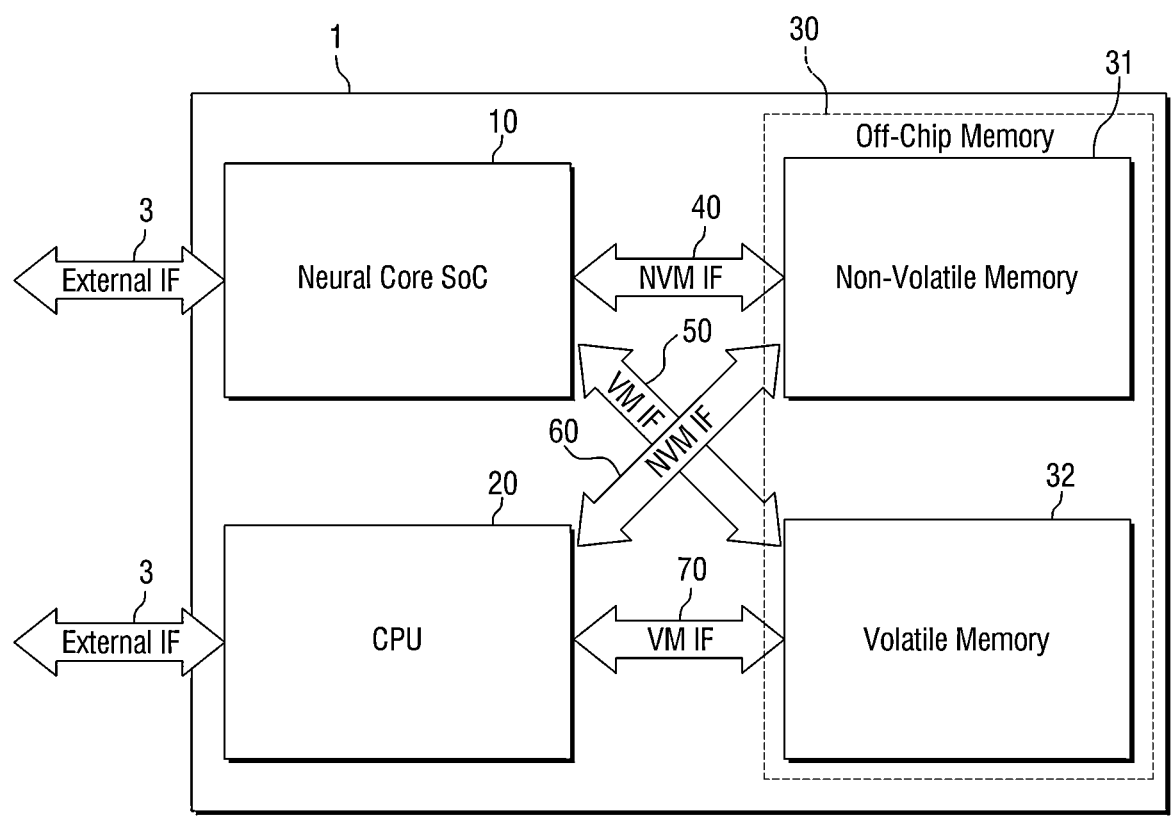
FIG. 2 is a block diagram for illustrating in detail the neural processing device of FIG. 1.

FIG. 2 is a block diagram for illustrating in detail the neural processing device of FIG. 1.

With reference to FIG. 2, the first neural processing device 1 may include a neural core SoC 10, a CPU 20, an off-chip memory 30, a first non-volatile memory interface 40, a first volatile memory interface 50, a second non-volatile memory interface 60, and a second volatile memory interface 70.

The neural core SoC 10 may be a system on a chip device. The neural core SoC 10 is an artificial intelligence calculation unit, which may be an accelerator. The neural core SoC 10 may be, for example, any one of a graphics processing unit (GPU), a field-programmable gate array (FPGA), and an application-specific integrated circuit (ASIC). However, the present embodiment is not limited thereto.

The neural core SoC 10 may exchange data with other external calculation units via the external interface 3. In addition, the neural core SoC 10 may be connected to the non-volatile memory 31 and the volatile memory 32 via the first non-volatile memory interface 40 and the first volatile memory interface 50, respectively.

The CPU 20 may be a control device that controls the system of the first neural processing device 1 and executes program calculations. The CPU 20 is a general-purpose calculation unit and may have low efficiency in performing simple parallel calculations that are used a lot in deep learning. Therefore, there can be high efficiency by performing calculations in deep learning inference and training tasks by the neural core SoC 10.

The CPU 20 may exchange data with other external calculation units via the external interface 3. Moreover, the CPU 20 may be connected to the non-volatile memory 31 and the volatile memory 32 via the second non-volatile memory interface 60 and the second volatile memory interface 70, respectively.

The off-chip memory 30 may be a memory placed outside the chip of the neural core SoC 10. The off-chip memory 30 may include the non-volatile memory 31 and the volatile memory 32.

The non-volatile memory 31 may be a memory that continuously retains stored information even when electric power is not supplied. The non-volatile memory 31 may include, for example, at least one of Read-Only Memory (ROM), Programmable Read-Only Memory (PROM), Erasable Alterable ROM (EAROM), Erasable Programmable Read-Only Memory (EPROM), Electrically Erasable Programmable Read-Only Memory (EEPROM) (e.g., NAND Flash memory, NOR Flash memory), Ultra-Violet Erasable Programmable Read-Only Memory (UVEPROM), Ferroelectric Random-Access Memory (FeRAM), Magnetoresistive Random-Access Memory (MRAM), Phase-change Random-Access Memory (PRAM), silicon-oxide-nitride-oxide-silicon (SONOS), Resistive Random-Access Memory (RRAM), Nanotube Random-Access Memory (NRAM), magnetic computer storage devices (e.g., hard disks, diskette drives, magnetic tapes), optical disc drives, and 3D XPoint memory. However, the present embodiment is not limited thereto.

The volatile memory 32 may be a memory that continuously requires electric power to retain stored information, unlike the non-volatile memory 31. The volatile memory 32 may include, for example, at least one of Dynamic Random-Access Memory (DRAM), Static Random-Access Memory (SRAM), Synchronous Dynamic Random-Access Memory (SDRAM), and Double Data Rate SDRAM (DDR SDRAM). However, the present embodiment is not limited thereto.

The first non-volatile memory interface 40 and the second non-volatile memory interface 60 may each include, for example, at least one of Parallel Advanced Technology Attachment (PATA), Small Computer System Interface (SCSI), Serial Attached SCSI (SAS), Serial Advanced Technology Attachment (SATA), and PCI Express (PCIe). However, the present embodiment is not limited thereto.

The first volatile memory interface 50 and the second volatile memory interface 70 may each be, for example, at least one of SDR (Single Data Rate), DDR (Double Data Rate), QDR (Quad Data Rate), and XDR (eXtreme Data Rate, Octal Data Rate). However, the present embodiment is not limited thereto.

Figure 3:
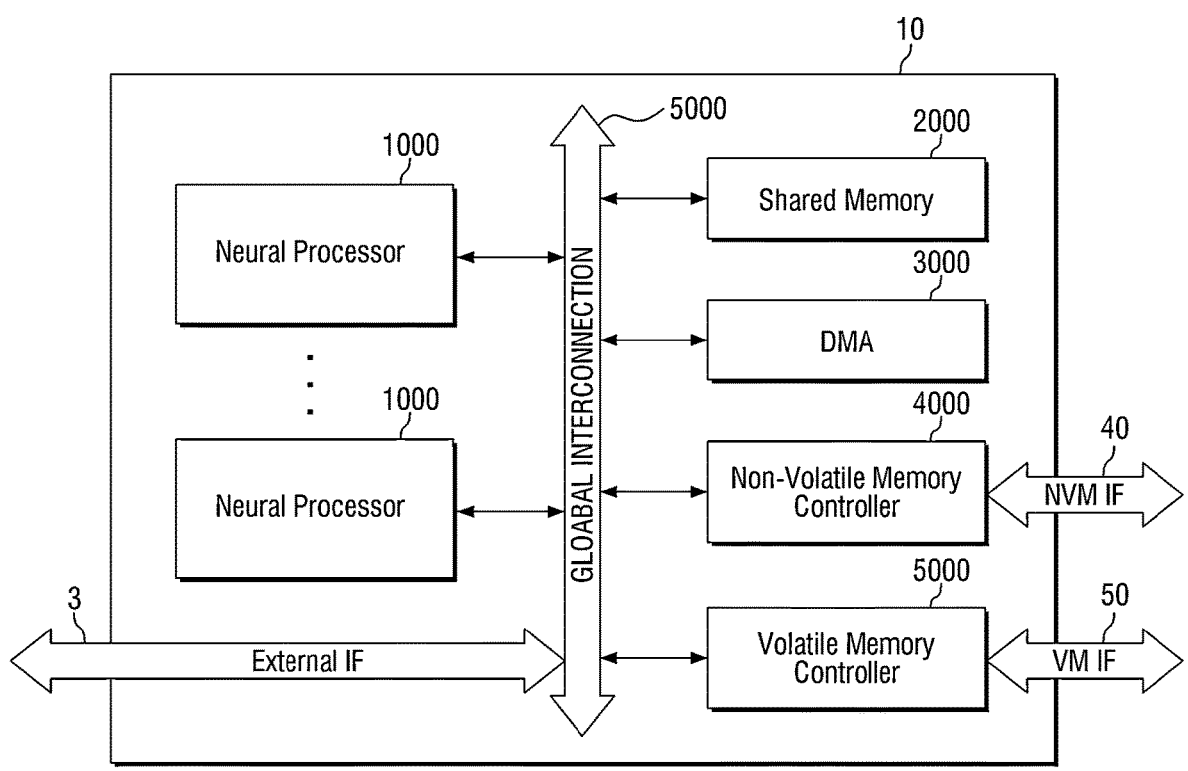
FIG. 3 is a block diagram for illustrating in detail the neural core SoC of FIG. 2.

FIG. 3 is a block diagram for illustrating in detail the neural core SoC of FIG. 2.

Referring to FIGS. 2 and 3, the neural core SoC 10 may include at least one neural processor 1000, a shared memory 2000, direct memory access (DMA) 3000, a non-volatile memory controller 4000, a volatile memory controller 5000, and a global interconnection 5000.

The neural processor 1000 may be a calculation unit that directly performs calculation tasks. If there exist neural processors 1000 in plurality, calculation tasks may be assigned to respective neural processors 1000. The respective neural processors 1000 may be connected to each other via the global interconnection 5000.

The shared memory 2000 may be a memory shared by multiple neural processors 1000. The shared memory 2000 may store data of each neural processor 1000. Further, the shared memory 2000 may receive data from the off-chip memory 30, store them temporarily, and transfer them to each neural processor 1000. On the contrary, the shared memory 2000 may also receive data from the neural processor 1000, store them temporarily, and transmit them to the off-chip memory 30 of FIG. 2.

The shared memory 2000 may need a relatively high-speed memory. Accordingly, the shared memory 2000 may include, for example, an SRAM. However, the present embodiment is not limited thereto. That is, the shared memory 2000 may include a DRAM as well.

The shared memory 2000 may be a memory corresponding to the SoC level, i.e., level 3 (L3). Therefore, the shared memory 2000 may also be defined as an L3 shared memory.

The DMA 3000 may directly control the movement of data without the need for the neural processor 1000 to control the input and output of data. Accordingly, the DMA 3000 may control the data movement between memories, thereby minimizing the number of interrupts of the neural processor 1000.

The DMA 3000 may control the data movement between the shared memory 2000 and the off-chip memory 30. Via the authority of the DMA 3000, the non-volatile memory controller 4000 and the volatile memory controller 5000 may perform the movement of data.

The non-volatile memory controller 4000 may control the task of reading from or writing onto the non-volatile memory 31. The non-volatile memory controller 4000 may control the non-volatile memory 31 via the first non-volatile memory interface 40.

The volatile memory controller 5000 may control the task of reading from or writing onto the volatile memory 32. Moreover, the volatile memory controller 5000 may perform a refresh task of the volatile memory 32. The volatile memory controller 5000 may control the non-volatile memory 31 via the first volatile memory interface 50.

The global interconnection 5000 may connect the at least one neural processor 1000, the shared memory 2000, the DMA 3000, the non-volatile memory controller 4000, and the volatile memory controller 5000 to one another. In addition, the external interface 3 may also be connected to the global interconnection 5000. The global interconnection 5000 may be a path through which data travels between the at least one neural processor 1000, the shared memory 2000, the DMA 3000, the non-volatile memory controller 4000, the volatile memory controller 5000, and the external interface 3.

The global interconnection 5000 may transmit not only data but also control signals and may transmit a signal for synchronization. That is, in the neural processing device in accordance with some embodiments of the present disclosure, each neural processor 1000 may directly transmit and receive a synchronization signal, instead of a separate control processor managing the synchronization signal. Accordingly, it is possible to preclude the latency of the synchronization signal generated by the control processor.

In other words, if there exist neural processors 1000 in plurality, there may be dependencies of individual tasks in which the task of one neural processor 1000 needs to be finished before the next neural processor 1000 can start a new task. The end and start of these individual tasks can be checked via a synchronization signal, and in prior art techniques, a control processor performed the reception of such a synchronization signal and an instruction to start a new task.

However, as the number of neural processors 1000 increases and task dependencies are designed more complicatedly, the number of requests and instructions for this synchronization task has increased exponentially. Accordingly, the latency resulting from each request and instruction can greatly reduce the efficiency of tasks.

Accordingly, in the neural processing device in accordance with some embodiments of the present disclosure, each neural processor 1000, instead of the control processor, may directly transmit a synchronization signal to another neural processor 1000 according to the dependency of a task. In this case, multiple neural processors 1000 can perform the synchronization tasks in parallel as compared with the method managed by the control processor, thereby minimizing the latency due to synchronization.

Furthermore, the control processor needs to perform the task scheduling of the neural processors 1000 according to a task dependency, and the overhead of such scheduling may also increase significantly as the number of neural processors 1000 increases. Therefore, in the neural processing device in accordance with some embodiments of the present disclosure, the scheduling task is also performed by the individual neural processors 1000, and thus, the performance of the device can be improved without even a scheduling burden resulting therefrom.

Figure 4:
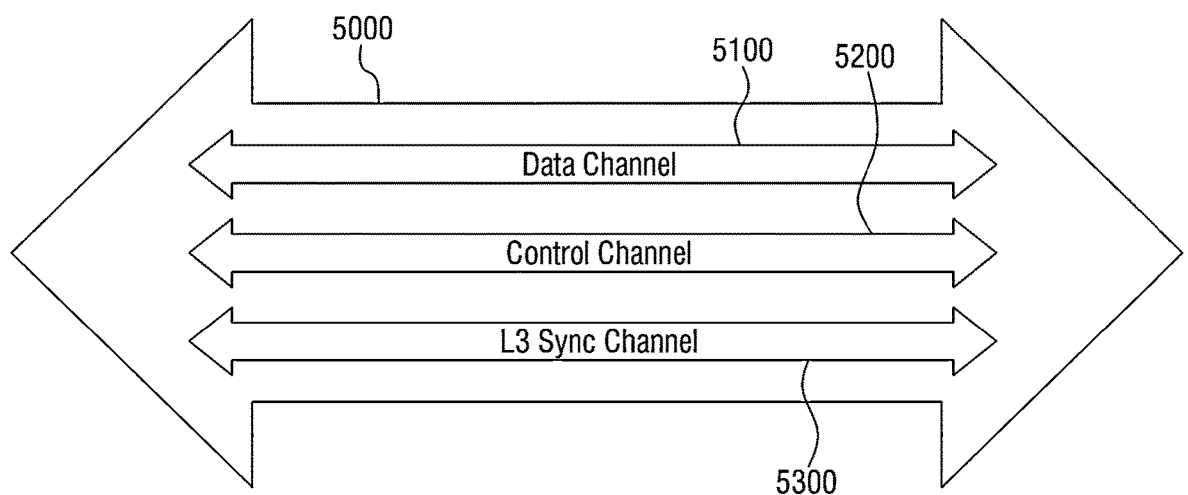
FIG. 4 is a structural diagram for illustrating in detail the global interconnection of FIG. 3.

FIG. 4 is a structural diagram for illustrating in detail the global interconnection of FIG. 3.

Referring to FIG. 4, the global interconnection 5000 may include a data channel 5100, a control channel 5200, and an L3 sync channel 5300.

The data channel 5100 may be a dedicated channel for transmitting data. Through the data channel 5100, the at least one neural processor 1000, the shared memory 2000, the DMA 3000, the non-volatile memory controller 4000, the volatile memory controller 5000, and the external interface 3 may exchange data with one another.

The control channel 5200 may be a dedicated channel for transmitting control signals. Through the control channel 5200, the at least one neural processor 1000, the shared memory 2000, the DMA 3000, the non-volatile memory controller 4000, the volatile memory controller 5000, and the external interface 3 may exchange control signals with one another.

The L3 sync channel 5300 may be a dedicated channel for transmitting synchronization signals. Through the L3 sync channel 5300, the at least one neural processor 1000, the shared memory 2000, the DMA 3000, the non-volatile memory controller 4000, the volatile memory controller 5000, and the external interface 3 may exchange synchronization signals with one another.

The L3 sync channel 5300 may be set as a dedicated channel inside the global interconnection 5000, and thus, may not overlap with other channels and transmit synchronization signals quickly. Accordingly, the neural processing device in accordance with some embodiments of the present disclosure does not require new wiring work and may smoothly perform the synchronization task by utilizing the conventionally used global interconnection 5000.

Figure 5:
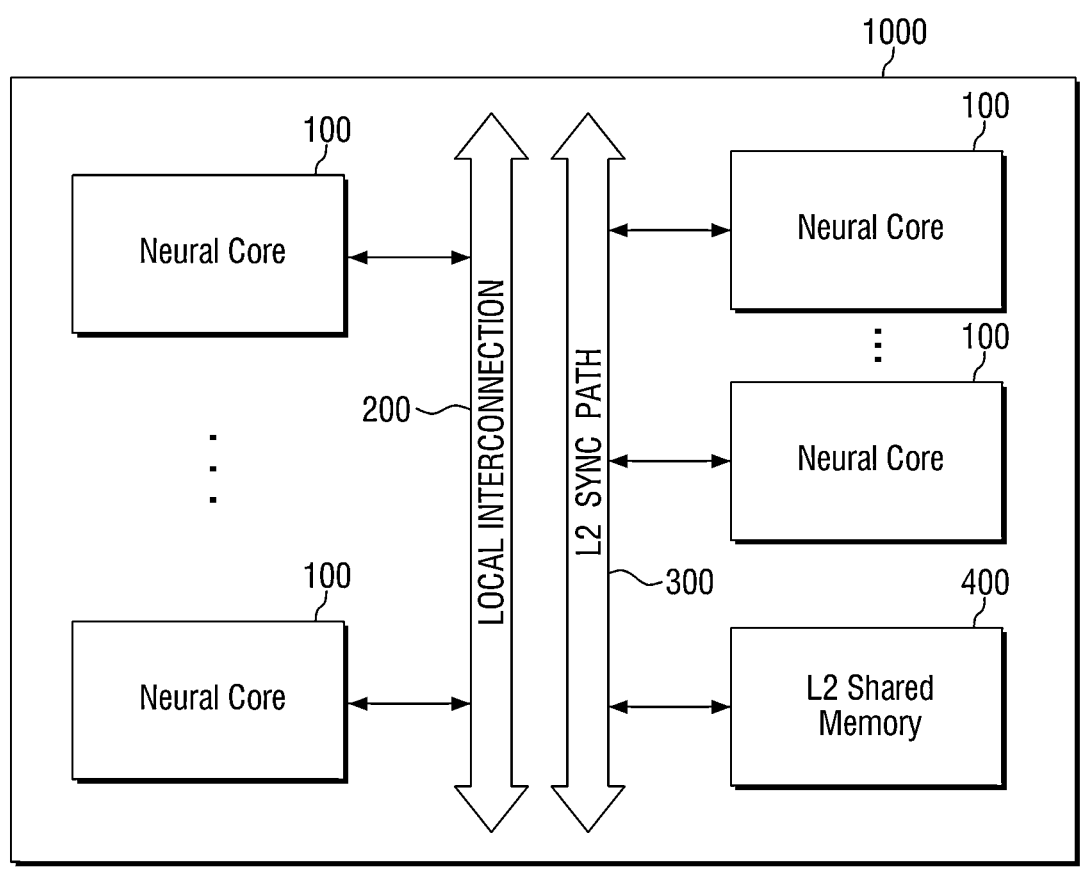
FIG. 5 is a block diagram for illustrating in detail the neural processor of FIG. 3.

FIG. 5 is a block diagram for illustrating in detail the neural processor of FIG. 3.

Referring to FIG. 3 to FIG. 5, the neural processor 1000 may include at least one neural core 100, an L2 shared memory 400, a local interconnection 200, and an L2 sync path 300.

The at least one neural core 100 may share and perform the tasks of the neural processor 1000. The number of neural cores 100 may be, for example, eight. However, the present embodiment is not limited thereto. FIG. 3 and FIG. 5 illustrate that a plurality of neural cores 100 are included in the neural processor 1000, but the present embodiment is not limited thereto. That is, the neural processor 1000 may be configured with only one neural core 100.

The L2 shared memory 400 may be a memory shared by the respective neural cores 100 in the neural processor 1000. The L2 shared memory 400 may store data of each neural core 100. In addition, the L2 shared memory 400 may receive data from the shared memory 2000 of FIG. 4, store them temporarily, and transmit them to each neural core 100. On the contrary, the L2 shared memory 400 may also receive data from the neural core 100, store them temporarily, and transfer them to the shared memory 2000 of FIG. 3.

The L2 shared memory 400 may be a memory corresponding to the neural processor level, i.e., level 2 (L2). The L3 shared memory, i.e., the shared memory 2000 may be shared by the neural processors 1000, and the L2 shared memory 400 may be shared by the neural cores 100.

The local interconnection 200 may connect the at least one neural core 100 and the L2 shared memory 400 to each other. The local interconnection 200 may be a path through which data travels between the at least one neural core 100 and the L2 shared memory 400. The local interconnection 200 may be connected and transmit data to the global interconnection 5000 of FIG. 3.

The L2 sync path 300 may connect the at least one neural core 100 and the L2 shared memory 400 to each other. The L2 sync path 300 may be a path through which synchronization signals of the at least one neural core 100 and the L2 shared memory 400 travel.

The L2 sync path 300 may be formed physically separately from the local interconnection 200. In the case of the local interconnection 200, sufficient channels may not be formed therein, unlike the global interconnection 5000. In such a case, the L2 sync path 300 may be formed separately so that the synchronization signal can be transmitted quickly and without any delay. The L2 sync path 300 may be used for synchronization performed at a level one step lower than that of the L3 sync channel 5300 of the global interconnection 5000.

Figure 6:
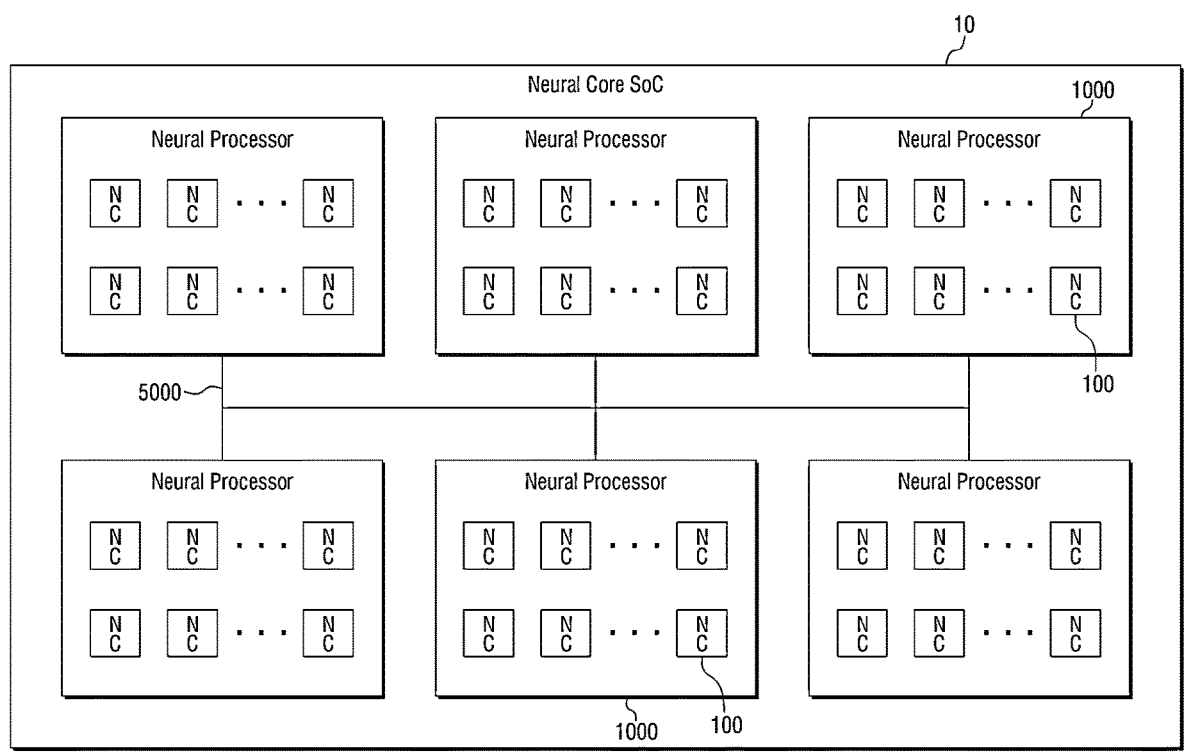
FIG. 6 is a diagram for illustrating a hierarchical structure of a neural processing device in accordance with some embodiments of the present disclosure.

FIG. 6 is a diagram for illustrating a hierarchical structure of a neural processing device in accordance with some embodiments of the present disclosure.

Referring to FIG. 6, the neural core SoC 10 may include at least one neural processor 1000. Each neural processor 1000 may transmit data to each other via the global interconnection 5000.

The neural processors 1000 may each include at least one neural core 100. The neural core 100 may be a processing unit optimized for deep learning calculation tasks. The neural core 100 may be a processing unit corresponding to one operation of a deep learning calculation task. In other words, a deep learning calculation task can be represented by a sequential or parallel combination of multiple operations. The neural cores 100 may each be a processing unit capable of processing one operation, and may be a minimum calculation unit that can be considered for scheduling from the viewpoint of a compiler.

The neural processing device in accordance with the present embodiment may configure the scales of the minimum calculation unit considered from the viewpoint of compiler scheduling and the hardware processing unit to be the same, so that fast and efficient scheduling and calculation tasks can be performed.

That is, if the processing units into which hardware can be divided are too large compared to calculation tasks, inefficiency of the calculation tasks may occur in driving the processing units. Conversely, it is not appropriate to schedule a processing unit that is a unit smaller than an operation, which is the minimum scheduling unit of the compiler, every time, since scheduling inefficiency may occur and hardware design cost may increase.

Therefore, in the present embodiment, by adjusting the scales of the scheduling unit of the compiler and the hardware processing unit to be similar, it is possible to simultaneously satisfy the fast scheduling of calculation tasks and the efficient execution of the calculation tasks without wasting hardware resources.

Figure 7:
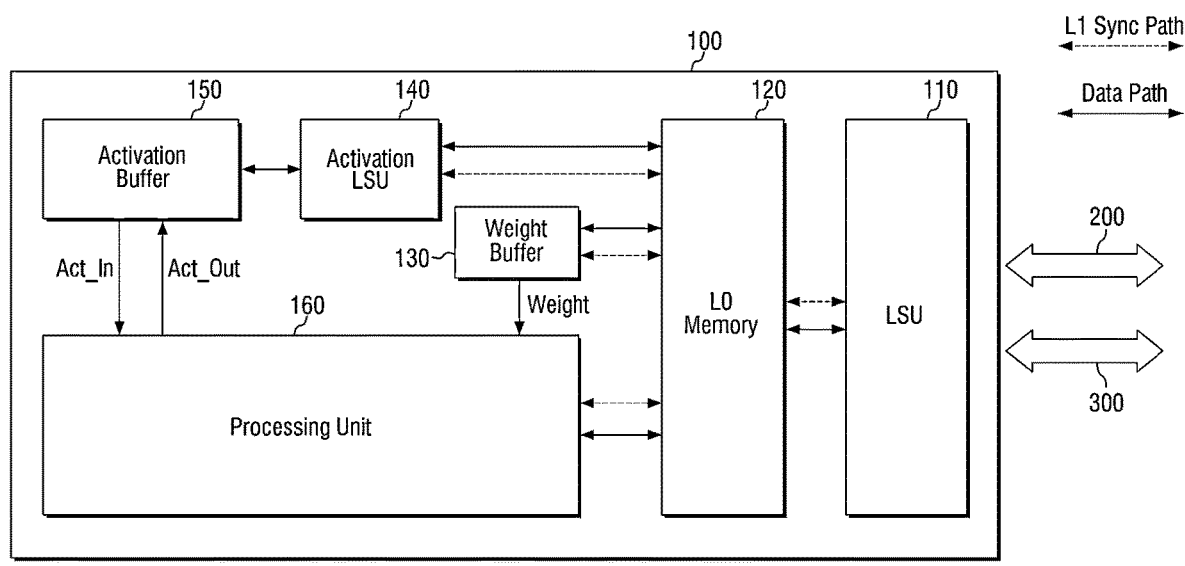
FIG. 7 is a block diagram for illustrating in detail the neural core of FIG. 5.

FIG. 7 is a block diagram for illustrating in detail the neural core of FIG. 5.

Referring to FIG. 7, the neural core 100 may include a load/store unit (LSU) 110, an L0 memory 120, a first weight manipulator 130, an activation LSU 140, an activation buffer 150, and a processing unit 160.

The LSU 110 may receive at least one of data, a control signal, and a synchronization signal from the outside via the local interconnection 200 and the L2 sync path 300. The LSU 110 may transmit at least one of the data, the control signal, and the synchronization signal received to the L0 memory 120. Similarly, the LSU 110 may transfer at least one of the data, the control signal, and the synchronization signal to the outside via the local interconnection 200 and the L2 sync path 300.

Figure 8:
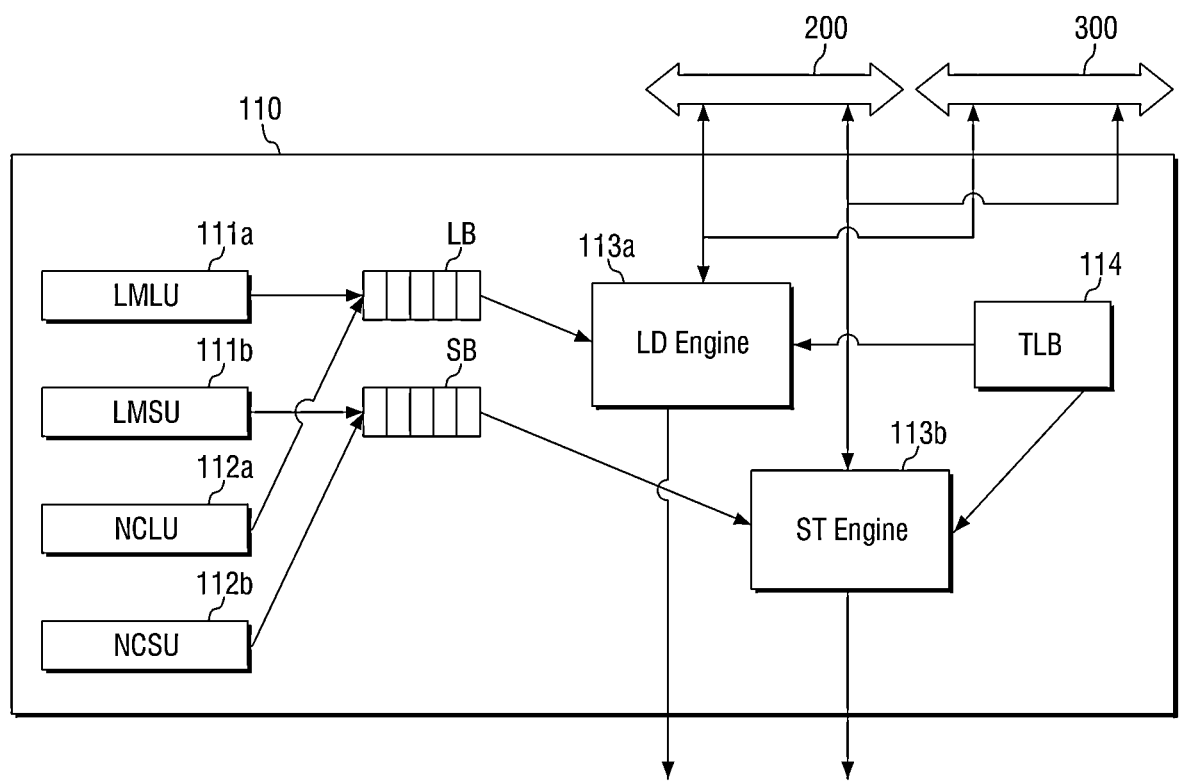
FIG. 8 is a block diagram for illustrating in detail the LSU of FIG. 7.

FIG. 8 is a block diagram for illustrating in detail the LSU of FIG. 7.

Referring to FIG. 8, the LSU 110 may include a local memory load unit 111a, a local memory store unit 111b, a neural core load unit 112a, a neural core store unit 112b, a load buffer LB, a store buffer SB, a load engine 113a, a store engine 113b, and a translation lookaside buffer 114.

The local memory load unit 111a may fetch a load instruction for the L0 memory 120 and issue the load instruction. When the local memory load unit 111a provides the issued load instruction to the load buffer LB, the load buffer LB may sequentially transmit memory access requests to the load engine 113a according to the inputted order.

Further, the local memory store unit 111b may fetch a store instruction for the L0 memory 120 and issue the store instruction. When the local memory store unit 111b provides the issued store instruction to the store buffer SB, the store buffer SB may sequentially transmit memory access requests to the store engine 113b according to the inputted order.

The neural core load unit 112a may fetch a load instruction for the neural core 100 and issue the load instruction. When the neural core load unit 112a provides the issued load instruction to the load buffer LB, the load buffer LB may sequentially transmit memory access requests to the load engine 113a according to the inputted order.

Also, the neural core store unit 112b may fetch a store instruction for the neural core 100 and issue the store instruction. When the neural core store unit 112b provides the issued store instruction to the store buffer SB, the store buffer SB may sequentially transmit memory access requests to the store engine 113b according to the inputted order.

The load engine 113a may receive the memory access request and retrieve data via the local interconnection 200. At this time, the load engine 113a may quickly find the data by using a translation table of a physical address and a virtual address that has been used recently in the translation lookaside buffer 114. If the virtual address of the load engine 113a is not in the translation lookaside buffer 114, the address translation information may be found in another memory.

The store engine 113b may receive the memory access request and retrieve data via the local interconnection 200. At this time, the store engine 113b may quickly find the data by using a translation table of a physical address and a virtual address that has been used recently in the translation lookaside buffer 114. If the virtual address of the store engine 113b is not in the translation lookaside buffer 114, the address translation information may be found in another memory.

The load engine 113a and the store engine 113b may send synchronization signals to the L2 sync path 300. At this time, the synchronization signals may have a meaning that the task has been completed.

Referring to FIG. 7 again, the L0 memory 120 is a memory located inside the neural core 100, and may receive all input data required for the tasks by the neural core 100 from the outside and store them temporarily. In addition, the L0 memory 120 may temporarily store the output data calculated by the neural core 100 for transmission to the outside. The L0 memory 120 may serve as a cache memory of the neural core 100.

The L0 memory 120 may transmit an input activation Act_In to the activation buffer 150 and receive an output activation Act_Out via the activation LSU 140. The L0 memory 120 may directly transmit and receive data to and from the processing unit 160, in addition to the activation LSU 140. In other words, the L0 memory 120 may exchange data with each of a PE array 163 and a vector unit 164.

The L0 memory 120 may be a memory corresponding to the neural core level. The L1 memory may not be shared but be a private memory of the neural core, unlike the L2 shared memory 400 and the shared memory 2000.

The L0 memory 120 may transmit data such as activations or weights via a data path. The L0 memory 120 may exchange synchronization signals via an L3 sync path, which is a separate dedicated path. The L0 memory 120 may exchange synchronization signals with, for example, the LSU 110, the first weight manipulator 130, the activation LSU 140, and the processing unit 160 via the L3 sync path.

The weight buffer 130 may receive a weight from the L0 memory 120. The weight buffer 130 may transmit the weight to the processing unit 160. The weight buffer 130 may temporarily store the weight before transmitting it.

The input activation Act_In and the output activation Act_Out may refer to input values and output values of the layers of a neural network. In this case, if there are a plurality of layers in the neural network, the output value of the previous layer becomes the input value of the next layer, and thus, the output activation Act_Out of the previous layer may be utilized as the input activation Act_In of the next layer.

The weight may refer to a parameter that is multiplied by the input activation Act_In inputted in each layer. The weight is adjusted and confirmed in the deep learning training stage, and may be used to derive the output activation Act_Out via a fixed value in the inference stage.

The activation LSU 140 may transmit the input activation Act_In from the L0 memory 120 to the activation buffer 150, and the output activation Act_Out from the activation buffer 150 to the on-chip buffer. In other words, the activation LSU 140 may perform both a load task and a store task of the activation.

The activation buffer 150 may provide the input activation Act_In to the processing unit 160 and receive the output activation Act_Out from the processing unit 160. The activation buffer 150 may temporarily store the input activation Act_In and the output activation Act_Out.

The activation buffer 150 may quickly provide the activation to the processing unit 160, in particular, the PE array 163, which has a large amount of calculations, and may quickly receive the activation, thereby increasing the calculation speed of the neural core 100.

The processing unit 160 may be a module that performs calculations. The processing unit 160 may perform not only one-dimensional calculations but also two-dimensional matrix calculations, i.e., convolution operations. The processing unit 160 may receive an input activation Act_In, multiply it by a weight, and then add it to generate an output activation Act_Out.

Figure 9:
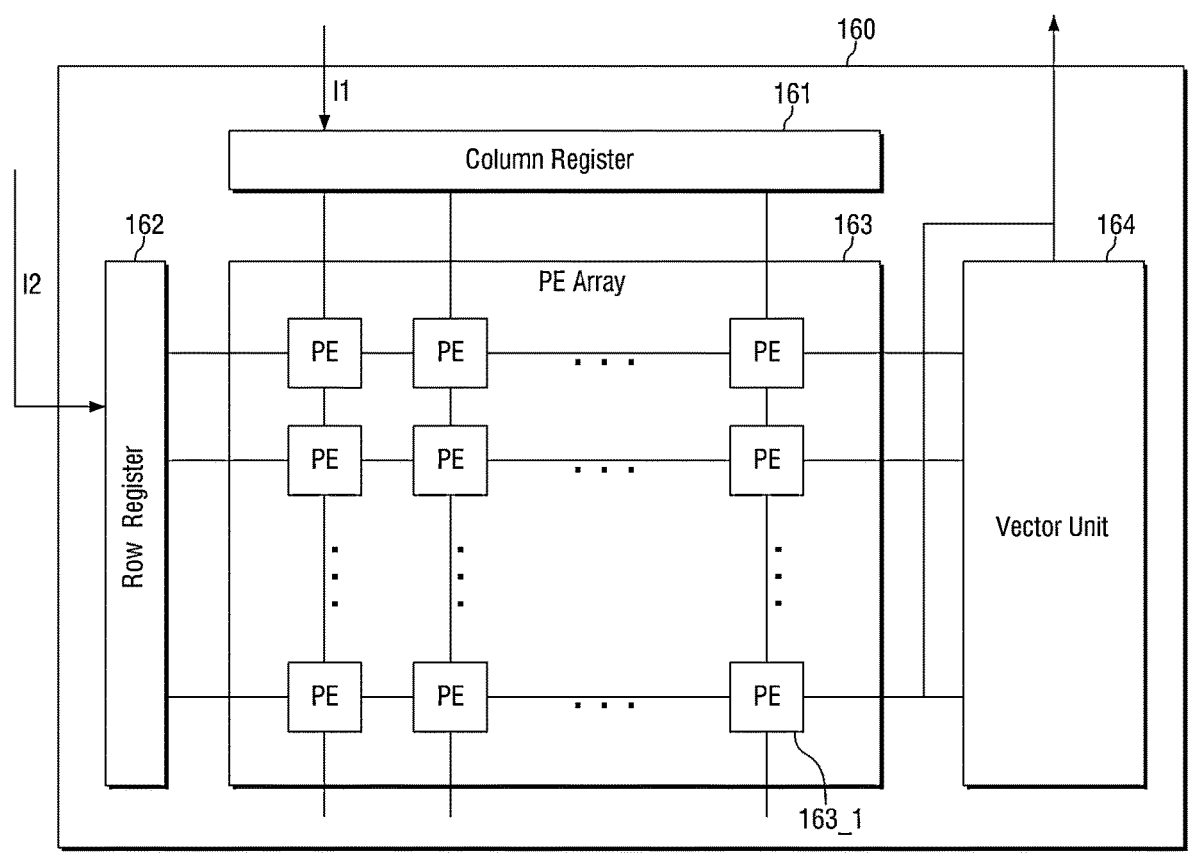
FIG. 9 is a block diagram for illustrating in detail the processing unit of FIG. 7.

FIG. 9 is a block diagram for illustrating in detail the processing unit of FIG. 7.

With reference to FIGS. 7 and 9, the processing unit 160 may include a PE array 163, a vector unit 164, a column register 161, and a row register 162.

The PE array 163 may receive the input activation Act_In and the weight and perform multiplication on them. In this case, the input activation Act_In and the weight may each be in the form of matrices and calculated via convolution. Through this, the PE array 163 may generate an output activation Act_Out. However, the present embodiment is not limited thereto. The PE array 163 may generate any number of different types of outputs other than the output activation Act_Out as well.

The PE array 163 may include at least one processing element 163_1. The processing elements 163_1 may be aligned with each other and may each perform multiplication on one input activation Act_In and one weight.

The PE array 163 may generate a partial sum obtained by summing values for each multiplication. This partial sum may be utilized as an output activation Act_Out. The PE array 163 performs two-dimensional matrix multiplications, and thus, may be referred to as a 2D matrix compute unit.

The vector unit 164 may perform one-dimensional calculations. The vector unit 164, together with the PE array 163, may perform deep learning calculations. Through this, the processing unit 160 may be specialized for necessary calculations. In other words, the neural core 100 has calculation modules, respectively, that perform a large amount of two-dimensional matrix calculations and one-dimensional calculations, and thus, can efficiently perform deep learning tasks.

The column register 161 may receive a first input I1. The column register 161 may receive the first input I1, divide it, and provide them to each column of the processing element PE.

The row register 162 may receive a second input I2. The row register 162 may receive the second input I2, divide it, and provide them to each row of the processing element PE.

The first input I1 may be the input activation Act_In or the weight. The second input I2 may be a value, which is not the first input I1, out of the input activation Act_In or the weight. Alternatively, the first input I1 and the second input I2 may be values other than the input activation Act_In and the weight.

Figure 10:
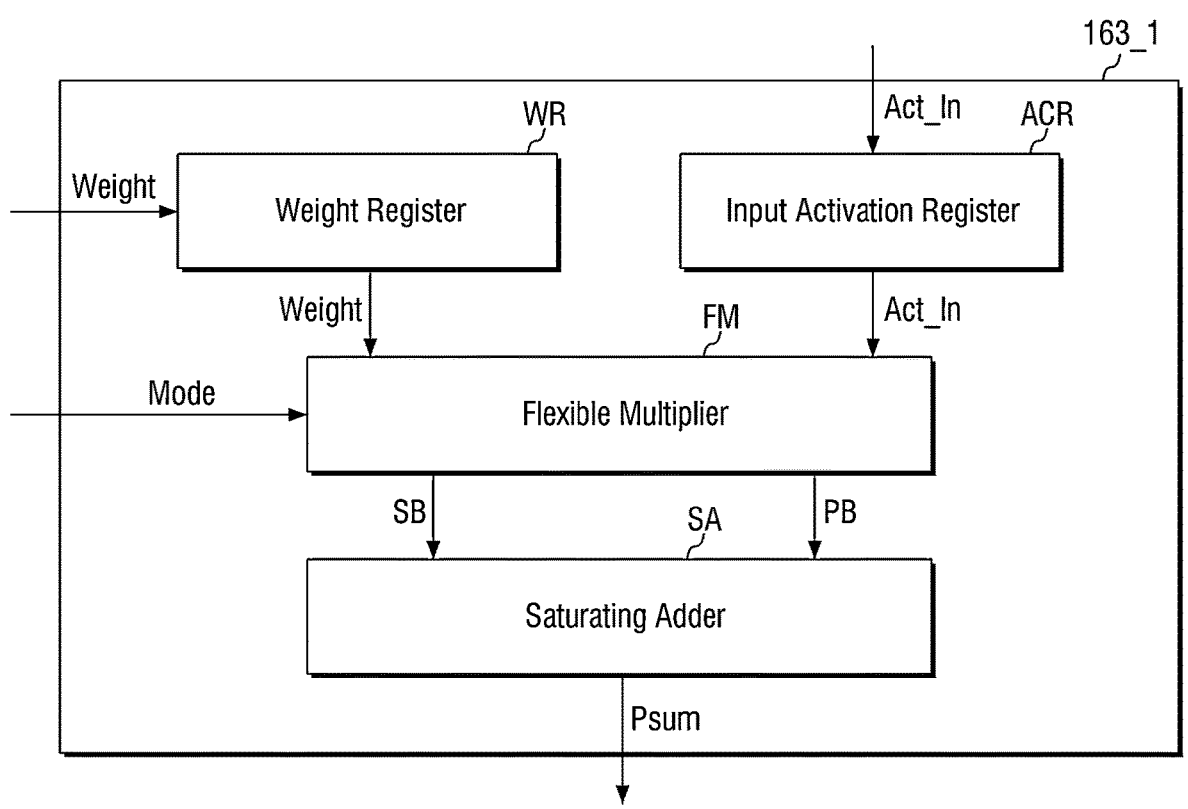
FIG. 10 is a block diagram for illustrating in detail the processing element of FIG. 9.

FIG. 10 is a block diagram for illustrating in detail the processing element of FIG. 9.

Referring to FIG. 10, the processing element 163_1 may include a weight register WR, an input activation register ACR, a flexible multiplier FM, and a saturating adder SA.

The weight register WR may receive and store a weight that is inputted to the processing element 163_1. The weight register WR may transmit the weight to the flexible multiplier FM.

The input activation register ACR may receive and store an input activation Act_In. The input activation register ACR may transmit the input activation Act_In to the flexible multiplier FM.

The flexible multiplier FM may receive the weight and the input activation Act_In. The flexible multiplier FM may perform multiplication of the weight and the input activation Act_In. The flexible multiplier FM may receive a mode signal Mode. In this case, the mode signal Mode may be a signal regarding which precision out of a first precision and a second precision is to be used to perform a calculation.

The flexible multiplier FM may output the multiplication result as result data. The result data may include a sign bit SB and a product bit PB. In this case, the sign bit SB may be a bit indicating the sign of the result data. The product bit PB may be a bit indicating the magnitude of the result data. The flexible multiplier FM may output the result data with the first precision or the second precision.

The saturating adder SA may receive the result data. In other words, the saturating adder SA may receive the sign bit SB and the product bit PB. The saturating adder SA may receive the result data multiple times and accumulate them. Accordingly, the saturating adder SA may generate partial sums Psum. Such partial sums Psum may be outputted from each processing element 163_1 and finally summed up. However, the present embodiment is not limited thereto.

Figure 11:
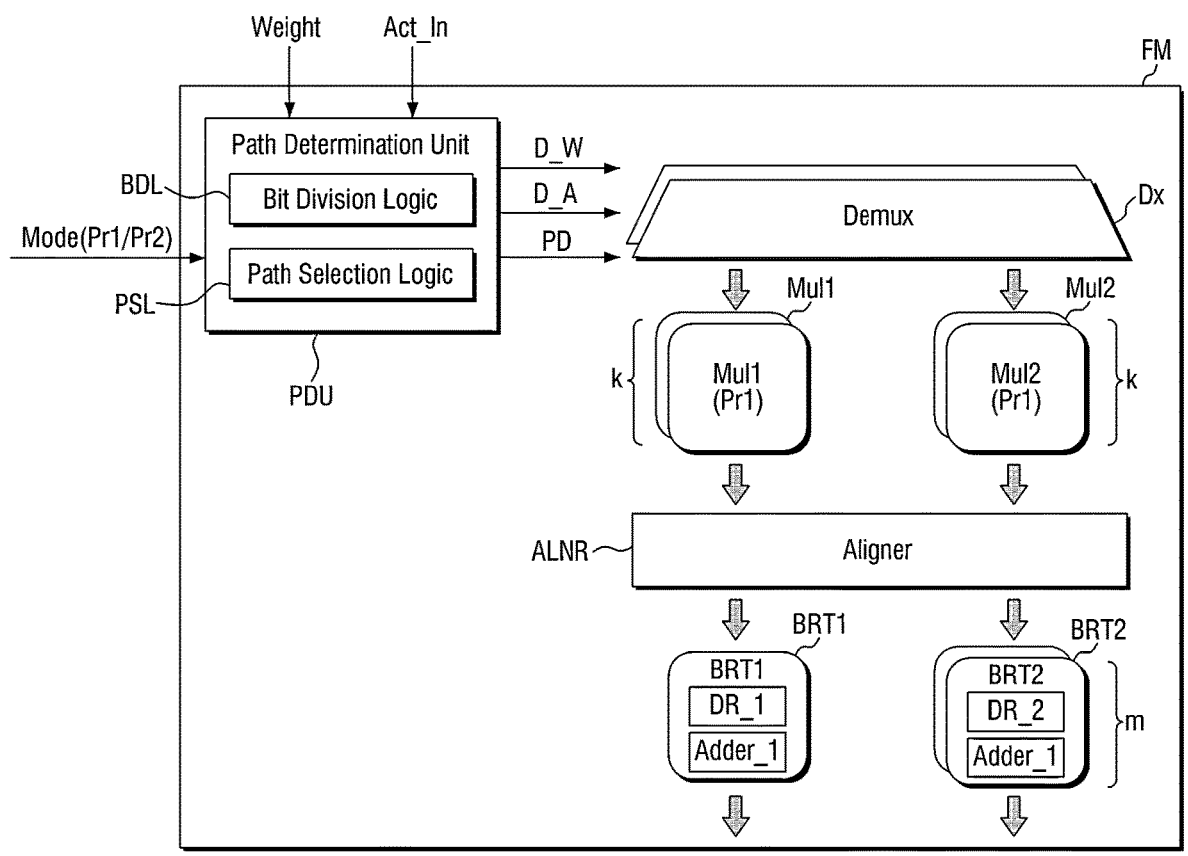
FIG. 11 is a block diagram specifically illustrating the flexible multiplier of FIG. 10.

FIG. 11 is a block diagram specifically illustrating the flexible multiplier of FIG. 10.

Referring to FIG. 11, the flexible multiplier FM includes a path determination unit PDU, a demultiplexer Dx, a first multiplier Mul1, a second multiplier Mul2, an aligner ALNR, a first booth reduction tree BRT1, and a second booth reduction tree BRT2.

The path determination unit PDU may receive a weight Weight and an input activation Act_In. In other words, the path determination unit PDU may receive the weight from the weight register WR and receive the input activation Act_In from the input activation register ACR.

In addition, the path determination unit PDU may receive the calculation mode signal Mode. The calculation mode signal Mode may be associated with a precision for calculating the weight Weight and the input activation Act_In provided to the path determination unit PDU. For example, the calculation mode signal Mode may include a first mode signal associated with a first precision Pr1 and a second mode signal associated with a second precision Pr2.

The path determination unit PDU may include a bit division logic BDL and a path selection logic PSL. The bit division logic BDL may divide the weight Weight and the input activation Act_In to generate a divided weight D_W and a divided input activation D_A. In other words, the bit division logic BDL may divide the weight in units of the first precision Pr1 to generate a plurality of divided weights D_W. In addition, the bit division logic BDL may divide the input activation Act_In in units of the first precision Pr1 to generate a plurality of divided input activations D_A. For example, when each of the weight Weight and input activation Act_In is 32-bit data and the first precision Pr1 is INT4 (a 4-bit integer), the bit division logic BDL may divided the weight into eight 4-bit divided weights D_W and divide the input activation Act_In into eight 4-bit divided weights D_W.

According to some embodiments, the bit division logic BDL may add an extra bit for sign fixing to at least some of the divided weights D_W and the divided input activations D_A divided into a unit of the first precision Pr1 in response to the calculation mode signal Mode.

According to some embodiments, that the calculation mode signal Mode is a second mode signal indicates that calculations of the weight in a unit of the second precision Pr2 and the input activation Act_In in a unit of the second precision Pr2 are required. However, even when the calculation mode signal Mode is the second mode signal, the bit division logic BDL may divide each of the weight Weight and the input activation Act_In into a unit of the first precision Pr1 to generate the divided weight D_W and the divided input activation D_A. In this case, the divided weight D_W may indicate a high-order divided weight D_W or a low-order divided weight D_W. In addition, the divided input activation D_A may indicate a high-order divided input activation D_A or a low-order divided input activation D_A. In this case, the high-order divided weight D_W indicates a high-order bit among the weights in units of the second precision Pr2 that requires calculation, and the low-order divided weight D_W indicates a low-order bit among the weights in units of the second precision Pr2 that requires calculation. In addition, the high-order divided input activation D_A indicates a high-order bit among the input activations D_A in units of the second precision Pr2 that requires calculation, and the low-order divided input activation D_A indicates a low-order bit among the input activations D_A in units of the second precision Pr2 that requires calculation.

When the calculation mode signal Mode is the second mode signal, the weight Weight and the input activation Act_In that have to be actually calculated are units of the second precision Pr2, but the bit division logic BDL according to some embodiments of the present disclosure may divide the weight Weight in units of the second precision Pr2 into the high-order divided weight D_W in units of the first precision Pr1 and the low-order divided weight D_W in units of the first precision Pr1 to perform calculation. Likewise, the bit division logic BDL may divide the input activation Act_In in units of the second precision Pr2 into the high-order divided input activation D_A in units of the first precision Pr1 and the low-order divided input activation D_A in units of the first precision Pr1.

In other words, the flexible multiplier FM may generate the same result data as the calculation result data of the weight Weight and the input activation Act_In in units of the second precision Pr2 by using the high-order divided weight D_W, the low-order divided weight D_W, the high-order divided input activation D_A, and the low-order divided input activation D_A. That is, the flexible multiplier FM may replace the calculation of the weight Weight and the input activation Act_In in units of the second precision Pr2 with the high-order divided weight D_W, the low-order divided weight D_W, the high-order divided input activation D_A, and the low-order divided input activation D_A in units of the first precision Pr1. In this case, the low-order divided weight D_W and the low-order divided input activation D_A indicate low-order bits of the weight Weight and the input activation Act_In in units of the second precision Pr2 to be calculated. That is, the low-order divided weight D_W and the low-order divided input activation D_A may not have negative values. Therefore, it is necessary to fix signs for the low-order divided weight D_W and the low-order divided input activation D_A to a positive number, and thus, the bit division logic BDL may add an extra bit to each of the low-order divided weight D_W and the low-order divided input activation D_A.

For example, a case in which the first precision Pr1 is INT4 and the second precision Pr2 is INT8 (an 8-bit integer) and the calculation mode signal Mode is the second mode signal Mode (Pr2) is assumed. In order to calculate the 8-bit weight Weight and the 8-bit input activation Act_In in response to the second mode signal Mode (Pr2), the bit division logic BDL may generate a high-order 4-bit divided weight D_W and a low-order 5-bit divided weight D_W. In this case, the high-order 4-bit divided weight D_W may include 4 bits of a high order of the 8-bit weight Weight, and the low-order 5-bit divided weight D_W may include 4 bits of a low order of the 8-bit weight Weight. In this case, the most significant bit of the low-order 5-bit divided weight D_W may be composed of an extra bit and may be '0' indicating a positive number. Likewise, the bit division logic BDL may generate a high-order 4-bit divided input activation D_A and a low-order 5-bit divided input activation D_A. In this case, the high-order 4-bit divided input activation D_A may include the 4 bits of a high order of the 8-bit input activation Act_In, and the low-order 5-bit divided input activation D_A may include 4 bits of a low order of the input activation Act_In. In this case, the most significant bit of the low-order 5-bit input activation D_A may be composed of an extra bit and may be '0' indicating a positive number. The flexible multiplier FM may generate the same result data as calculation of the 8-bit weight Weight and the 8-bit input activation Act_In by using the high-order 4-bit divided weight D_W, the low-order 5-bit divided weight D_W, the high-order 4-bit divided input activation D_A, and the low-order 5-bit divided input activation D_A.

The path selection logic PSL may generate a path determination signal PD based on the calculation mode signal Mode. The path selection logic PSL may provide the generated path determination signal PD to the demultiplexer Dx. The path determination signal PD may be a signal for determining a multiplier to which the divided weight D_W and the divided input activation D_A are to be provided. According to some embodiments, when the calculation mode signal Mode is a first mode signal, the path selection logic PSL may generate the first path determination signal as the path determination signal PD. In addition, when the calculation mode signal Mode is a second mode signal, the path selection logic PSL may generate the second path determination signal as the path determination signal PD.

The demultiplexer Dx may receive the divided weight D_W and the divided input activation D_A from the path determination unit PDU. In addition, the demultiplexer Dx may receive the path determination signal PD from the path determination unit PDU. The demultiplexer Dx may provide the divided weight D_W and the divided input activation D_A only to the first multiplier Mul1 or to the first multiplier Mul1 and the second multiplier Mul2 in response to the path determination signal PD. According to some embodiments, when the path determination signal PD is a first path determination signal, the demultiplexer Dx may provide both the divided weight D_W and the divided input activation D_A to the first multiplier Mul1. When the path determination signal PD is a second path determination signal, the demultiplexer Dx may provide some of the divided weights D_W and the divided input activations D_A to the first multiplier Mul1 and provide the others to the second multiplier Mul2.

The first multiplier Mul1 may be a multiplication operator of the first precision Pr1. The first multiplier Mul1 may be composed of k (k is a natural number) multipliers. In addition, the second multiplier Mul2 may be a multiplication operator of the first precision Pr1. The second multiplier Mul2 may be composed of k multipliers. For example, when each of the weight Weight and the input activation Act_In is 32-bit data and when the first multiplier Mul1 and the second multiplier Mul2 are INT4 multiplication operators, the flexible multiplier FM may include eight first multipliers Mul1 and eight second multipliers Mul2. The second multiplier Mul2 may be substantially the same as the first multiplier Mul1, but embodiments are not limited thereto.

According to some embodiments, the above-described extra bit may be added to the divided weight D_W and the input activation Act_In, at least some of the first multipliers Mul1 and the second multipliers Mul2 may support calculation of digits greater by one bit than the precision Pr1. For example, at least some of the first multipliers Mul1 and the second multipliers Mul2 may be INT4 multiplication operators supporting calculation of 5 bits. However, embodiments are not limited to the terms, and an INT4 multiplication operator supporting the calculation of 5 bits may also be referred to as an INT5 multiplication operator.

According to some embodiments, the first multiplier Mul1 and the second multiplier Mul2 may perform a multiplication operation by using a Booth algorithm.

The aligner ALNR may receive a first partial multiplication group generated by the first multiplier Mul1 and a second partial multiplication group generated by the second multiplier Mul2. The aligner ALNR may group the first partial multiplication group and the second partial multiplication group into a first alignment partial multiplication group and a second alignment partial multiplication group, respectively, based on digits of the first partial multiplication group and the second partial multiplication group. In other words, the aligner ALNR may generate the first alignment partial multiplication group by grouping some groups having the same digit in the first partial multiplication group and the second partial multiplication group and generate a second alignment partial multiplication group by grouping the others. In other words, the aligner ALNR may generate the first alignment partial multiplication group by grouping partial multiplication groups having a first digit and generate the second alignment partial multiplication group by grouping partial multiplication groups having a second digit. Accordingly, the partial multiplication groups included in the first alignment partial multiplication group may have the same digit, and the partial multiplication groups included in the second alignment partial multiplication group may have the same digit. Accordingly, according to some embodiments, by aligning digits of the partial multiplication group by using the aligner ALNR, digits of an addition operation of the partial multiplication group to be performed later may be reduced, and thus, complexity of an addition operator may be reduced.

The first booth reduction tree BRT1 and the second booth reduction tree BRT2 may generate result data by performing an addition operation on the generated partial multiplication groups. The first booth reduction tree BRT1 may include a first depth reducer DR_1 and a first adder Adder_1. The second booth reduction tree BRT2 may include a second depth reducer DR_2 and a second adder Adder_2. The second booth reduction tree BRT2 may be composed of m booth reduction trees. For example, when the first precision Pr1 is INT4 and the second precision Pr2 is INT8 and the weight Weight and the input activation Act_In are each 32-bit data, the second booth reduction tree BRT2 may be composed of four booth reduction trees. However, embodiments are not limited thereto, and the number of second booth reduction trees BRT2 may be variously changed according to hardware design.

The first depth reducer DR_1 and the second depth reducer DR_2 may reduce depths of partial multiplication groups. According to some embodiments, the second depth reducer DR_2 and the second depth reducer DR_2 may reduce depths of partial multiplication groups by moving and modifying a sign extension bit. For the sake of convenience of description, a partial multiplication group having a reduced depth is referred to as a modified partial multiplication group. Detailed description thereof will be given below.

The first adder Adder_1 and the second adder Adder_2 may perform an addition operation on partial multiplication groups of which depths are reduced in the first depth reducer DR_1 and the second depth reducer DR_2, respectively. According to some embodiments, the first adder Adder_1 and the second adder Adder_2 may perform an addition operation on partial multiplication groups having reduced depths by using a 3:2 carry save adder (CSA). A calculation process of the flexible multiplier FM in a case in which the calculation mode signal Mode is a first mode signal will be described with reference to FIGS. 12 to 16.

Figure 12:
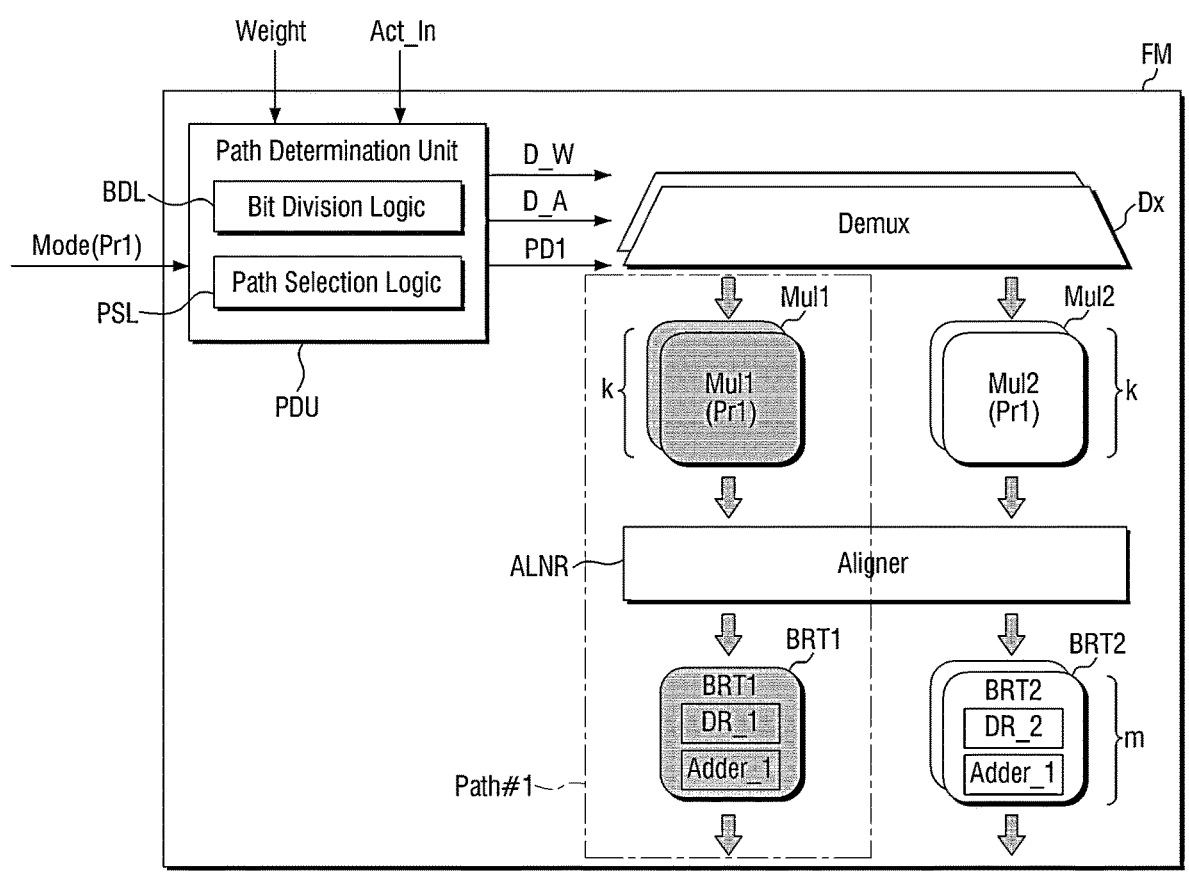
FIG. 12 is a diagram illustrating an operation of a flexible multiplier according to some embodiments of the present disclosure when a calculation mode signal is a first mode signal.

FIG. 12 is a diagram illustrating an operation of a flexible multiplier according to some embodiments of the present disclosure when a calculation mode signal is a first mode signal.

Referring to FIG. 12, the path determination unit PDU may receive the weight Weight and the input activation Act_In. In addition, the path determination unit PDU may receive the first mode signal Mode(Pr1) as the calculation mode signal Mode.

The bit division logic BDL may divide the weight Weight and the input activation Act_In in units of the first precision Pr1. The weight Weight divided in units of the first precision Pr1 is referred to as the divided weight D_W, and the input activation Act_In divided in units of the first precision Pr1 is referred to as the divided input activation D_A. In other words, the bit division logic BDL may divide the weight Weight and the input activation Act_In in units of the first precision Pr1 to generate the divided weight D_W and the divided input activation D_A.

The path selection logic PSL may generate the first path determination signal PD1 in response to the first mode signal Mode(Pr1). The first path determination signal PD1 may control the flexible multiplier FM to perform calculation along a first path Path #1. The first path Path #1 may be a path through which the first multiplier Mul1 and the first booth reduction tree BRT1 operate.

The path determination unit PDU may provide the divided weight D_W, the divided input activation D_A, and the first path determination signal PD1 to the demultiplexer Dx. The demultiplexer Dx may provide the divided weight D_W and the divided input activation D_A to the first multiplier Mul1 in response to the first path determination signal PD1.

The first multiplier Mul1 may perform multiplication of the divided weight D_W and the divided input activation D_A to generate a partial multiplication group. According to some embodiments, the first multiplier Mul1 may calculate the divided weight D_W and the divided input activation D_A by using the Booth algorithm to generate a partial multiplication group.

Figure 13:
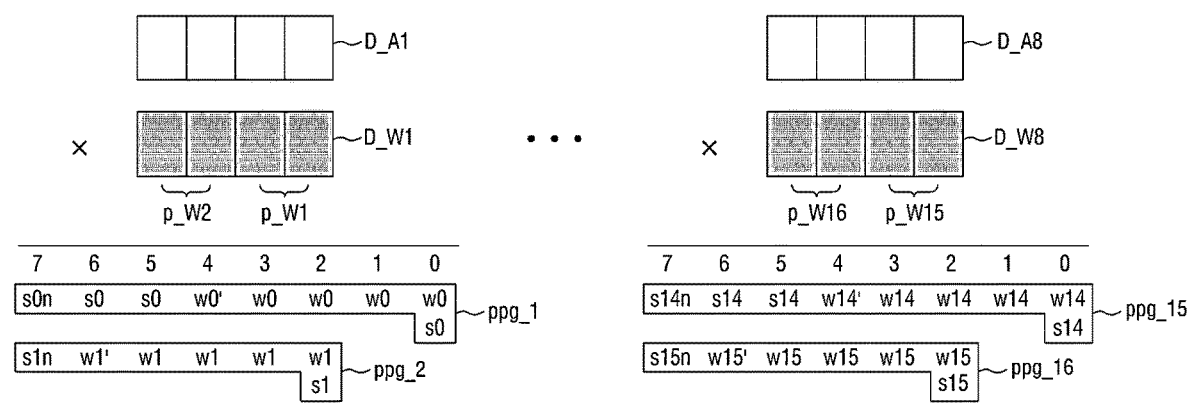
FIG. 13 is a diagram illustrating a process in which a first multiplier calculates a divided weight and a divided input activation by using a Booth algorithm, according to some embodiments of the present disclosure.
Figure 14:
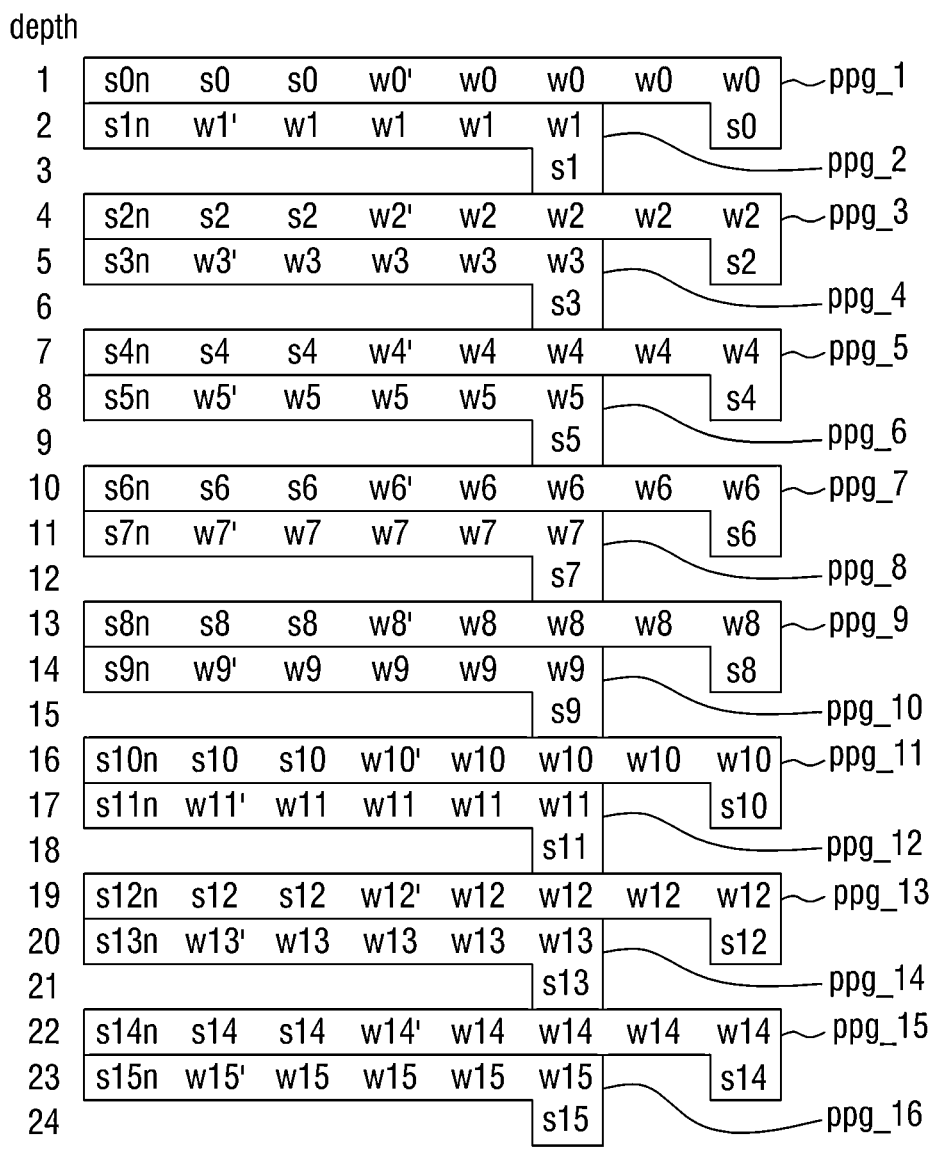

The partial multiplication group generated by the first multiplier Mul1 may be provided to the first booth reduction tree BRT1. The first booth reduction tree BRT1 may reduce a depth of the partial multiplication group generated by the first multiplier Mul1 and generate result data through an addition operation on the partial multiplication group with the reduced depth. In other words, the first depth reducer DR_1 included in the first booth reduction tree BRT1 may reduce the depth of the partial multiplication group generated by the first multiplier Mul1 to generate a modified partial multiplication group, and the first adder Adder_1 may perform an addition operation on the modified partial multiplication groups by using a 3:2 CSA to generate result data. The result data may be provided to a saturating adder SA, and the saturating adder SA may generate a partial sum Psum by using the result data. For an exemplary description, FIGS. 13 to 15 may be further referred to. Referring to FIGS. 13 to 15, it is assumed that the weight Weight and the input activation Act_In are each 32-bit data, the first mode signal Mode(Pr1) indicates INT4, and k is 8.

FIG. 13 is a diagram illustrating a process in which a first multiplier calculates a divided weight and a divided input activation by using a Booth algorithm, according to some embodiments of the present disclosure.

Referring to FIGS. 12 and 13, k (8 in this example) first multipliers Mul1 may respectively receive a first divided weight D_W1 to an eighth divided weight D_W8. In addition, eight first multipliers Mul1 may respectively receive the first divided input activation D_A1 to the eighth divided input activation D_A8. For example, the first multiplier Mul1 may receive the first divided weight D_W1 and the first divided input activation D_A1 and perform a multiplication operation thereon. In addition, the eighth first multiplier Mul1 may receive the eighth divided weight D_W8 and the eighth divided input activation D_A8 and perform a multiplication operation thereon. In other words, the eight first multipliers Mul1 may perform parallel/independent calculation of each of the first divided weights D_W1 to the eighth divided weights D_W8 and the first divided input activations D_A1 to the eighth divided input activations D_A8.

The first multiplier Mul1 may calculate the divided weight D_W and the divided input activation D_A by using the Booth algorithm. For example, the first multiplier Mul1 may calculate the first divided input activation D_A1 that is a multiplicand and the first divided weight D_W1 that is a multiplier to generate a first partial multiplication group ppg_1 and a second partial multiplication group ppg_2.

For example, the first multiplier Mul1 may calculate the first divided input activation D_A1 and a first portion p_W1 of the first divided weight D_W1 to generate the first partial multiplication group ppg_1. The first partial multiplication group ppg_1 may have digits of 8 bits and a depth of 2. In addition, the first multiplier Mul1 may calculate the first divided input activation D_A1 and a second portion p_W2 of the first divided weight D_W1 to generate the second partial multiplication group ppg_2. The second partial multiplication group ppg_2 may have digits of 8 bits and a depth of 2.

Similarly, the first multiplier Mul1 may calculate the eighth divided input activation D_A8 and a 15th portion p_W15 of the eighth divided weight D_W8 to generate a 15th partial multiplication group ppg_15. The 15th partial multiplication group ppg_15 may have digits of 8 bits and a depth of 2. In addition, the first multiplier Mul1 may calculate the eighth divided input activation D_A8 and a 16th portion p_W16 of the first divided weight D_W1 to generate a 16th partial multiplication group ppg_16. The 16th partial multiplication group ppg_16 may have digits of 8 bits and a depth of 2.

In the first partial multiplication group ppg_1, w0 and w0' indicate partial multiplication of the first divided input activation D_A1 and the first portion p_W1 of the first divided weight D_W1. w0' indicates the most significant bit of partial multiplication of the first divided input activation D_A1 and the first portion p_W1 of the first divided weight D_W1. w0 of the respective digits may have the same value or different values. In addition, s0 is a sign extension value of the most significant bit w0' of partial multiplication of the first divided input activation D_A1 and the first portion p_W1 of the first divided weight D_W1. w0' and s0 may have the same value. s0n may be an inverted value of s0.

In the second partial multiplication group ppg_2, w1 and w1' indicate partial multiplication of the first divided input activation D_A1 and the second portion p_W2 of the first divided weight D_W1. w1' indicates the most significant bit of the partial multiplication of the first divided input activation D_A1 and the second portion p_W2 of the first divided weight D_W1. w1 of the respective digits may have the same value or different values. In addition, s1 is a sign extension value of the most significant bit w1' of the partial multiplication of the first divided input activation D_A1 and the second portion p_W2 of the first divided weight D_W1. w1' and s1 may have the same value. s1n may be an inverted value of s1.

Similarly, in the 15th partial multiplication group ppg_15, w14 and w14' indicate partial multiplication of the eighth divided input activation D_A8 and the 15th portion p_W15 of the eighth divided weight D_W8. w14' indicates the most significant bit of the partial multiplication of the eighth divided input activation D_A8 and the 15th portion p_W15 of the eighth divided weight D_W8. w14 of the respective digits may have the same value or different values. In addition, s14 is a sign extension value of the most significant bit w14' of the partial multiplication of the eighth divided input activation D_A8 and the 15th portion p_W15 of the eighth divided weight D_W8. w14' and s14 may have the same value. s14n may be an inverted value of s14.

In the 16th partial multiplication group ppg_16, w16 and w16' indicate partial multiplication of the eighth divided input activation D_A8 and the 16th portion p_W16 of the eighth divided weight D_W8. w16' indicates the most significant bit of the partial multiplication of the eighth divided input activation D_A8 and the 16th portion p_W16 of the eighth divided weight D_W8. w16 of the respective digits may have the same value or different values. In addition, s16 is a sign extension value of the most significant bit w16' of the partial multiplication of the eighth divided input activation D_A8 and the 16th portion p_W16 of the eighth divided weight D_W8. w16' and s16 may have the same value. s16n may be an inverted value of s16.

The first multiplier Mul1 may calculate the divided weight D_W and the divided input activation D_A and provide the calculated value to the first booth reduction tree BRT1. In other words, a plurality of first multipliers Mul1 may respectively generate the first partial multiplication group ppg_1 to the 16th partial multiplication group ppg_16 and provide the generated partial multiplication groups to the first booth reduction tree BRT1. The first booth reduction tree BRT1 may generate result data by using the first partial multiplication group ppg_1 to the 16th partial multiplication group ppg_16. Further description will be made with further reference to FIGS. 14 and 15.

FIGS. 14 and 15 are diagrams illustrating a process of reducing depths of a first partial multiplication group to a 16th partial multiplication group, according to some embodiments of the present disclosure.

A depth of a partial multiplication group input to a calculator may eventually be associated with the number of iterations of calculation. In addition, a relatively great depth of the partial multiplication group input to the calculator may indicate that a register having a relatively large storage capacity is required. Accordingly, it is necessary to reduce hardware complexity and calculation cost by optimizing the depth of the partial multiplication groups input to the calculator.

Referring to FIGS. 12 and 14, the first partial multiplication group ppg_1 to the 16th partial multiplication group ppg_16 each have a depth of 2, but when the first partial multiplication group ppg_1 to the 16th partial multiplication group ppg_16 are appropriately aligned, depths of all of the first partial multiplication group ppg_1 to the 16th partial multiplication group ppg_16 may be aligned to 24. In this case, referring to the third, sixth, ninth, 12th, 15th, 18th, 21st, and 24th depths, there is only one value requiring calculation in each depth. Accordingly, an embodiment in which depths are reduced by appropriately modifying values of the third, sixth, ninth, 12th, 15th, 18th, 21st, and 24th depths will be described with reference to FIG. 15.

Referring to FIGS. 14 and 15, the first depth reducer DR_1 may generate the first modified partial multiplication group rppg_1 having a depth of 1 by modifying a depth and digits of the first partial multiplication group ppg_1. For example, the first depth reducer DR_1 may generate the first modified partial multiplication group rppg_1 by extending s0 of the second depth in the first partial multiplication group ppg_1 to a low-order bit of a first depth.

In addition, the first depth reducer DR_1 may generate the second modified partial multiplication group rppg_2 having a depth of 1 by modifying a depth and digits of the second partial multiplication group ppg_2. For example, the first depth reducer DR_1 may generate the second modified partial multiplication group rppg_2 by extending s1 of a second depth in the second partial multiplication group ppg_2 to a low-order bit of the first depth. Similarly, the first depth reducer DR_1 may generate the third modified partial multiplication group rppg_3 to the 16th modified partial multiplication group rppg_16 by modifying the third partial multiplication group ppg_3 to the 16th partial multiplication group ppg_16.

As such, the first depth reducer DR_1 may reduce a depth from 24 to 16 by about 30% or more by modifying the first partial multiplication group ppg_1 to the 16th partial multiplication group ppg_16 into the first modified partial multiplication group rppg_1 to the 16th modified partial multiplication group rppg_16.

The first modified partial multiplication group rppg_1 to the 16th modified partial multiplication group rppg_16 generated by the first depth reducer DR_1 may be provided to the first adder Adder_1. The first adder Adder_1 may generate result data by adding the first modified partial multiplication group rppg_1 to the 16th modified partial multiplication group rppg_16 to each other. The first adder Adder_1 may calculate the first modified partial multiplication group rppg_1 to the 16th modified partial multiplication group rppg_16 which are reduced in depth, and thus, the first adder Adder_1 may be implemented with a hardware having a relatively simpler structure than when there is no first depth reducer DR_1.

According to some embodiments, when the calculation mode signal Mode is the first mode signal Mode(Pr1), the aligner ALNR may provide the partial multiplication group generated by the first multiplier Mul1 to the first booth reduction tree BRT1 without performing a separate operation. However, embodiments are not limited thereto, and, unlike FIG. 12, when the calculation mode signal Mode is the first mode signal Mode(Pr1), a partial multiplication group generated by the first multiplier Mul1 may also be provided to the first booth reduction tree BRT1 through a separate path without passing through the aligner ALNR. Next, a calculation process of the flexible multiplier FM in a case in which the calculation mode signal Mode is the second mode signal will be described with reference to FIGS. 16 to 25.

Figure 16:
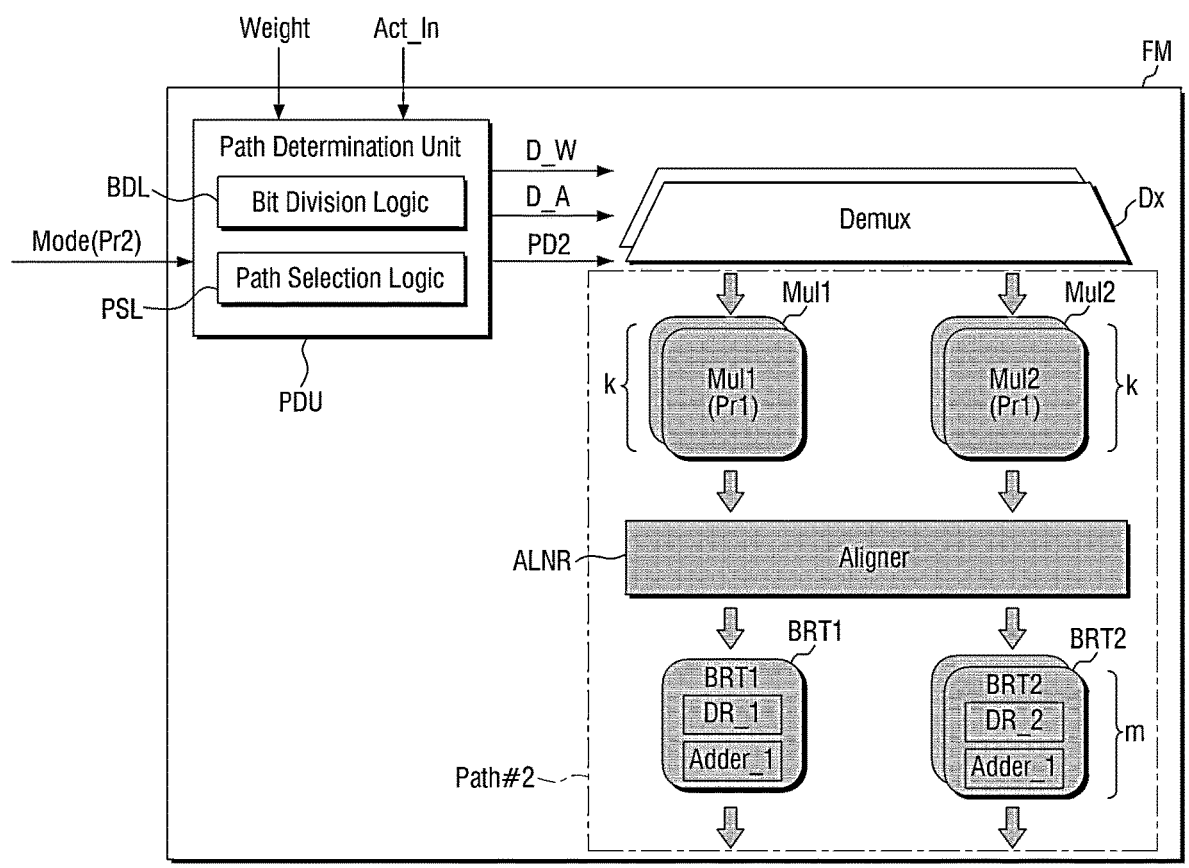
FIG. 16 is a diagram illustrating an operation of a flexible multiplier according to some embodiments of the present disclosure when a calculation mode signal is a second mode signal.

FIG. 16 is a diagram illustrating an operation of a flexible multiplier according to some embodiments of the present disclosure when a calculation mode signal is a second mode signal.

Referring to FIG. 16, the path determination unit PDU may receive the weight Weight and the input activation Act_In. In addition, the path determination unit PDU may receive the second mode signal Mode(Pr2) as the calculation mode signal Mode.

The bit division logic BDL may divide the weight Weight and the input activation Act_In in units of the first precision Pr1. In other words, the bit division logic BDL may divide the weight Weight and the input activation Act_In in units of the first precision Pr1 to generate the divided weight D_W and the divided input activation D_A. For example, the divided weight D_W may indicate any one of a first divided weight to an eighth divided weight. In addition, the divided input activation D_A may indicate any one of a first divided input activation to an eighth divided input activation.

The path selection logic PSL may generate the second path determination signal PD2 in response to the second mode signal Mode(Pr2). The second path determination signal PD2 may control the flexible multiplier FM to perform calculation along the second path Path #2. In the second path Path #2, the first multiplier Mul1, the second multiplier Mul2, the aligner ALNR, the first booth reduction tree BRT1, and the second booth reduction tree BRT2 may operate.

The path determination unit PDU may provide the divided weight D_W, the divided input activation D_A, and the second path determination signal PD2 to the demultiplexer Dx. The demultiplexer Dx may provide the divided weight D_W and the divided input activation D_A to the first multiplier Mul1 and the second multiplier Mul2 in response to the second path determination signal PD2.

The first multiplier Mul1 may generate a partial multiplication group by multiplying some of the divided weight D_W and the divided input activation D_A to. According to some embodiments, the first multiplier Mul1 may generate a partial multiplication group by calculating some of the divided weight D_W and the divided input activation D_A by using a Booth algorithm. In addition, the second multiplier Mul2 may generate a partial multiplication group by multiplying some of the divided weight D_W and the divided input activation D_A. According to some embodiments, the second multiplier Mul2 may generate a partial multiplication group by calculating some of the divided weight D_W and the divided input activation D_A by using the Booth algorithm.

The partial multiplication groups generated by the first multiplier Mul1 and the second multiplier Mul2 may be provided to the aligner ALNR. The aligner ALNR may generate an aligned partial multiplication group by aligning digits of the partial multiplication group generated by the first multiplier Mul1 and digits of the partial multiplication group generated by the second multiplier Mul2. In other words, the aligner ALNR may align the partial multiplication group generated by the first multiplier Mul1 and the partial multiplication group generated by the second multiplier Mul2 based on digits of the partial multiplication group. The partial multiplication group aligned based on the digits is referred to as an aligned partial multiplication group. The aligner ALNR may provide the aligned partial multiplication groups to the first booth reduction tree BRT1 and the second booth reduction tree BRT2. In this case, the aligned partial multiplication group provided to the first booth reduction tree BRT1 may have a greater depth than the aligned partial multiplication group provided to the second booth reduction tree BRT2. Detailed description thereof is given below.

The first booth reduction tree BRT1 may reduce a depth of the aligned partial multiplication group provided by the aligner ALNR and generate first result data through addition operation on the aligned partial multiplication group having reduced depth. In other words, the first depth reducer DR_1 included in the first booth reduction tree BRT1 may reduce a depth for the aligned partial multiplication group provided by the aligner ALNR, and the first adder Adder_1 may generate first result data by performing addition operation on the aligned partial multiplication groups with reduced depths by using a 3:2 CSA. For the sake of convenience of description, the aligned partial multiplication group with the reduced depth is referred to as a modified aligned partial multiplication group.

In addition, the second booth reduction tree BRT2 may reduce the depth of the aligned partial multiplication group provided by the aligner ALNR and generate second result data through addition operation on the aligned modified partial multiplication groups. In other words, the second depth reducer DR_2 included in the second booth reduction tree BRT2 may reduce the depth of the aligned partial multiplication group provided by the aligner ALNR to generate the aligned modified partial multiplication group, and the second adder Adder_2 may generate second result data by performing addition operation on the aligned modified partial multiplication groups by using a 3:2 CSA.

According to some embodiments, a depth of the aligned partial multiplication group provided to the first booth reduction tree BRT1 may be greater than a depth of the aligned partial multiplication group provided to the second booth reduction tree BRT2. In other words, the first booth reduction tree BRT1 may perform more calculation than the second booth reduction tree BRT2. Accordingly, hardware complexity of the first booth reduction tree BRT1 may be greater than hardware complexity of the second booth reduction tree BRT2.

According to some embodiments, the second booth reduction tree BRT2 may be composed of m (m is a natural number) booth reduction trees. For example, when the first precision Pr1 is INT4 and the second precision Pr2 is INT8 and the weight Weight and input activation Act_In are each 32-bit data, four second booth reduction trees BRT2 may be implemented. For example, the aligner ALNR may generate five aligned partial multiplication groups, and the aligned partial multiplication group with the largest depth among the five aligned partial multiplication groups is provided to the first booth reduction tree BRT1, and the other four aligned partial multiplication groups may be provided to the second booth reduction tree BRT2.

The first result data and the second result data may be provided to the saturating adder SA, and the saturating adder SA may generate a partial sum Psum by using the first and second result data. For an exemplary description, FIGS. 17 to 25 are further referred to. Referring to FIGS. 17 to 25, it is assumed that the weight Weight and the input activation Act_In are each 32-bit data, the second mode signal Mode (Pr2) indicates INT8, and k is 8.

FIGS. 17 to 21 illustrate a process of converting a multiplication operation of 8-bit data into a multiplication operation of 4-bit data.

Figure 17:
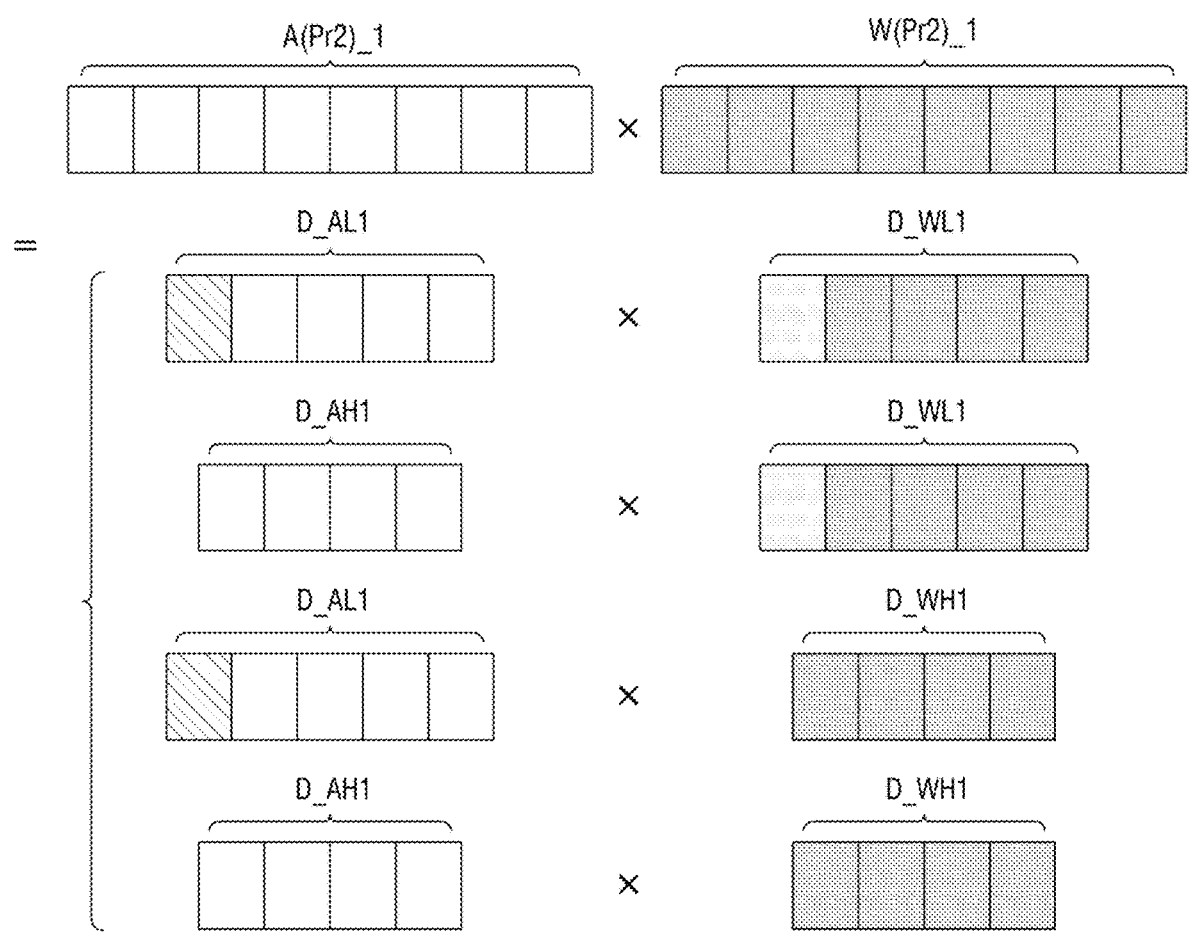
FIGS. 17 to 21 illustrate a process of converting a multiplication operation of 8-bit data into a multiplication operation of 4-bit data.

Referring to FIG. 17, the multiplication operation of 8-bit data may be replaced with the multiplication operation of 4-bit data. For example, a multiplication operation of an input activation A(Pr2)_1 of the second precision Pr2 and a weight W(Pr2)_1 of the second precision Pr2 may be performed by using a result of each of a multiplication operation of the first low-order divided input activation D_AL1 of 5 bits and the first low-order divided weight D_WL1 of 5 bits, a multiplication operation of the first low-order divided input activation D_AL1 of 5 bits and the first low-order divided weight D_WL1 of 4 bits, a multiplication operation of the first low-order divided input activation D_AL1 of 4 bits and the first low-order divided weight D_WL1 of 5 bits, and a multiplication operation of the first low-order divided input activation D_AL1 of 4 bits and the first low-order divided weight D_WL1 of 4 bits.

In this case, the most significant bit of the first low-order divided input activation D_AL1 of 5 bits may be an extended bit for sign fixing. For example, the most significant bit of the first low-order divided input activation D_AL1 may be '0' indicating a positive number. In addition, the other bits of the first low-order divided input activation D_AL1 of 5 bits may be the same as four values of a low order of the first low-order divided input activation D_A1 of 8 bits. Likewise, the most significant bit of the first low-order divided weight D_WL1 of 5 bits may be an extended bit for sign fixing. For example, the most significant bit of the first low-order divided weight D_WL1 may be '0' indicating a positive number. In addition, the other bits of the first low-order divided weight D_WL1 of 5 bits may be the same as four values of a low order of the first low-order divided weight D_W1 of 8 bits.

As described above, the multiplication operation of 8-bit data may be performed by being divided into the multiplication operation of 4-bit data. In this case, when the 8-bit data is divided into two 4-bit data, data including 4 bits of a low order has to constantly have a positive sign. Accordingly, the most significant bit of the first low-order divided input activation D_AL1 and the most significant bit of the first low-order divided weight D_WL1 needs to be fixed to data indicating a positive number.

The first high-order divided input activation D_AH1 may be the same as four values of a high order of the input activation A(Pr2)_1 of the second precision Pr2. In addition, the first high-order divided weight D_WH1 may be the same as four values of a high order of the weight W(Pr2)_1 of the second precision Pr2. In other words, the first high-order divided input activation D_AH1 may include four values of a high order of the input activation A(Pr2)_1 of the second precision Pr2, and the first low-order divided input activation D_AL1 may include four values of a low order of the input activation A(Pr2)_1 of the precision Pr2. Likewise, the first high-order divided weight D_WH1 may include four values of a high order of the weight W(Pr2)_1 of the second precision Pr2, and the first low-order divided weight D_WL1 may include four values of a low order of the weight W(Pr2)_1 of the second precision Pr2.

Figure 18:
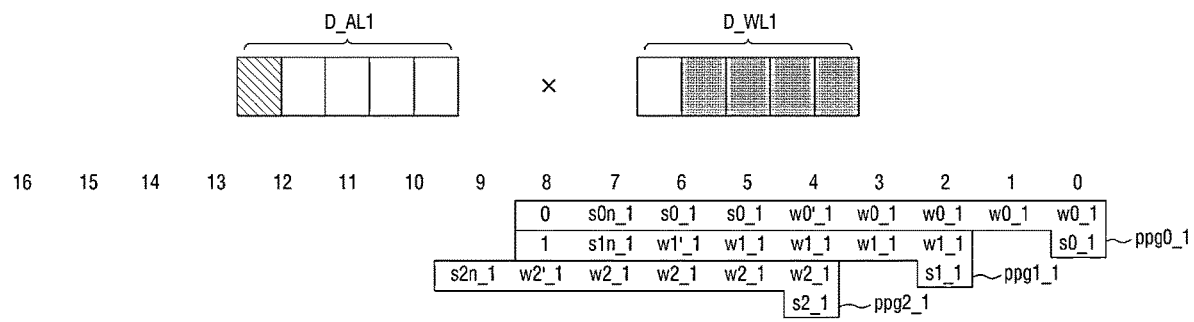

Referring to FIG. 18, one of the first multiplier Mul1 and the second multiplier Mul2 may perform a multiplication operation of the first low-order divided input activation D_AL1 and the first low-order divided weight D_WL1. One of the first multiplier Mul1 and the second multiplier Mul2 may perform a multiplication operation of the first low-order divided input activation D_AL1 and the first low-order divided weight D_WL1 to generate a (0-1)th partial multiplication group ppg0_1, a (1-1)th partial multiplication group ppg1_1, and a (2-1)th partial multiplication group ppg2_1.

In the (0-1)th partial multiplication group (ppg0_1) to the (2-1)th partial multiplication group (ppg2_1), w0_1, w0_1', w1_1, w1_1', w2_1, and w2_1' indicate a partial multiplication of the first low-order divided input activation D_AL1 and the first low-order divided weight D_WL1. w0_1', w1_1' and w2_1' indicate the most significant bit of each partial multiplication. w0_1, w1_1, and w2_1 of each digit may have the same value or different values. s0_1, s1_1, and s2_1 are sign-extended values of the most significant bits w0_1', w1_1', and w2_1' of the partial multiplication. Each of w0_1', w1_1', and w2_1' and each of s0_1, s1_1, and s2_1 may have the same value. s0_1n, s1_1n, and s2_1n may be inverted values of s0_1, s1_1, and s2_1, respectively.

Figure 19:
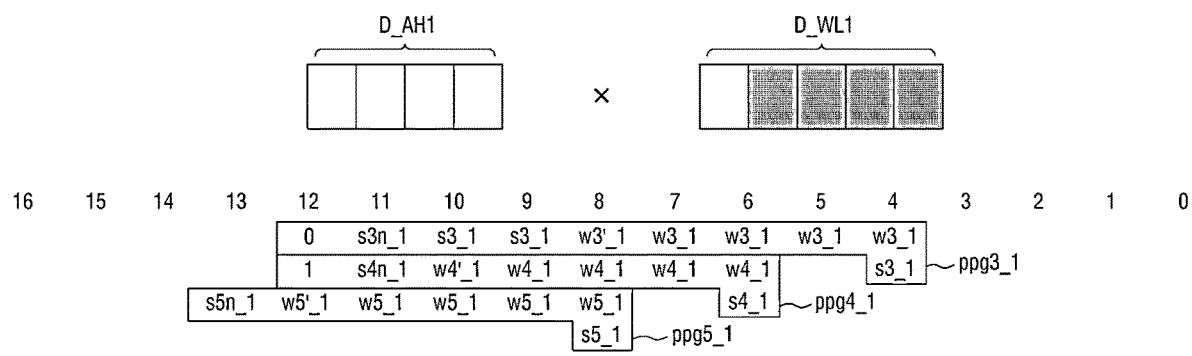

Referring to FIG. 19, one of the first multiplier Mul1 and the second multiplier Mul2 may perform a multiplication operation of the first high-order divided input activation D_AH1 and the first low-order divided weight D_WL1. One of the first multiplier Mul1 and the second multiplier Mul2 may generate a (3-1)th partial multiplication group ppg3_1, a (4-1)th partial multiplication group ppg4_1, and a (5-1)th partial multiplication group ppg5_1 by performing the multiplication operation of the first high-order divided input activation D_AH1 and the first low-order divided weight D_WL1.

In the (3-1)th partial multiplication group ppg3_1 to the (5-1)th partial multiplication group ppg5_1, w3_1, w3_1', w4_1, w4_1', w5_1, and w5_1' indicate partial multiplications of the first high-order divided input activation D_AH1 and the first low-order divided weight D_WL1. w3_1', w4_1', and w5_1' indicate the most significant bit of each partial multiplication. w3_1, w4_1, and w5_1 of each digit may have the same value or different values. s3_1, s4_1, and s5_1 are sign-extended values of the most significant bits w3_1', w4_1', and w5_1' of each partial multiplication. Each of w3_1', w4_1', and w5_1' may have the same value as each of s3_1, s4_1, and s5_1. s3_1n, s4_1n, and s5_1n may be inverted values of s3_1, s4_1, and s5_1, respectively.

Figure 20:
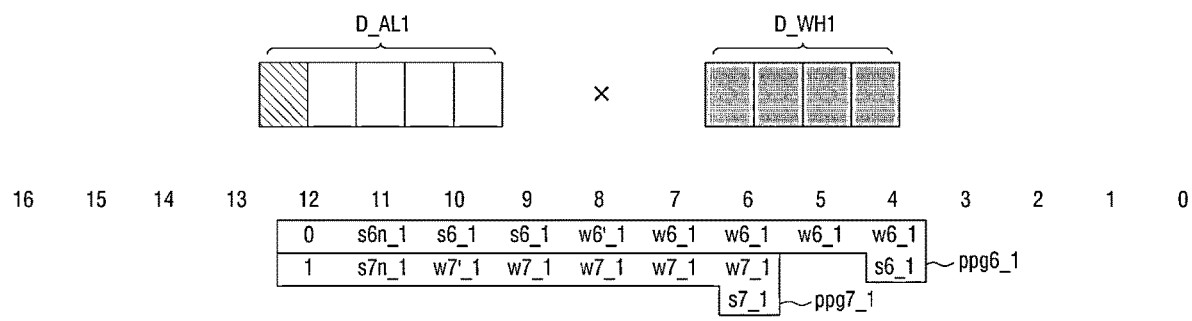

Referring to FIG. 20, one of the first multiplier Mul1 and the second multiplier Mul2 may perform a multiplication operation of the first low-order divided input activation D_AL1 and the first high-order divided weight D_WH1. One of the first multiplier Mul1 and the second multiplier Mul2 may generate a (6-1)th partial multiplication group ppg6_1 and a (7-1)th partial multiplication group ppg7_1 by performing the multiplication operation of the first low-order divided input activation D_AL1 and the first high-order divided weight D_WH1.

In the (6-1)th partial multiplication group ppg6_1 and the (7-1)th partial multiplication group ppg7_1, w6_1, w6_1', w7_1, and w7_1' indicate partial multiplications of the first low-order divided input activation D_AL1 and the first high-order divided weight D_WH1. w6_1' and w7_1' indicate the most significant bit of each partial multiplication. w6_1 and w7_1 of each digit may have the same value or different values. s6_1 and s7_1 are sign-extended values of the most significant bits w6_1' and w7_1' of each partial multiplication. Each of w6_1' and w7_1' may have the same value as each of s6_1 and s7_1. s6_1n and s7_1n may be inverted values of s6_1 and s7_1, respectively.

Figure 21:
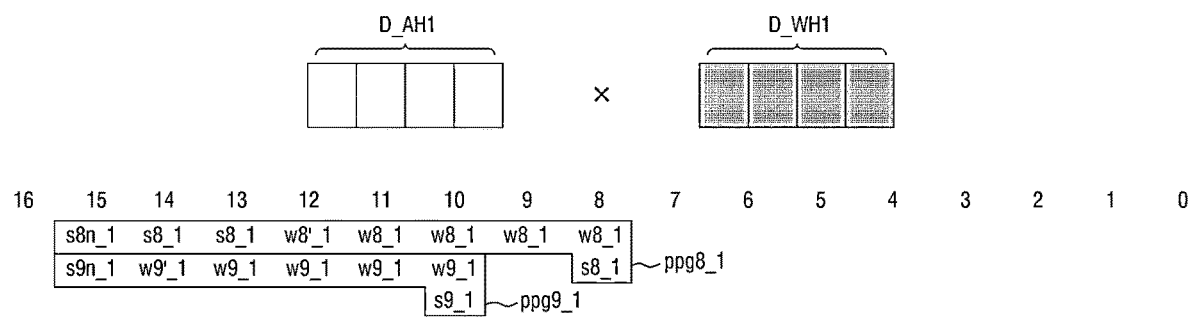

Referring to FIG. 21, one of the first multiplier Mul1 and the second multiplier Mul2 may perform a multiplication operation of the first high-order divided input activation D_AH1 and the first high-order divided weight D_WH1. One of the first multiplier Mul1 and the second multiplier Mul2 may generate a (8-1)th partial multiplication group ppg8_1 and a (9-1)th partial multiplication group ppg9_1 by performing the multiplication operation of the first high-order divided input activation D_AH1 and the first high-order divided weight D_WH1.

In the (8-1)th partial multiplication group ppg8_1 and the (9-1)th partial multiplication group ppg9_1, w8_1, w8_1', w9_1, and w9_1' indicate partial multiplications of the first high-order divided input activation D_AH1 and the first high-order divided weight D_WH1. w8_1' and w9_1' indicate the most significant bit of each partial multiplication. w8_1 and w9_1 of each digit may have the same value or different values. s8_1 and s9_1 are sign-extended values of the most significant bits w8_1' and w9_1' of the partial multiplication. Each of w8_1' and w9_1' may have the same value as each of s8_1 and s9_1. s8_1n and s9_1n may be inverted values of s8_1 and s9_1, respectively.

FIGS. 18 to 21 illustrate a process of calculating a first divided input activation D_A1 and a first divided weight D_W1 by the first multiplier Mul1 or the second multiplier Mul2. Similarly, the first multiplier Mul1 or the second multiplier Mul2 may calculate a second divided input activation and a second divided weight to generate the (0-2)th partial multiplication group ppg0_2 to the (9-2)th partial multiplication group ppg9_2. In addition, the first multiplier Mul1 or the second multiplier Mul2 may calculate a third divided input activation and a third divided weight to generate the (0-3)th partial multiplication group ppg0_3 to the (9-3)th partial multiplication group ppg9_3. In addition, the first multiplier Mul1 or the second multiplier Mul2 may calculate a fourth divided input activation and a fourth divided weight to generate the (0-4)th partial multiplication group ppg0_4 to the (9-4)th partial multiplication group ppg9_4.

The (0-1)th partial multiplication group ppg0_1 to (9-4)th partial multiplication group ppg9_4 generated by the first multiplier Mul1 or the second multiplier Mul2 may be provided to the aligner ALNR.

The aligner ALNR may generate a first aligned partial multiplication group ALNG_1 to a fifth aligned partial multiplication group ALNG_5 based on digits of the (0-1)th partial multiplication group ppg0_1 to the (9-4)th partial multiplication group ppg9_4 generated by the first multiplier Mul1 or the second multiplier Mul2. In other words, the aligner ALNR may generate the first aligned partial multiplication groups ALNG_1 to the fifth aligned partial multiplication groups ALNG_5 by aligning partial multiplication groups according to digits of the partial multiplication groups. The first aligned partial multiplication group ALNG_1 to the fifth aligned partial multiplication group ALNG_5 will be further described with reference to FIGS. 22 to 25.

FIGS. 22 to 25 are diagrams illustrating a first aligned partial multiplication group to a fifth aligned partial multiplication group. For the sake of convenience of description, contents identical to or similar to the contents described above are omitted or simply described.

Referring to FIGS. 18 to 25, the aligner ALNR may generate the first aligned partial multiplication group ALNG_1 to the fifth aligned partial multiplication group ALNG_5 by grouping partial multiplication groups having the same number of digits for the partial multiplication groups generated by the first multiplier Mul1 or the second multiplier Mul2.

Figure 22:
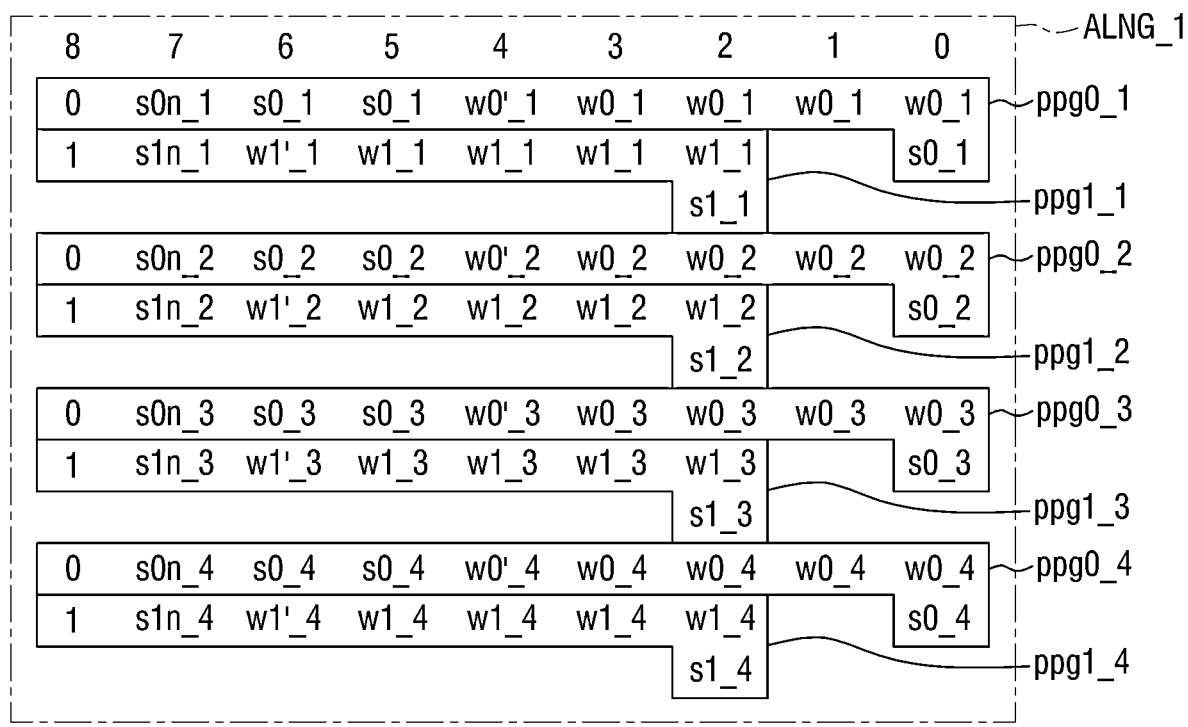
FIGS. 22 to 25 are diagrams illustrating a first aligned partial multiplication group to a fifth aligned partial multiplication group.

For example, referring to FIG. 22, the aligner ALNR may generate the first aligned partial multiplication group ALNG_1 by grouping the (0-1)th partial multiplication group ppg0_1, the (1-1)th partial multiplication group ppg1_1, the (0-2)th partial multiplication group ppg0_2, the (1-2) partial multiplication group ppg1_2, the (0-3)th partial multiplication group ppg0_3, the (1-3)th partial multiplication group ppg1_3, the (0-4)th partial multiplication group ppg0_4, and the (1-4)th partial multiplication group ppg1_4, which have the same number of digits.

Figure 23:
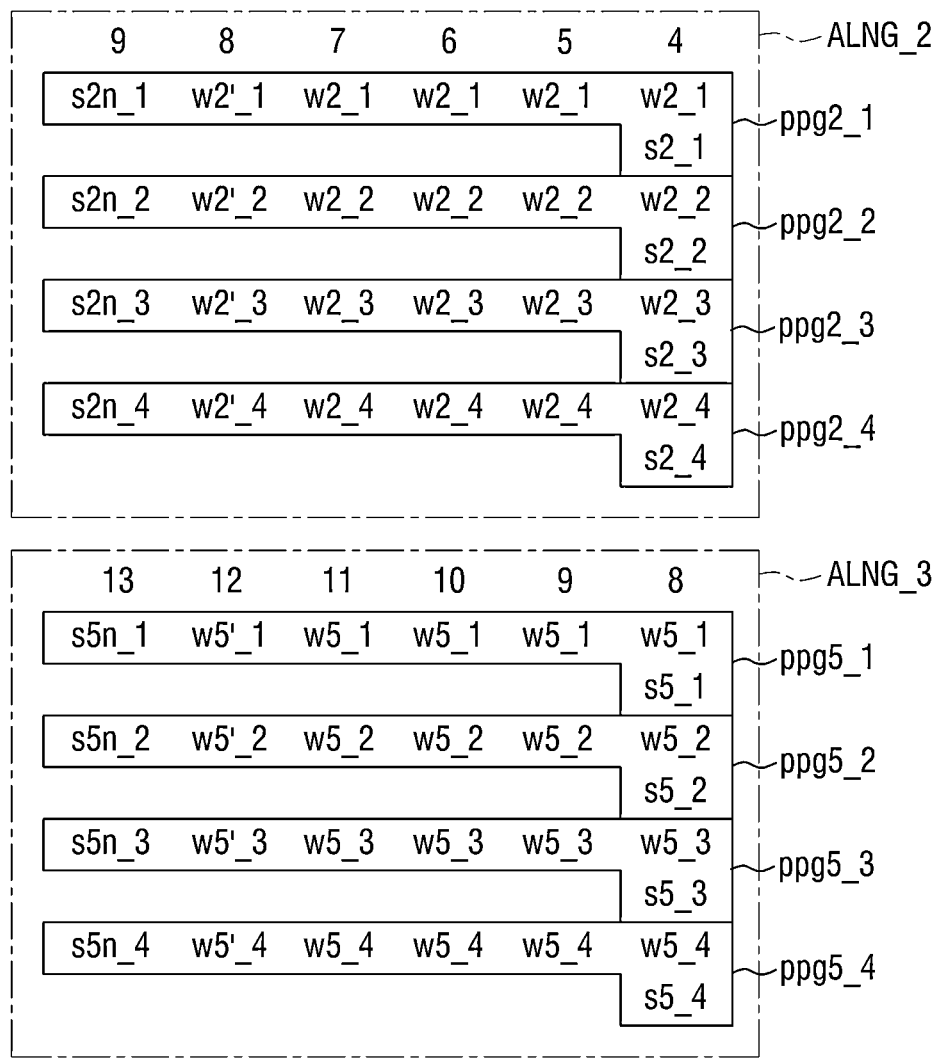

In addition, for example, referring to FIG. 23, the aligner ALNR may generate the second aligned partial multiplication group ALNG_2 by grouping the (2-1)th partial multiplication group ppg2_1, the (2-2)th partial multiplication group ppg2_2, the (2-3)th partial multiplication group ppg2_3, and the (2-4)th partial multiplication group ppg2_4, which have the same number of digits.

In addition, for example, the aligner ALNR may generate the third aligned partial multiplication group ALNG_3 by grouping the (5-1)th partial multiplication group ppg5_1, the (5-2)th partial multiplication group ppg5_2, the (5-3)th partial multiplication group ppg5_3, and the (5-4)th partial multiplication group ppg5_4, which have the same number of digits.

Figure 24:
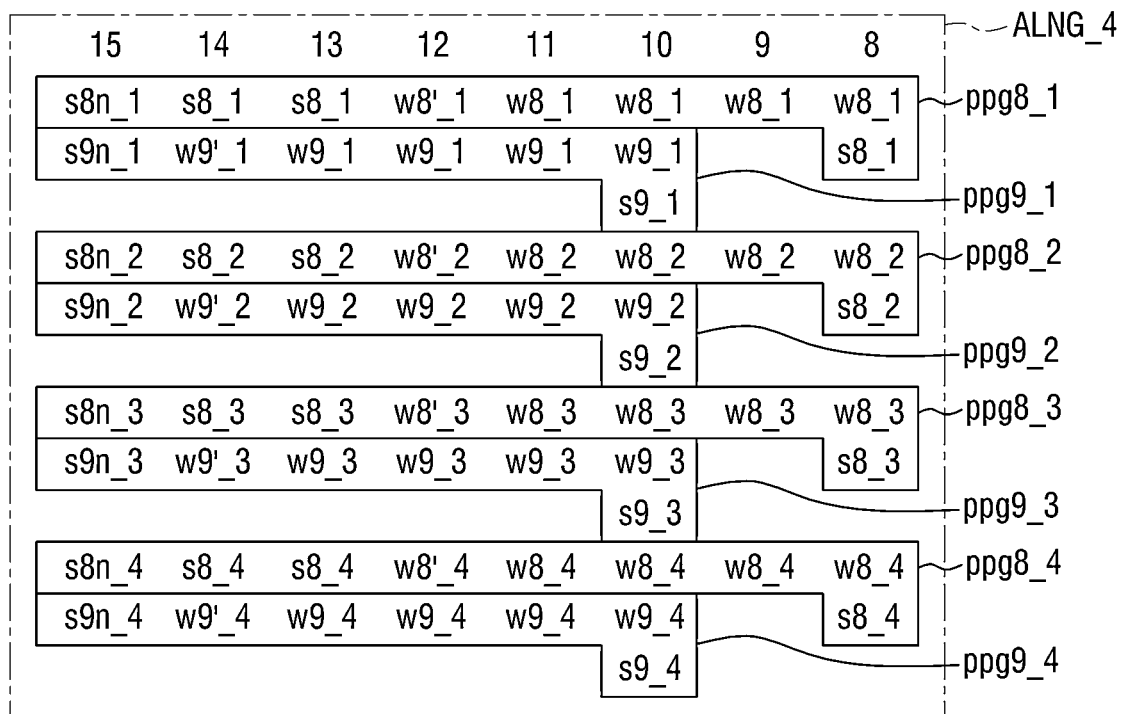

In addition, for example, referring to FIG. 24, the aligner ALNR may generate the fourth aligned partial multiplication group ALNG_4 by grouping the (8-1)th partial multiplication group ppg8_1, the (9-1)th partial multiplication group ppg9_1, the (8-2)th partial multiplication group ppg8_2, the (9-2)th partial multiplication group ppg9_2, the (8-3)th partial multiplication group ppg8_3, the (9-3)th partial multiplication group ppg9_3, the (8-4)th partial multiplication group ppg8_4, and the (9-4)th partial multiplication group ppg9_4, which have the same number of digits.

Figure 25:
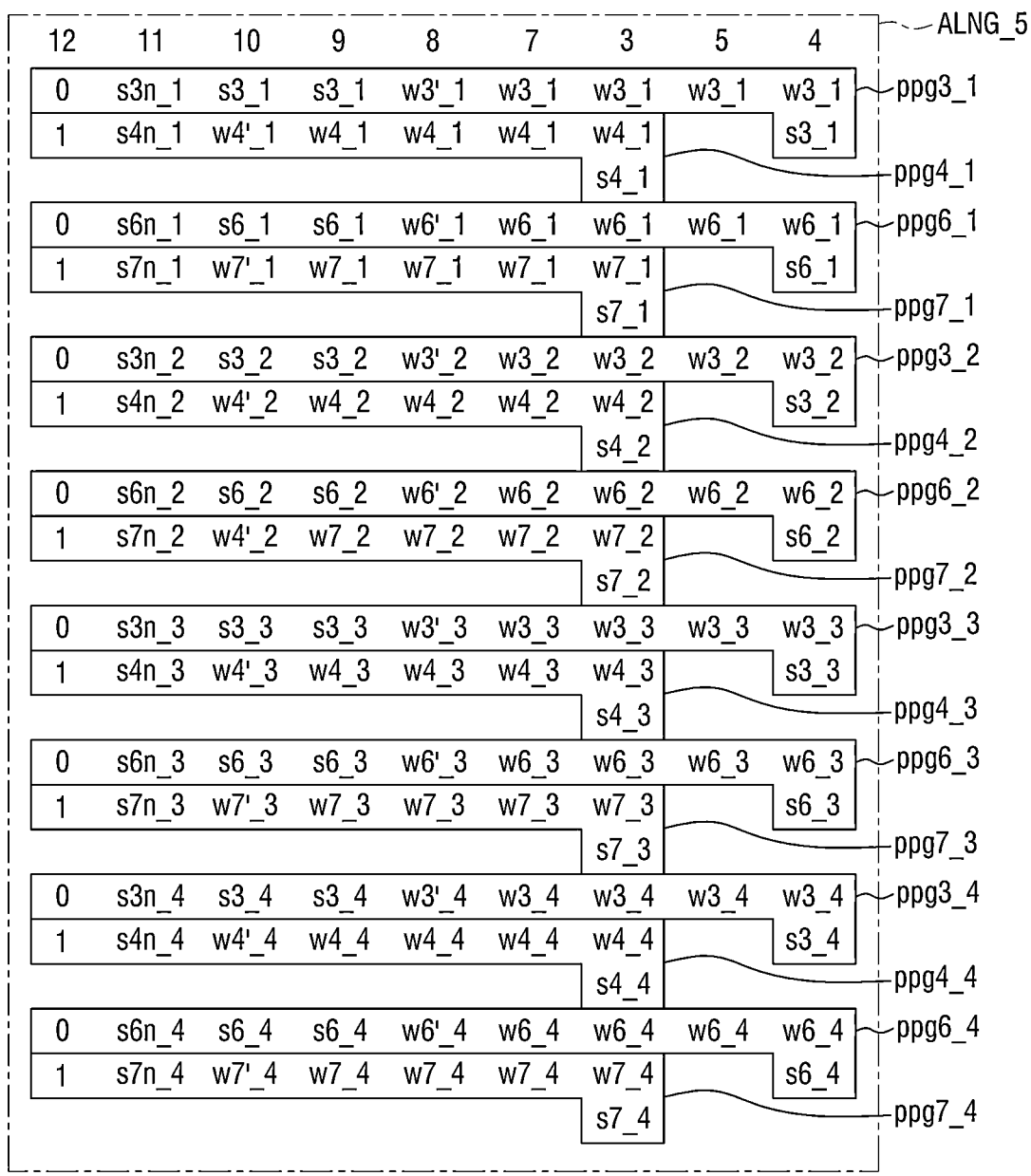

In addition, for example, referring to FIG. 25, the aligner ALNR may generate the fifth aligned partial multiplication group ALNG_5 by grouping the (3-1)th partial multiplication group ppg3_1, the (4-1)th partial multiplication group ppg4_1, the (6-1)th partial multiplication group ppg6_1, the (7-1)th partial multiplication group ppg7_1, the (3-2)th partial multiplication group ppg3_2, the (4-2)th partial multiplication group ppg4_2, the (6-2)th partial multiplication group ppg6_2, the (7-2)th partial multiplication group ppg7_2, the (3-3)th partial multiplication group ppg3_3, the (4-3)th partial multiplication group ppg4_3, the (6-3)th partial multiplication group ppg6_3, the (7-3)th partial multiplication group ppg7_3, the (3-4)th partial multiplication group ppg3_4, the (4-4)th partial multiplication group ppg4_4, the (6-4)th partial multiplication group ppg6_4, and the (7-4)th partial multiplication group ppg7_4, which have the same number of digits.

According to some embodiments, a depth of the fifth aligned partial multiplication group ALNG_5 is greater than depths of the first aligned partial multiplication group ALNG_1 to the fourth aligned partial multiplication group ALNG_4, and thus, the aligner ALNR may provide the fifth aligned partial multiplication group ALNG_5 to the first booth reduction tree BRT1 and may provide the first aligned partial multiplication group ALNG_1 to the fourth aligned partial multiplication group ALNG_4 to the four second booth reduction trees BRT2, respectively. As described above, the first booth reduction tree BRT1 may perform more calculations than the second booth reduction tree BRT2.

In other words, the first booth reduction tree BRT1 may receive the fifth aligned partial multiplication group ALNG_5, and the plurality of second booth reduction trees BRT2 may respectively receive the first aligned partial multiplication group ALNG_1 to the fourth aligned partial multiplication group ALNG_4.

Similarly to the descriptions made with reference to FIGS. 14 and 15, the first depth reducer DR_1 of the first booth reduction tree BRT1 may generate the fifth modified aligned partial multiplication group by reducing the depth of the fifth aligned partial multiplication group ALNG_5. The first adder Adder_1 may generate first result data by performing an addition operation on the fifth modified aligned partial multiplication group by using a 3:2 CSA. The first result data may be provided to the saturating adder SA.

A process similar thereto may also be performed by the plurality of second booth reduction trees BRT2. For example, the (2-1)th depth reducer of the (2-1)th booth reduction tree may generate the first modified aligned partial multiplication group by reducing the depth of the first aligned partial multiplication group ALNG_1. The (2-1)th adder may generate (2-1)th result data by performing an addition operation on the first modified aligned partial multiplication group by using a 3:2 CSA. The (2-1)th result data may be provided to the saturating adder SA. In addition, the (2-2)th depth reducer of the (2-2)th booth reduction tree may generate the second modified aligned partial multiplication group by reducing the depth of the second aligned partial multiplication group ALNG_2. The (2-2)th adder may generate (2-2)th result data by performing an addition operation on the second modified aligned partial multiplication group by using the 3:2 CSA. The (2-2)th result data may be provided to the saturating adder SA. The (2-3)th depth reducer of the (2-3)th booth reduction tree may generate the third modified aligned partial multiplication group by reducing the depth of the third aligned partial multiplication group ALNG_3. The (2-3)th adder may generate (2-3)th result data by performing an addition operation on the third modified aligned partial multiplication group by using the 3:2 CSA. The (2-3)th result data may be provided to the saturating adder SA. The (2-4)th depth reducer of the (2-4)th booth reduction tree may generate the fourth modified aligned partial multiplication group by reducing the depth of the fourth aligned partial multiplication group ALNG_4. The (2-4)th adder may generate (2-4)th result data by performing an addition operation on the fourth modified aligned partial multiplication group by using the 3:2 CSA. The (2-4)th result data may be provided to the saturating adder SA.

The saturating adder SA may generate a partial sum Psum by using the first result data, the (2-1)th result data, the (2-2)th result data, the (2-3)th result data, and the (2-4)th result data.

According to some embodiments, the flexible multiplier FM may use the first multiplier Mul1 of the first precision Pr1 and the second multiplier of the first precision Pr1 in order to calculate the second precision Pr2. A multiplier of the first precision Pr1 has less hardware complexity than a multiplier of the second precision Pr2, and power consumption is also relatively small, and thus, the flexible multiplier FM composed of the multiplier of the first precision Pr1 may be implemented in a relatively small area, and power consumption may also be reduced.

In addition, according to some embodiments, the flexible multiplier FM includes a depth reducer for reducing a depth, and thus, the same result data may be generated with relatively fewer calculations. Accordingly, it is possible to effectively reduce latency necessary for calculation.

In addition, according to some embodiments, the flexible multiplier FM may group partial multiplication having the same number of digits by using the aligner ALNR to calculate the second precision Pr2. In this case, the flexible multiplier FM may provide a grouped partial multiplication group to an appropriate booth reduction tree depending on sizes of the depth, waste of hardware resources may be reduced, and because a plurality of booth reduction trees are used, parallel processes may be performed.

Figure 26:
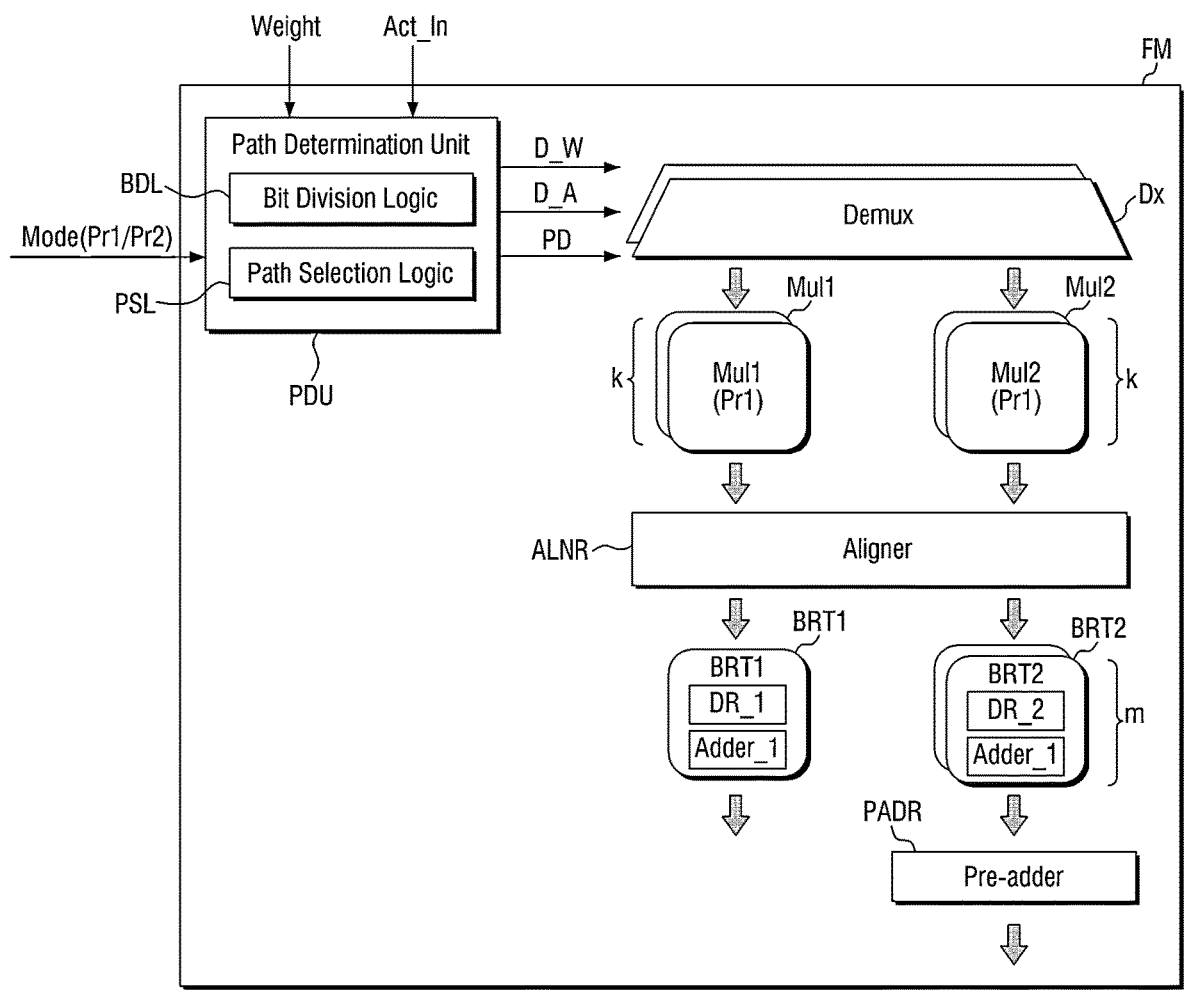
FIG. 26 is a diagram illustrating a configuration of a flexible multiplier according to some embodiments of the present disclosure.

FIG. 26 is a diagram illustrating a configuration of a flexible multiplier according to some embodiments of the present disclosure. For the sake of convenience of description, contents identical to or similar to the contents described above are omitted or simply described.

Referring to FIGS. 22 to 26, the flexible multiplier FM may include the path determination unit PDU, the demultiplexer Dx, the first multiplier Mul1, the second multiplier Mul2, the aligner ALNR, the first booth reduction tree BRT1, the second booth reduction tree BRT2, and a pre-adder PADR.

The path determination unit PDU may generate a plurality of divided weights D_W and a plurality of divided input activations D_A by using the weight Weight and the input activation Act_In. The path determination unit PDU may provide the plurality of divided weights D_W and the plurality of divided input activations D_A to the demultiplexer Dx. In addition, the path determination unit PDU may receive the calculation mode signal Mode, generate the path determination signal PD in response to the received calculation mode signal Mode, and provide the path determination signal PD to the demultiplexer Dx.

When the calculation mode signal Mode is the first mode signal Mode(Pr1), the demultiplexer Dx may provide the plurality of divided weights D_W and the plurality of divided input activations D_A to the first multiplier Mul1. The first multiplier Mul1 may generate a plurality of partial multiplication groups by calculating each of the plurality of divided weights D_W and each of the plurality of divided input activations D_A. The plurality of partial multiplication groups generated by the first multiplier Mul1 may be provided to the first booth reduction tree BRT1. The first booth reduction tree BRT1 may generate result data by using the plurality of partial multiplication groups. The resulting data may be provided to the saturating adder SA.

When the calculation mode signal Mode is the second mode signal Mode(Pr2), the demultiplexer Dx may provide some of the plurality of divided weights D_W and the plurality of divided input activations D_A to the first multiplier Mul1 and provide the others to the second multiplier Mul2.

The first multiplier Mul1 may generate a plurality of partial multiplication groups by calculating some of the plurality of divided weights D_W and the plurality of divided input activations D_A. In addition, the second multiplier Mul2 may generate a plurality of partial multiplication groups by calculating the others of the plurality of divided weights D_W and the plurality of divided input activations D_A. The plurality of partial multiplication groups generated by the first multiplier Mul1 and the second multiplier Mul2 may be provided to the aligner ALNR.

The aligner ALNR may generate a plurality of aligned partial multiplication groups based on digits of the plurality of partial multiplication groups provided from the first multiplier Mul1 and the second multiplier Mul2. Among the plurality of aligned partial multiplication groups generated by the aligner ALNR, the aligned partial multiplication group having the greatest depth may be provided to the first booth reduction tree BRT1, and the other aligned partial multiplication groups may be respectively provided to the plurality of second booth reduction trees BRT2. The first booth reduction tree BRT1 may generate first result data by using the aligned partial multiplication group.

The plurality of second booth reduction trees BRT2 may respectively generate (2-1)th result data, (2-2)th result data, (2-3)th result data, and (2-4)th result data by using the aligned partial multiplication groups. For example, when it is assumed that the plurality of second booth reduction trees BRT2 include a (2-1)th booth reduction tree, a (2-2)th booth reduction tree, a (2-3)th booth reduction tree, and a (2-4)th booth reduction tree, the (2-1)th booth reduction tree may generate the (2-1)th result data, the (2-2)th booth reduction tree may generate the (2-2)th result data, the (2-3)th booth reduction tree may generate the (2-3)th result data, and the (2-4)th booth reduction tree may generate the (2-4)th result data.

The (2-1)th result data to the (2-4)th result data may be provided to the pre-adder PADR. The pre-adder PADR may generate second result data by performing an addition operation on the (2-1)th result data to the (2-4)th result data. As described above, the aligned partial multiplication group used to generate the first result data may have the greatest depth. Accordingly, time for the first booth reduction tree BRT1 to generate the first result data may be greater than time for the (2-1)th booth reduction tree to the (2-4)th booth reduction tree to respectively generate the (2-1)th result data to the (2-4)th result data. Accordingly, the pre-adder PADR may operate in advance before the first result data is generated to start in advance an addition operation of the (2-1)th result data to the (2-4)th result data. The pre-adder PADR may generate the second result data by performing an addition operation of the (2-1)th result data to the (2-4)th result data. The second result data may be provided to the saturating adder SA.

According to some embodiments, the pre-adder PADR may start in advance calculation of the (2-1)th result data to the 2-4th result data before the first booth reduction tree BRT1 completes an operation, that is, before the first result data is generated. In other words, the pre-adder PADR may start calculation in advance earlier by a difference between a calculation time of the first booth reduction tree BRT1 and a calculation time of the second booth reduction tree BRT2. Accordingly, because the saturating adder SA generates a partial sum by using the first result data and the second result data, a calculation speed of the saturating adder SA may be relatively increased.

Figure 27:
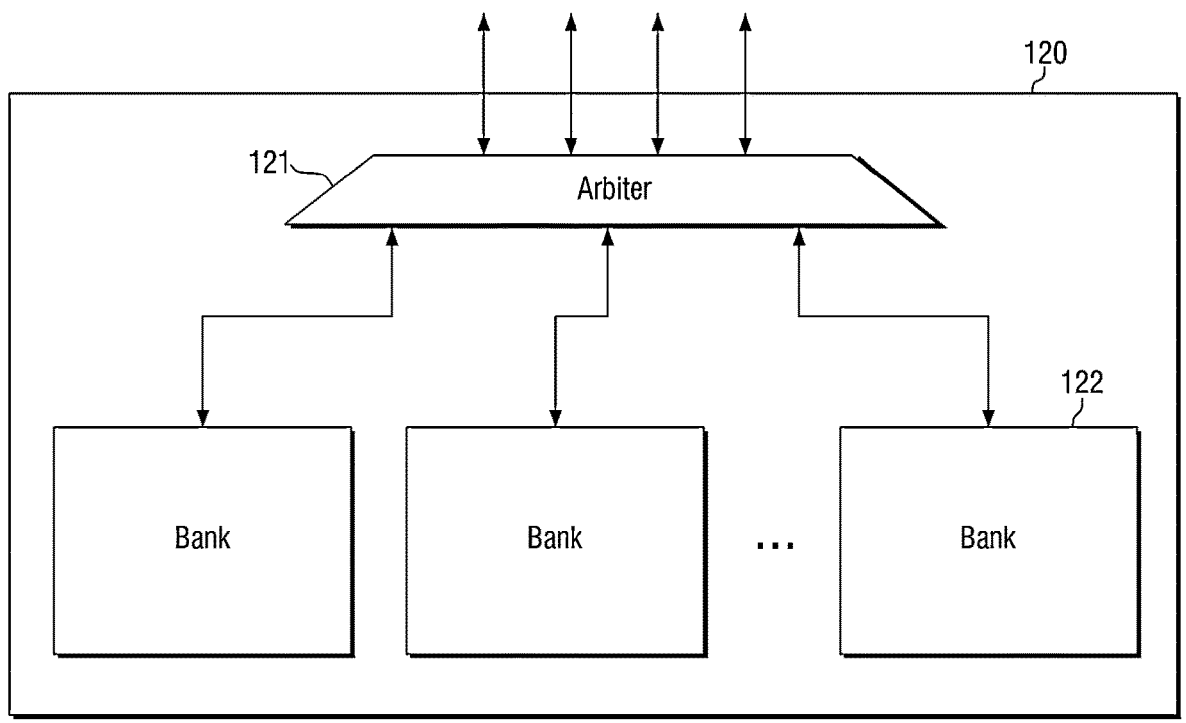
FIG. 27 is a block diagram for illustrating in detail the L0 memory of FIG. 7.

FIG. 27 is a block diagram for illustrating in detail the L0 memory of FIG. 7.

With reference to FIG. 27, the L0 memory 120 may include an arbiter 121 and at least one local memory bank 122.

When data is stored in the L0 memory 120, the arbiter 121 may receive the data from the load engine 113a. At this time, the local memory banks 122 may be allocated to the data in a round robin fashion. Accordingly, the data may be stored in any one of the at least one local memory bank 122.

Conversely, when the data is loaded from the L0 memory 120, the arbiter 121 may receive the data from the local memory bank 122 and transmit them to the store engine 113b. The store engine 113b may store data externally via the local interconnection 200.

Figure 28:
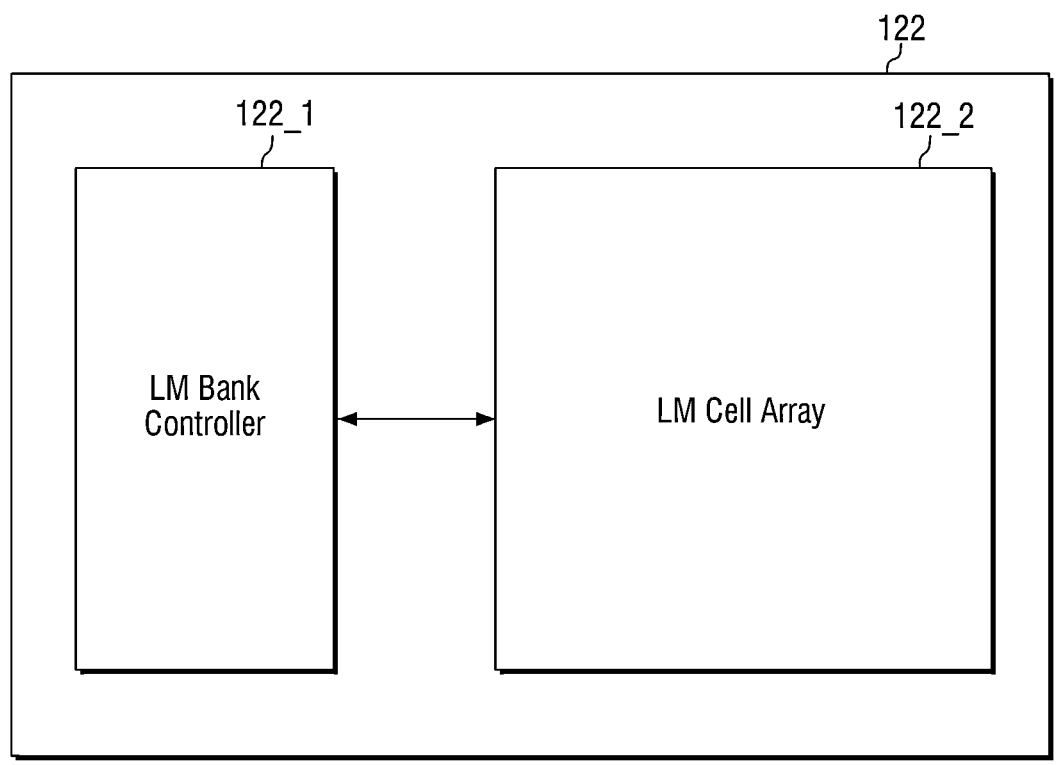
FIG. 28 is a block diagram for illustrating in detail the local memory bank of FIG. 27.

FIG. 28 is a block diagram for illustrating in detail the local memory bank of FIG. 27.

With reference to FIG. 28, the local memory bank 122 may include a local memory bank controller 122_1 and a local memory bank cell array 122_2.

The local memory bank controller 122_1 may manage read and write operations via the addresses of data stored in the local memory bank 122. That is, the local memory bank controller 122_1 may manage the input/output of data as a whole.

The local memory bank cell array 122_2 may be of a structure in which cells in which data is directly stored are arranged in rows and columns. The local memory bank cell array 122_2 may be controlled by the local memory bank controller 122_1.

Figure 29:
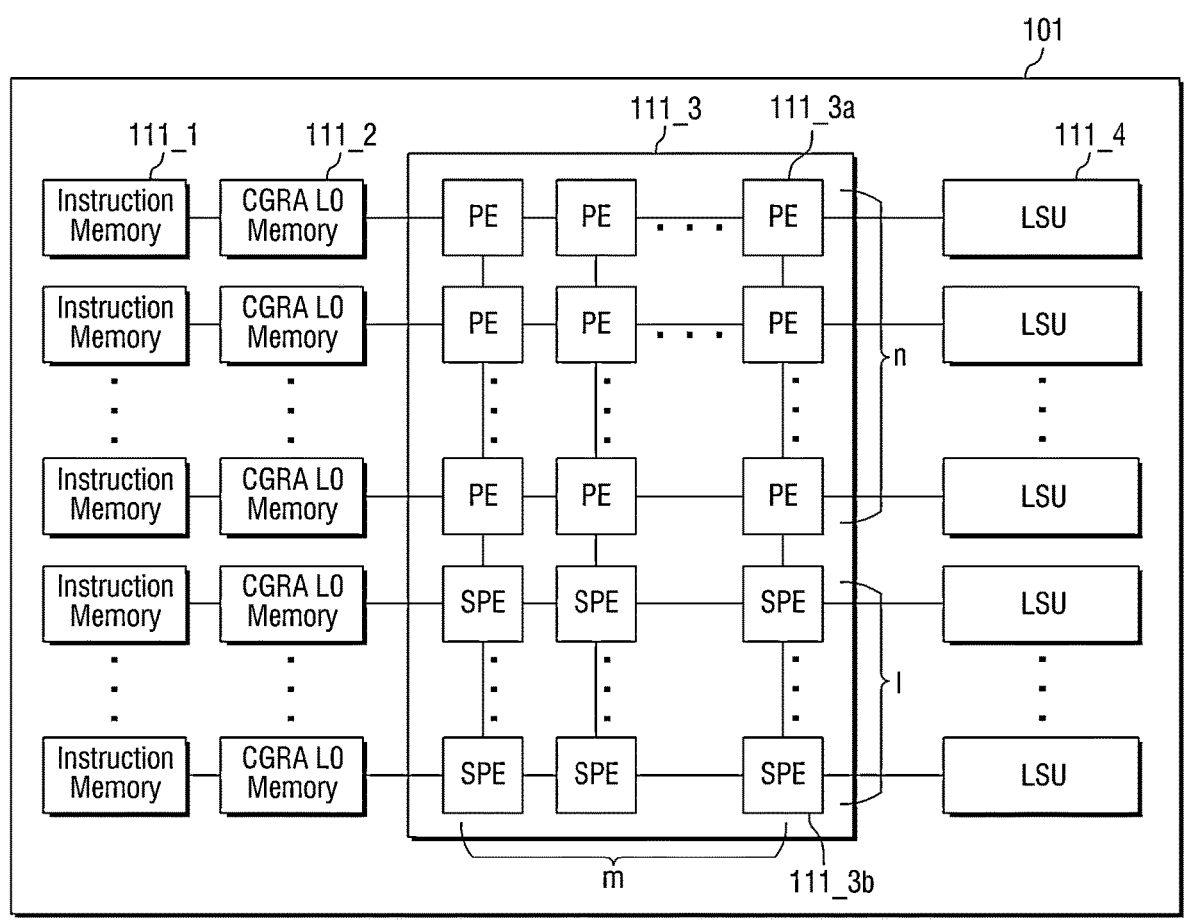
FIG. 29 is a block diagram for illustrating in detail the structure of a neural processing device in accordance with some embodiments of the present disclosure.

FIG. 29 is a block diagram for illustrating in detail the structure of a neural processing device in accordance with some embodiments of the present disclosure.

Referring to FIG. 29, the neural core 101 may be of a CGRA structure, unlike the neural core 100. The neural core 101 may include an instruction memory 111_1, a CGRA L0 memory 111_2, a PE array 111_3, and a load/store unit (LSU) 111_4.

The instruction memory 111_1 may receive and store instructions. The instruction memory 111_1 may sequentially store instructions internally, and provide the stored instructions to the PE array 111_3. In this case, the instructions may instruct the operation of the processing element 111_3a included in each PE array 111_3.

The CGRA L0 memory 111_2 is a memory located inside the neural core 101, and may receive all the input data required for the tasks by the neural core 101 from the outside and temporarily store them. Further, the CGRA L0 memory 111_2 may temporarily store the output data calculated by the neural core 101 in order to transmit them to the outside. The CGRA L0 memory 111_2 may serve as a cache memory of the neural core 101.

The CGRA L0 memory 111_2 may send and receive data to and from the PE array 111_3. The CGRA L0 memory 111_2 may be a memory corresponding to L0 (level 0) lower than L1. In this case, the L0 memory may be a private memory of the neural core 101 that is not shared. The CGRA L0 memory 111_2 may transmit data such as activations or weights, programs, and the like to the PE array 111_3.

The PE array 111_3 may be a module that performs calculations. The PE array 111_3 may perform not only one-dimensional calculations but also two-dimensional or higher matrix/tensor calculations. The PE array 111_3 may include a plurality of processing elements 111_3a and particular processing elements 111_3b therein.

The processing elements 111_3a and the particular processing elements 111_3b may be arranged in rows and columns. The processing elements 111_3a and the particular processing elements 111_3b may be arranged in m columns. Further, the processing elements 111_3a may be arranged in n rows, and the particular processing elements 111_3b may be arranged in 1 rows. Accordingly, the processing elements 111_3a and the particular processing elements 111_3b may be arranged in (n+1) rows and m columns.

The LSU 111_4 may receive at least one of data, a control signal, and a synchronization signal from the outside via the L1 interconnection 130. The LSU 111_4 may transmit at least one of the received data, control signal, and synchronization signal to the CGRA L0 memory 111_2. Similarly, the LSU 111_4 may transmit at least one of the data, control signal, and synchronization signal to the outside via the L1 interconnection 130.

The neural core 101 may have a CGRA (Coarse Grained Reconfigurable Architecture) structure. Accordingly, in the neural core 101, the respective processing elements 111_3a and particular processing elements 111_3b of the PE array 111_3 may be connected to at least one of the CGRA L0 memory 111_2, the instruction memory 111_1, and the LSU 111_4, respectively. In other words, the processing elements 111_3a and the particular processing elements 111_3b do not have to be connected to all of the CGRA L0 memory 111_2, the instruction memory 111_1, and the LSU 111_4, but may be connected to some of them.

Further, the processing elements 111_3a and the particular processing elements 111_3b may be different types of processing elements from each other. Accordingly, out of the CGRA L0 memory 111_2, the instruction memory 111_1, and the LSU 111_4, the elements connected to the processing elements 111_3a and the elements connected to the particular processing elements 111_3b may be different from each other.

The neural core 101 of the present disclosure having a CGRA structure enables high-level parallel calculations, and since direct data exchange between the processing elements 111_3a and the particular processing elements 111_3b is possible, the power consumption may be low. In addition, by including two or more types of processing elements 111_3a, optimization according to various calculation tasks may be possible.

For example, if the processing elements 111_3a are processing elements that perform two-dimensional calculations, the particular processing elements 111_3b may be processing elements that perform one-dimensional calculations. However, the present embodiment is not limited thereto.

Figure 30:
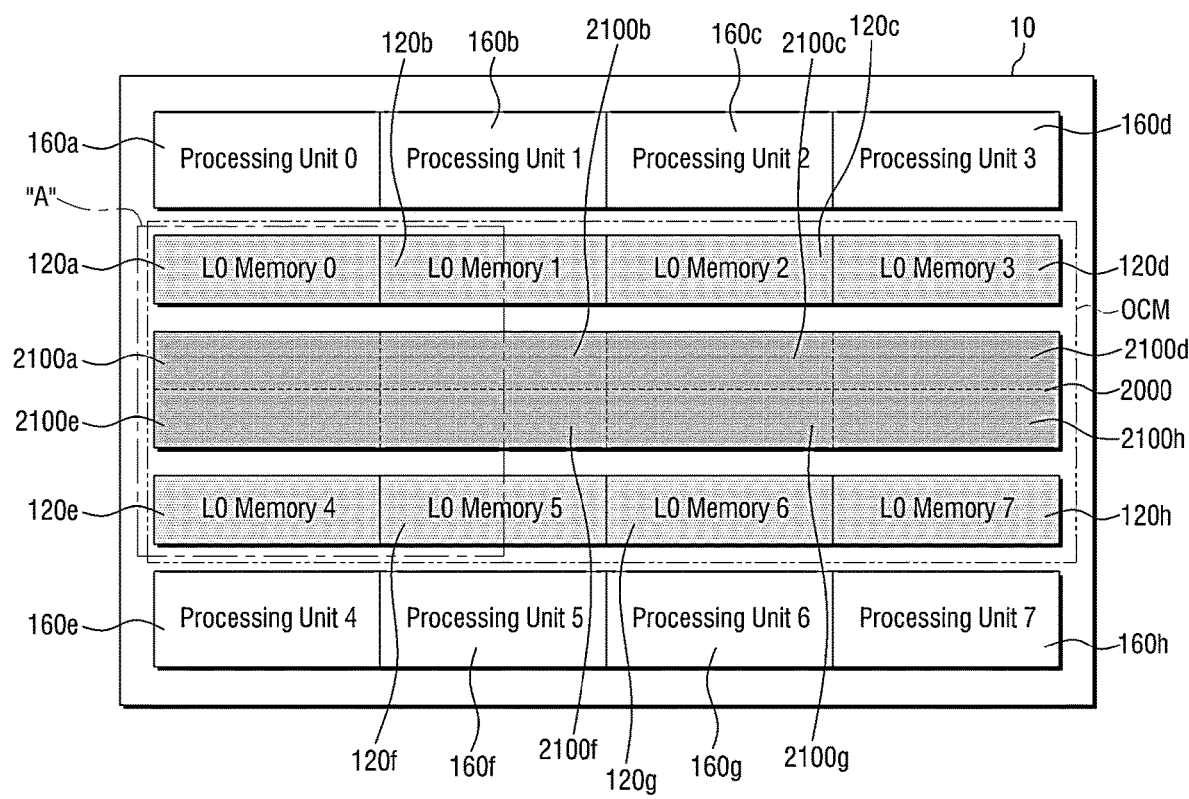
FIG. 30 is a block diagram for illustrating memory reconfiguration of a neural processing system in accordance with some embodiments of the present disclosure.

FIG. 30 is a block diagram for illustrating memory reconfiguration of a neural processing system in accordance with some embodiments of the present disclosure.

With reference to FIG. 30, the neural core SoC 10 may include first to eighth processing units 160a to 160h and an on-chip memory OCM. Although FIG. 30 illustrates eight processing units as an example, this is merely illustrative, and the number of processing units may vary as desired.

The on-chip memory OCM may include first to eighth L0 memories 120a to 120h and a shared memory 2000.

The first to eighth L0 memories 120a to 120h may be used as private memories for the first to eighth processing units 160a to 160h, respectively. In other words, the first to eighth processing units 160a to 160h and the first to eighth L0 memories 120a to 120h may correspond to each other 1:1.

The shared memory 2000 may include first to eighth memory units 2100a to 2100h. The first to eighth memory units 2100a to 2100h may correspond to the first to eighth processing units 160a to 160h and the first to eighth L0 memories 120a to 120h, respectively. That is, the number of memory units may be eight, which is the same as the number of processing units and L0 memories.

The shared memory 2000 may operate in one of two kinds of on-chip memory types. In other words, the shared memory 2000 may operate in one of a L0 memory type or a global memory type. In other words, the shared memory 2000 may implement two types of logical memories with one piece of hardware.

If the shared memory 2000 is implemented in the L0 memory type, the shared memory 2000 may operate as a private memory for each of the first to eighth processing units 160a to 160h, just like the first to eighth L0 memories 120a to 120h. The L0 memory can operate at a relatively higher clock speed compared with the global memory, and the shared memory 2000 may also use a relatively higher clock speed when operating in the L0 memory type.

If the shared memory 2000 is implemented in the global memory type, the shared memory 2000 may operate as a common memory used by the first processing unit 100a and the second processing unit 100b together. In this case, the shared memory 2000 may be shared not only by the first to eighth processing units 160a to 160h but also by the first to eighth L0 memories 120a to 120h.

The global memory may generally use a lower clock compared with the L0 memory, but is not limited thereto. When the shared memory 2000 operates in the global memory type, the first to eighth processing units 160a to 160h may share the shared memory 2000. In this case, the shared memory 2000 may be connected to the volatile memory 32 of FIG. 2 via the global interconnection 5000 and may also operate as a buffer for the volatile memory 32.

At least part of the shared memory 2000 may operate in the L0 memory type, and the rest may operate in the global memory type. In other words, the entire shared memory 2000 may operate in the L0 memory type, or the entire shared memory 2000 may operate in the global memory type. Alternatively, part of the shared memory 2000 may operate in the L0 memory type, and the rest may operate in the global memory type.

Figure 31:
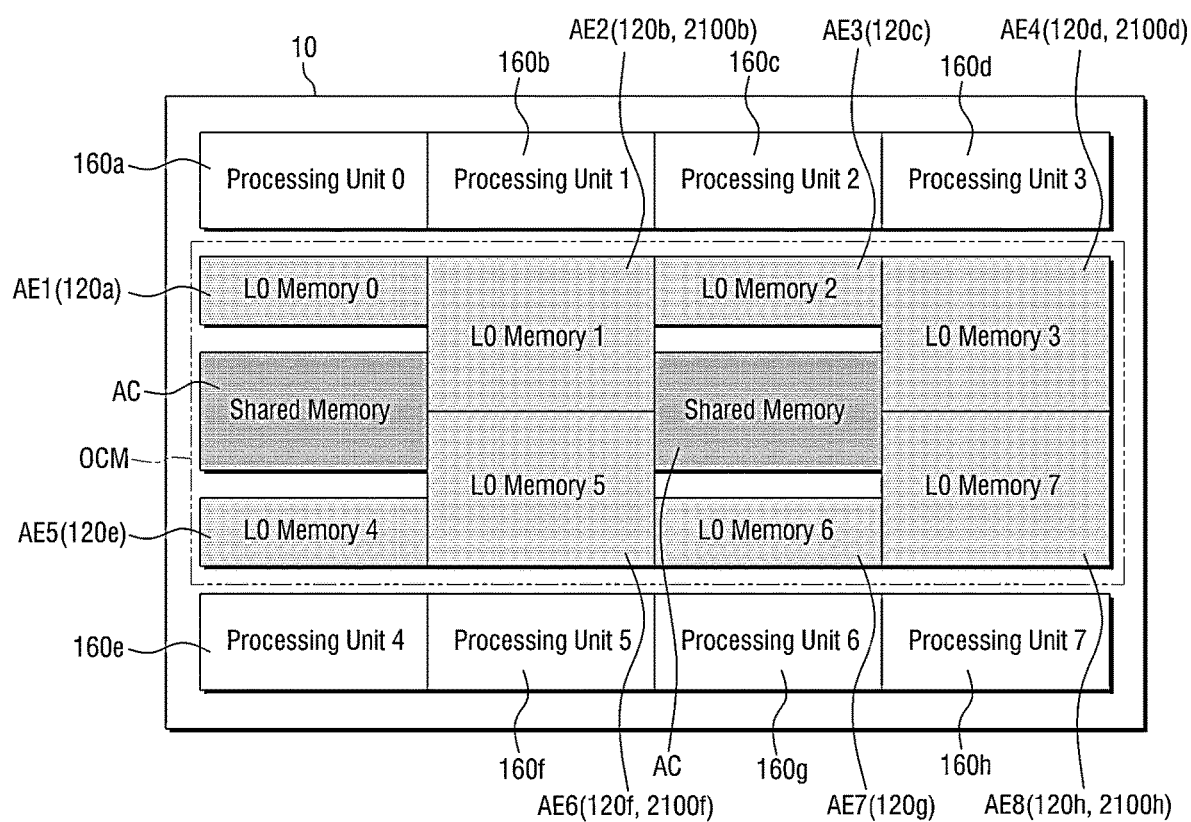
FIG. 31 is a block diagram showing an example of memory reconstruction of a neural processing system in accordance with some embodiments of the present disclosure.

FIG. 31 is a block diagram showing an example of memory reconstruction of a neural processing system in accordance with some embodiments of the present disclosure.

With reference to FIGS. 20 and 21, first, third, fifth, and seventh dedicated areas AE1, AE3, AE5, and AE7 for each of the first, third, fifth, and seventh processing units 100a, 100c, 100e, and 100g may include only the first, third, fifth, and seventh L0 memories 120a, 120c, 120e, and 120g, respectively. Further, second, fourth, sixth, and eighth dedicated areas AE2, AE4, AE6, and AE8 for each of the second, fourth, sixth, and eighth processing units 100b, 100d, 100f, and 100h may include second, fourth, sixth, and eighth L0 memories 120b, 120d, 120f, and 120h, respectively. In addition, the second, fourth, sixth, and eighth dedicated areas AE2, AE4, AE6, and AE8 may include the second, fourth, sixth, and eighth memory units 2100b, 2100d, 2100f, and 2100h. The first, third, fifth, and seventh memory units 2100a, 2100c, 2100e, and 2100g of the shared memory 2000 may be used as a common area AC.

The common area AC may be a memory shared by the first to eighth processing units 160a to 160h. The second dedicated area AE2 may include a second L0 memory 120b and a second memory unit 2100b. The second dedicated area AE2 may be an area in which the second L0 memory 120b and the second memory unit 210b that are separated hardware-wise operate in the same manner and operate logically as one L0 memory. The fourth, sixth, and eighth dedicated areas AE4, AE6, and AE8 may also operate in the same manner as the second dedicated area AE2.

The shared memory 2000 in accordance with the present embodiment may convert an area corresponding to each neural core into a logical L0 memory and a logical global memory of an optimized ratio and may use them. The shared memory 2000 may perform the adjustment of this ratio at runtime.

That is, each neural core may perform the same task in some cases, but may perform different tasks in other cases as well. In this case, the amount of the L0 memory and the amount of the global memory required for the tasks carried out by each neural core are inevitably different each time. Accordingly, if the composition ratio of the L0 memory and the shared memory is fixedly set as in the conventional on-chip memory, there may occur inefficiency due to the calculation tasks assigned to each neural core.

Therefore, the shared memory 2000 of the neural processing device in accordance with the present embodiment may set an optimal ratio of the L0 memory and the global memory according to calculation tasks during the runtime, and may enhance the efficiency and speed of calculation.

Figure 32:
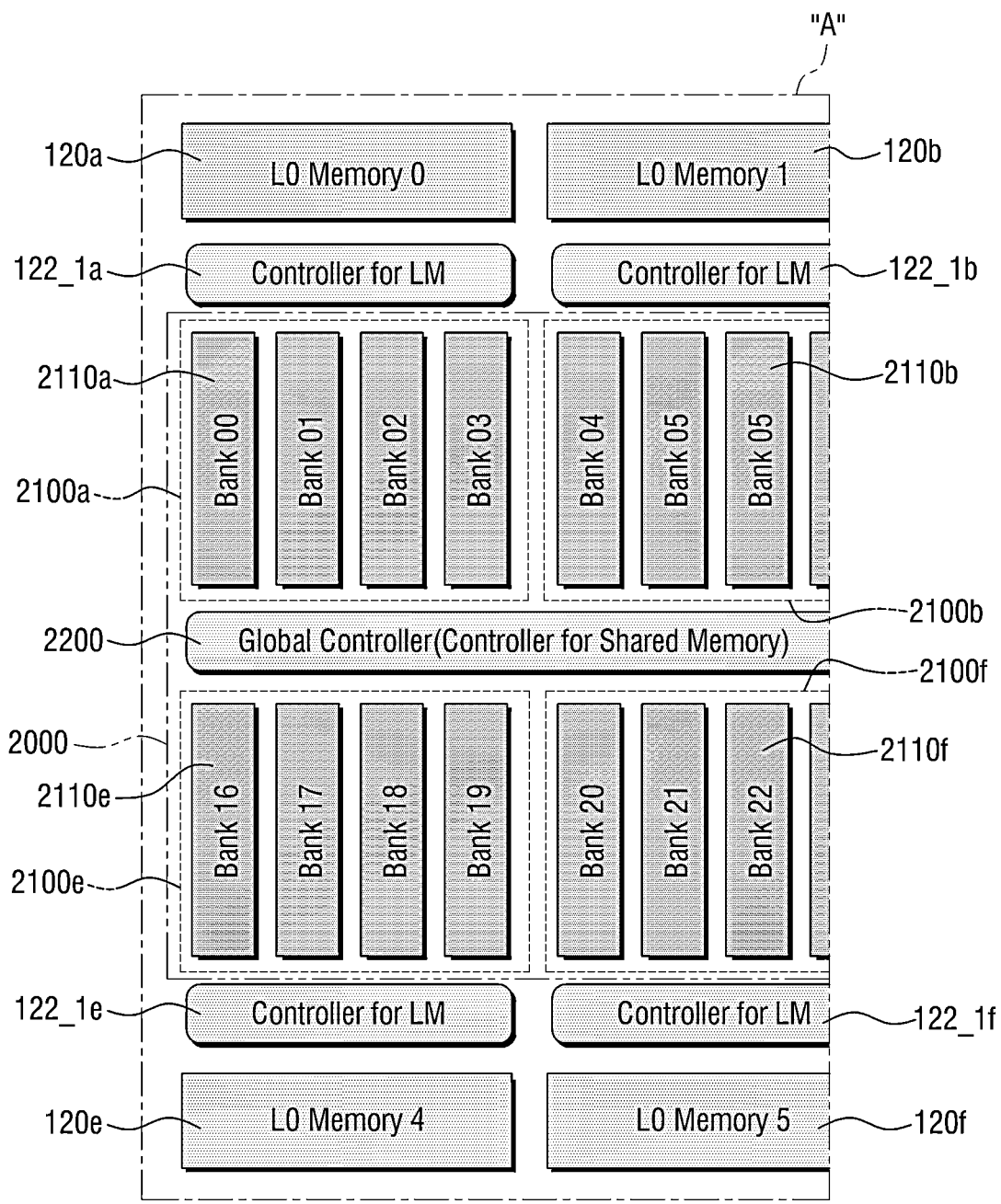
FIG. 32 is an enlarged block diagram of a portion A of FIG. 30.

FIG. 32 is an enlarged block diagram of a portion A of FIG. 30.

With reference to FIGS. 20 and 22, the shared memory 2000 may include a first L0 memory controller 122_1a, a second L0 memory controller 122_1b, a fifth L0 memory controller 122_1e, a sixth L0 memory controller 122_1f, the first to eighth memory units 2100a to 2100h, and a global controller 2200. Other L0 memory controllers not shown may also be included in the present embodiment, but the description thereof will be omitted for convenience.

The first L0 memory controller 122_1a may control the first L0 memory 120a. In addition, the first L0 memory controller 122_1a may control the first memory unit 2100a. Specifically, when the first memory unit 2100a is implemented in a logical L0 memory type, the control by the first L0 memory controller 122_1a may be performed on the first memory unit 2100a.

The second L0 memory controller 122_1b may control the second L0 memory 120b. Further, the second L0 memory controller 122_1b may control the second memory unit 2100b. In other words, when the second memory unit 2100b is implemented in the logical L0 memory type, the control by the first L0 memory controller 122_1a may be performed on the second memory unit 2100b.

The fifth L0 memory controller 122_1e may control the fifth L0 memory 120e. Further, the fifth L0 memory controller 122_1e may control the fifth memory unit 2100e. In other words, when the fifth memory unit 2100e is implemented in the logical L0 memory type, the control by the fifth L0 memory controller 122_1e may be performed on the fifth memory unit 2100e.

The sixth L0 memory controller 122_1f may control the sixth L0 memory 120f. Further, the sixth L0 memory controller 122_1f may control the sixth memory unit 2100f. In other words, when the sixth memory unit 2100f is implemented in the logical L0 memory type, the control by the sixth L0 memory controller 122_1f may be performed on the sixth memory unit 2100f.

The global controller 2200 may control all of the first to eighth memory units 2100a to 2100h. Specifically, the global controller 2200 may control the first memory unit 2100a to the eighth memory unit 2100h when the first to eighth memory units 2100a to 2100h each operate logically in the global memory type (i.e., when they do not operate logically in the L0 memory type).

In other words, the first to eighth memory units 2100a to 2100h may be controlled by the first to eighth L0 memory controllers 122_1a to 122_1h, respectively, or may be controlled by the global controller 2200, depending on what type of memory they are logically implemented in.

If the L0 memory controllers including the first, second, fifth, and sixth L0 memory controllers 122_1a, 122_1b, 122_1e, and 122_1f control the first to eighth memory units 2100a to 2100h, respectively, the first to eighth L0 memory controllers 122_1a to 141h control the first to eighth memory units 2100a to 2100h in the same manner as the first to eighth L0 memories 120a to 120h, and thus, can control them as the private memory of the first to eighth processing units 160a to 160h. Accordingly, the first to eighth memory units 2100a to 2100h may operate at clock frequencies corresponding to the clock frequencies of the first to eighth processing units 160a to 160h.

The L0 memory controllers including the first L0 memory controller 122_1a, the second L0 memory controller 122_1b, the fifth L0 memory controller 122_1e, and the sixth L0 memory controller 122_1f may each include the LSU 110 of FIG. 7.

If the global controller 2200 controls at least one of the first to eighth memory units 2100a to 2100h, respectively, then the global controller 2200 may control the first to eighth memory units 2100a to 2100h as the global memory of the first to eighth processing units 160a to 160h, respectively. Accordingly, at least one of the first to eighth memory units 2100a to 2100h may operate at a clock frequency independent of the clock frequencies of the first to eighth processing units 160a to 160h, respectively. However, the present embodiment is not limited thereto.

The global controller 2200 may connect the first to eighth memory units 2100a to 2100h with the global interconnection 5000 of FIG. 3. The first to eighth memory units 2100a to 2100h may exchange data with the off-chip memory 30 of FIG. 1 or may exchange data with the first to eighth L0 memories 120a to 120h, respectively, by means of the global controller 2200.

Each of the first to eighth memory units 2100a to 2100h may include at least one memory bank. The first memory unit 2100a may include at least one first memory bank 2110a. The first memory banks 2110a may be areas obtained by dividing the first memory unit 2100a into certain sizes. The respective first memory banks 2110a may all be memory devices of the same size. However, the present embodiment is not limited thereto. FIG. 32 illustrates that four memory banks are included in one memory unit.

Likewise, the second, fifth, and sixth memory units 2100b, 2100e, and 2100f may include at least one second, fifth, and sixth memory banks 2110b, 2110e, and 2110f, respectively.

Hereinafter, the description will be made based on the first memory banks 2110a and the fifth memory banks 2110e, which may be the same as other memory banks including the second and sixth memory banks 2110b and 2110f.

The first memory banks 2110a may each operate logically in the L0 memory type or operate logically in the global memory type. In this case, the first memory banks 2110a may operate independently of the other memory banks in the first memory unit 2100a. However, the present embodiment is not limited thereto.

If each memory bank operates independently, the first memory unit 2100a may include a first area operating in the same manner as the first L0 memory 120a and a second area operating in a different manner from the first L0 memory 120a. In this case, the first area and the second area do not necessarily coexist, but any one area may occupy the entire first memory unit 2100a.

Likewise, the second memory unit 2100b may include a third area operating in the same manner as the second L0 memory 120b and a fourth area operating in a different manner from the second L0 memory 120b. In this case, the third area and the fourth area do not necessarily coexist, and any one area may occupy the entire first memory unit 2100a.

In this case, the ratio of the first area to the second area may be different from the ratio of the third area to the fourth area. However, the present embodiment is not limited thereto. Accordingly, the ratio of the first area to the second area may be the same as the ratio of the third area to the fourth area. In other words, the memory composition ratio in each memory unit may vary as desired.

In general, in the case of the conventional system on a chip, the on-chip memory except for high-speed L0 memory was often composed of high-density, low-power SRAM. This is because SRAM has high efficiency in terms of chip area and power consumption relative to required capacity. However, with the conventional on-chip memory, the processing speed slowed down significantly inevitably in the case of tasks that require more data quickly than the predetermined capacity of the L0 memory, and even when the need for the global memory is not great, there is no way to utilize the remaining global memory, resulting in inefficiency.

On the contrary, the shared memory 2000 in accordance with some embodiments of the present disclosure may be controlled selectively by any one of the two controllers depending on the cases. In this case, the shared memory 2000 may be controlled not only as a whole by a determined one of the two controllers but also independently for each memory unit or each memory bank.

Through this, the shared memory 2000 in accordance with the present embodiment can obtain an optimal memory composition ratio according to calculation tasks during the runtime and can perform faster and more efficient calculation tasks. In the case of a processing unit specialized in artificial intelligence, the required sizes of L0 memory and global memory may vary for each particular application. Moreover, even for the same application, the required sizes of L0 memory and global memory may vary for each layer when a deep learning network is used. In the shared memory 2000 in accordance with the present embodiment, the composition ratio of the memory can be changed during the runtime even when calculation steps change according to each layer, making fast and efficient deep learning tasks possible.

Figure 33:
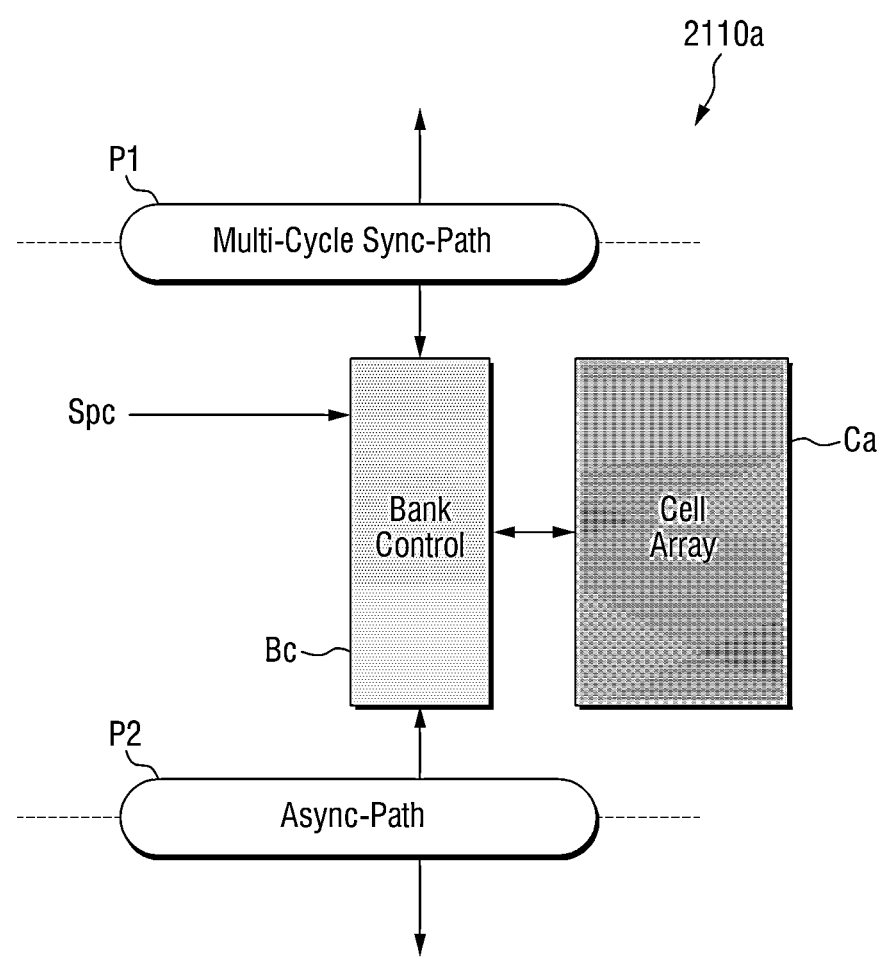
FIG. 33 is a diagram for illustrating in detail the first memory bank of FIG. 32.

FIG. 33 is a diagram for illustrating in detail the first memory bank of FIG. 32. Although FIG. 33 illustrates the first memory bank 2110a, other memory banks may also have the same structure as the first memory bank 2110a.

With reference to FIG. 33, the first memory bank 2110a may include a cell array Ca, a bank controller Bc, a first path unit P1, and a second path unit P2.

The cell array Ca may include a plurality of memory devices (cells) therein. In the cell array Ca, the plurality of memory devices may be arranged in a lattice structure. The cell array Ca may be, for example, a SRAM (static random-access memory) cell array.

The bank controller Bc may control the cell array Ca. The bank controller Bc may determine whether the cell array Ca operates in the L0 memory type or in the global memory type, and may control the cell array Ca accordingly.

Specifically, the bank controller Bc may determine whether to transmit and receive data in the direction of the first path unit P1 or to transmit and receive data in the direction of the second path unit P2 during the runtime. The bank controller Bc may determine a data transmission and reception direction according to a path control signal Spc.

The path control signal Spc may be generated by a pre-designed device driver or compiler. The path control signal Spc may be generated according to the characteristics of calculation tasks. Alternatively, the path control signal Spc may be generated by an input received from a user. That is, the user may directly apply an input to the path control signal Spc in order to select the most optimal memory composition ratio.

The bank controller Bc may determine a path along which the data stored in the cell array Ca are transmitted and received via the path control signal Spc. The exchange interface of data may be changed as the bank controller Bc determines the path along which the data are transmitted and received. That is, a first interface may be used when the bank controller Bc exchanges data with the first path unit P1, and a second interface may be used when the bank controller Bc exchanges data with the second path unit P2. In this case, the first interface and the second interface may be different from each other.

Further, address systems in which data are stored may vary as well. In other words, if a particular interface is selected, then read and write operations may be performed in an address system corresponding thereto.

The bank controller Bc may operate at a particular clock frequency. For example, if the cell array Ca is an SRAM cell array, the bank controller Bc may operate at the operating clock frequency of a general SRAM.

The first path unit P1 may be connected to the bank controller Bc. The first path unit P1 may directly exchange the data of the cell array Ca with the first processing unit 100a. In this case, "directly" may mean being exchanged with each other without going through the global interconnection 5000. In other words, the first processing unit 100a may exchange data directly with the first L0 memory 120a, and the first processing unit 100a may exchange data via the first path unit P1 when the shared memory 2000 is implemented logically in the L0 memory type. The first path unit P1 may include L0 memory controllers including the first L0 memory controller 122_1a and the second L0 memory controller 122_1b of FIG. 32.

The first path unit P1 may form a multi-cycle sync-path. That is, the operating clock frequency of the first path unit P1 may be the same as the operating clock frequency of the first processing unit 100a. The first L0 memory 120a may quickly exchange data at the same clock frequency as the operating clock frequency of the first processing unit 100a in order to quickly exchange data at the same speed as the operation of the first processing unit 100a. Likewise, the first path unit P1 may also operate at the same clock frequency as the operating clock frequency of the first processing unit 100a.

At this time, the operating clock frequency of the first path unit P1 may be multiples of the operating clock frequency of the bank controller Bc. In this case, a clock domain crossing (CDC) operation for synchronizing the clocks between the bank controller Bc and the first path unit P1 is not needed separately, and thus, a delay of data transmission may not occur. Accordingly, faster and more efficient data exchange can be possible.

In FIG. 33, the operating clock frequency of the first path unit P1 may be 1.5 GHz as an example. This may be twice the frequency of 750 MHz of the bank controller Bc. However, the present embodiment is not limited thereto, and any may be possible as long as the first path unit P1 operates at integer multiples of the clock frequency of the bank controller Bc.

The second path unit P2 may be connected to the bank controller Bc. The second path unit P2 may exchange the data of the cell array Ca with the first processing unit 100a not directly but via the global interconnection 5000. In other words, the first processing unit 100a may exchange data with the cell array Ca via the global interconnection 5000 and the second path unit P2. In this case, the cell array Ca may exchange data not just with the first processing unit 100a but also with other neural cores.

That is, the second path unit P2 may be a data exchange path between the cell array Ca and all the neural cores when the first memory bank 2110a is implemented logically in the global memory type. The second path unit P2 may include the global controller 2200 of FIG. 32.

The second path unit P2 may form an Async-Path. The operating clock frequency of the second path unit P2 may be the same as the operating clock frequency of the global interconnection 5000. Likewise, the second path unit P2 may also operate at the same clock frequency as the operating clock frequency of the global interconnection 5000.

At this time, the operating clock frequency of the second path unit P2 may not be synchronized with the operating clock frequency of the bank controller Bc. In this case, the clock domain crossing (CDC) operation for synchronizing the clocks between the bank controller Bc and the second path unit P2 may be necessary. If the operating clock frequency of the bank controller Bc and the operating clock frequency of the second path unit P2 are not synchronized with each other, the degree of freedom in the design of the clock domain may be increased. Therefore, the difficulty of hardware design is decreased, thereby making it possible to more easily derive the hardware operation.

The bank controller Bc may use different address systems in the case of exchanging data via the first path unit P1 and in the case of exchanging data via the second path unit P2. In other words, the bank controller Bc may use a first address system if via the first path unit P1 and a second address system if via the second path unit P2. In this case, the first address system and the second address system may be different from each other.

The bank controller Bc does not necessarily have to be present for each memory bank. In other words, the bank controller Bc is not a part for scheduling but serves to transmit signals, and thus, is not an essential part for each memory bank having two ports. Therefore, one bank controller Bc can control multiple memory banks. The multiple memory banks may operate independently even if they are controlled by the bank controller Bc. However, the present embodiment is not limited thereto.

As a matter of course, the bank controller Bc may be present for each memory bank. In this case, the bank controller Bc may control each memory bank individually.

With reference to FIG. 32 and FIG. 33, if the first memory unit 210a exchanges data via the first path unit P1, the first address system may be used, and if the first memory unit 210a exchanges data via the second path unit P2, the second address system may be used. Likewise, if the second memory unit 210b exchanges data via the first path unit P1, a third address system may be used, and if the second memory unit 210b exchanges data via the second path unit P2, the second address system may be used. In this case, the first address system and the third address system may be the same as each other. However, the present embodiment is not limited thereto.

The first address system and the third address system may each be used exclusively for the first processing unit 100a and the second processing unit 100b, respectively. The second address system may be commonly applied to the first processing unit 100a and the second processing unit 100b.

In FIG. 33, the operating clock frequency of the second path unit P2 may operate at 1 GHz as an example. This may be a frequency that is not synchronized with the operating clock frequency of 750 MHz of the bank controller Bc. In other words, the operating clock frequency of the second path unit P2 may be freely set without being dependent on the operating clock frequency of the bank controller Bc at all.

A generic global memory has used slow SRAM (e.g., 750 MHz) and a global interconnection (e.g., 1 GHz) faster than that, inevitably resulting in delays due to the CDC operation. On the contrary, the shared memory 2000 in accordance with some embodiments of the present disclosure has room to use the first path unit P1 in addition to the second path unit P2, thereby making it possible to avoid delays resulting from the CDC operation.

Furthermore, in the generic global memory, a plurality of neural cores use one global interconnection 5000, and thus, when an amount of data transfer occurs at the same time, the decrease in the overall processing speed is likely to occur. On the contrary, the shared memory 2000 in accordance with some embodiments of the present disclosure has room to use the first path unit P1 in addition to the second path unit P2, thereby making it possible to achieve the effect of properly distributing the data throughput that could be concentrated on the global controller 2200 as well.

Figure 34:
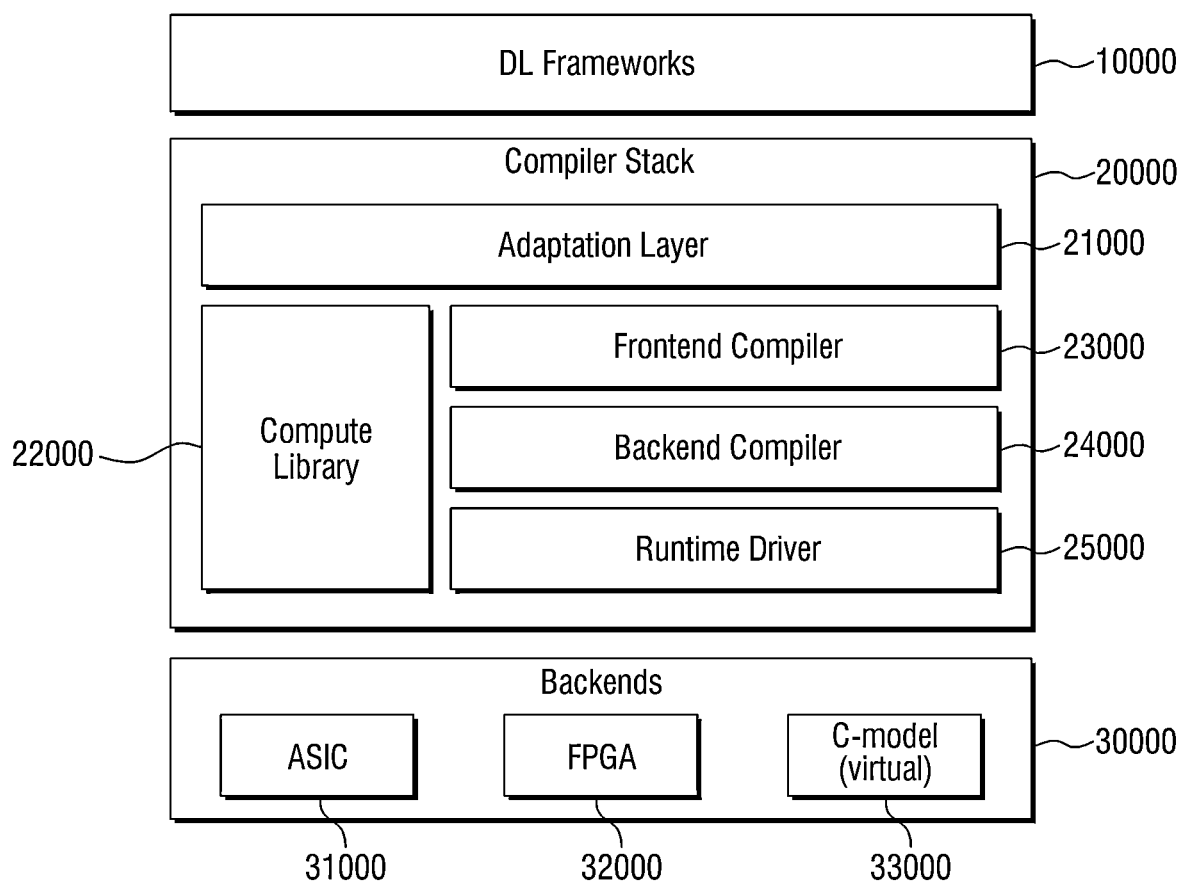
FIG. 34 is a block diagram for illustrating a software hierarchy of a neural processing device in accordance with some embodiments of the present disclosure.

FIG. 34 is a block diagram for illustrating a software hierarchy of a neural processing device in accordance with some embodiments of the present disclosure.

With reference to FIG. 34, the software hierarchy of the neural processing device in accordance with some embodiments of the present disclosure may include a DL framework 10000, a compiler stack 20000, and a back-end module 30000.

The DL framework 10000 may mean a framework for a deep learning model network used by a user. For example, a neural network that has finished training may be generated using programs such as TensorFlow or PyTorch.

The compiler stack 20000 may include an adaptation layer 21000, a compute library 22000, a front-end compiler 23000, a back-end compiler 24000, and a runtime driver 25000.

The adaptation layer 21000 may be a layer in contact with the DL framework 10000. The adaptation layer 21000 may quantize a neural network model of a user generated by the DL framework 10000 and modify graphs. Moreover, the adaptation layer 21000 may convert the type of model into a required type.

The front-end compiler 23000 may convert various neural network models and graphs transferred from the adaptation layer 21000 into a certain intermediate representation IR. The converted IR may be a predetermined representation that is easy to handle later by the back-end compiler 24000.

The optimization that can be carried out in advance in the graph level may be performed on such an IR of the front-end compiler 23000. In addition, the front-end compiler 23000 may finally generate the IR via the task of converting it into a layout optimized for hardware.

The back-end compiler 24000 optimizes the IR converted by the front-end compiler 23000 and converts it into a binary file, enabling it to be used by the runtime driver. The back-end compiler 24000 may generate an optimized code by dividing a job in a scale that fits the details of hardware.

The compute library 22000 may store template operations designed in a form suitable for hardware among various operations. The compute library 22000 provides the back-end compiler 24000 with multiple template operations required by hardware, enabling the optimized code to be generated.

The runtime driver 25000 may continuously perform monitoring during driving, thereby making it possible to drive the neural network device in accordance with some embodiments of the present disclosure. Specifically, it may be responsible for the execution of an interface of the neural network device.

The back-end module 30000 may include an ASIC (application-specific integrated circuit) 31000, an FPGA (field-programmable gate array) 32000, and a C-model 33000. The ASIC 31000 may refer to a hardware chip determined according to a predetermined design method. The FPGA 32000 may be a programmable hardware chip. The C-model 33000 may refer to a model implemented by simulating hardware on software.

The back-end module 30000 may perform various tasks and derive results by using the binary code generated via the compiler stack 20000.

Figure 35:
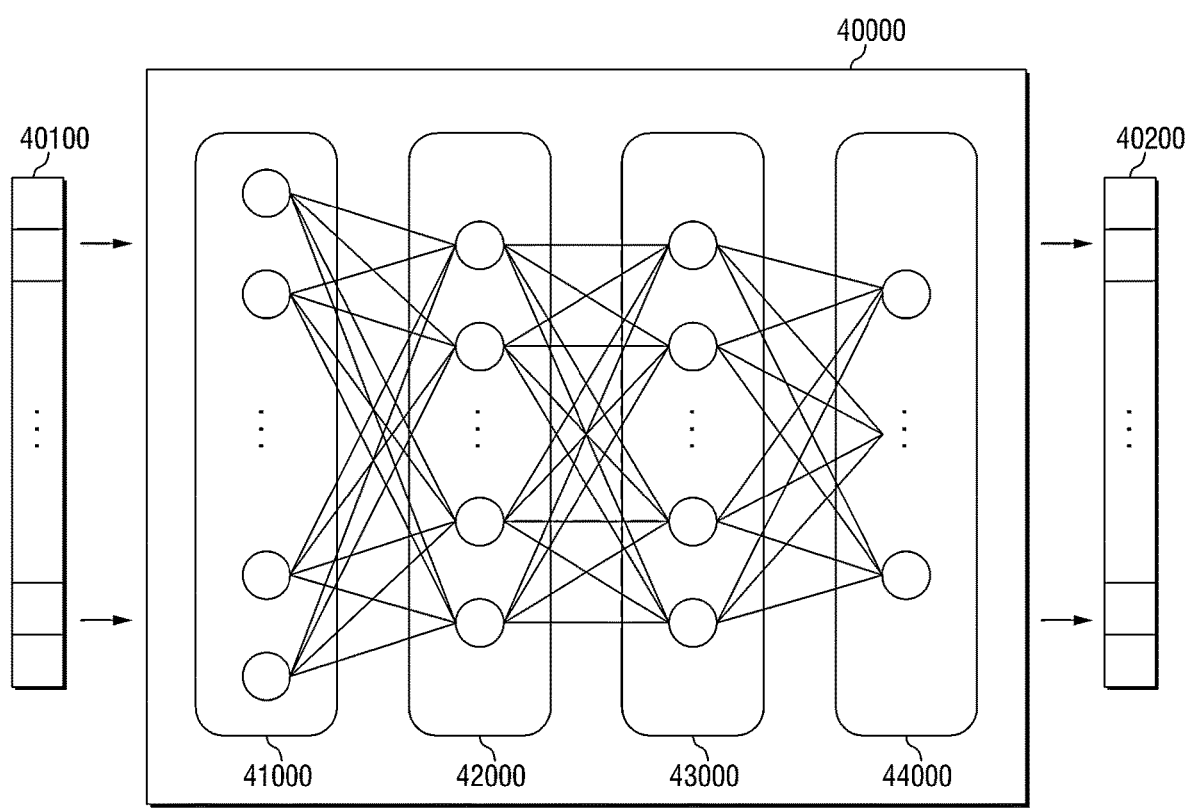
FIG. 35 is a conceptual diagram for illustrating deep learning calculations performed by a neural processing device in accordance with some embodiments of the present disclosure.

FIG. 35 is a conceptual diagram for illustrating deep learning calculations performed by a neural processing device in accordance with some embodiments of the present disclosure.

With reference to FIG. 35, an artificial neural network model 40000 is one example of a machine learning model, and is a statistical learning algorithm implemented based on the structure of a biological neural network or is a structure for executing the algorithm, in machine learning technology and cognitive science.

The artificial neural network model 40000 may represent a machine learning model having an ability to solve problems by learning to reduce the error between an accurate output and an inferred output corresponding to a particular input by repeatedly adjusting the weight of the synapse by nodes, which are artificial neurons that have formed a network by combining synapses, as in a biological neural network. For example, the artificial neural network model 40000 may include any probabilistic model, neural network model, etc., used in artificial intelligence learning methods such as machine learning and deep learning.

A neural processing device in accordance with some embodiments of the present disclosure may implement the form of such an artificial neural network model 40000 and perform calculations. For example, the artificial neural network model 40000 may receive an input image, and may output information on at least a part of an object included in the input image.

The artificial neural network model 40000 is implemented by a multilayer perceptron (MLP) consisting of multilayer nodes and connections between them. An artificial neural network model 40000 in accordance with the present embodiment may be implemented using one of various artificial neural network model structures including the MLP. As shown in FIG. 35, the artificial neural network model 40000 consists of an input layer 41000 that receives input signals or data 40100 from the outside, an output layer 44000 that outputs output signals or data 40200 corresponding to the input data, and n (where n is a positive integer) hidden layers 42000 to 43000 that are located between the input layer 41000 and the output layer 44000 and that receive a signal from the input layer 41000, extract characteristics, and transmit them to the output layer 44000. Here, the output layer 44000 receives signals from the hidden layers 42000 to 43000 and outputs them to the outside.

The learning methods of the artificial neural network model 40000 include a supervised learning method for training to be optimized to solve a problem by the input of teacher signals (correct answers), and an unsupervised learning method that does not require teacher signals.

The neural processing device may directly generate training data, through simulations, for training the artificial neural network model 40000. In this way, by matching a plurality of input variables and a plurality of output variables corresponding thereto with the input layer 41000 and the output layer 44000 of the artificial neural network model 40000, respectively, and adjusting the synaptic values between the nodes included in the input layer 41000, the hidden layers 42000 to 43000, and the output layer 44000, training may be made to enable a correct output corresponding to a particular input to be extracted. Through such a training phase, it is possible to identify the characteristics hidden in the input variables of the artificial neural network model 40000, and to adjust synaptic values (or weights) between the nodes of the artificial neural network model 40000 so that an error between an output variable calculated based on an input variable and a target output is reduced.

Figure 36:
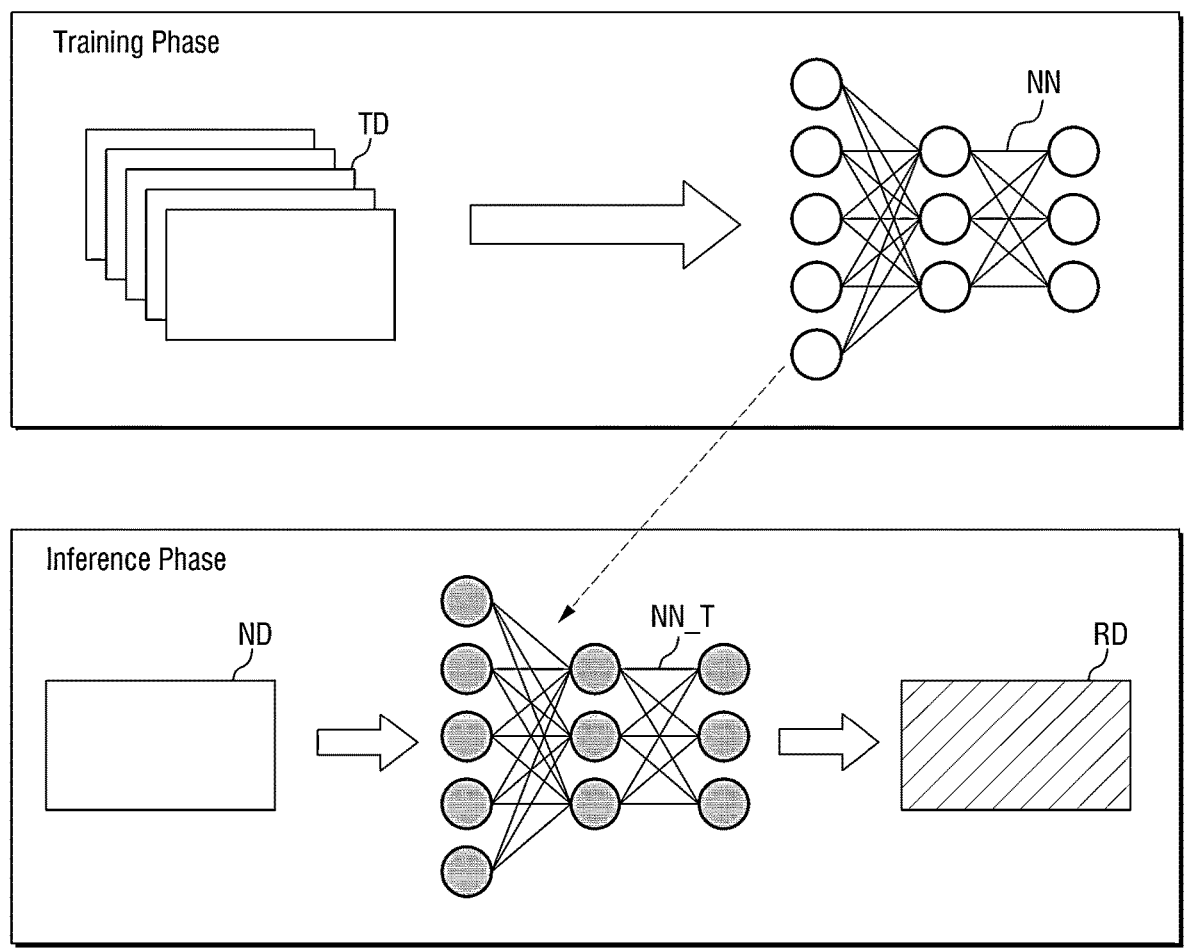
FIG. 36 is a conceptual diagram for illustrating training and inference operations of a neural network of a neural processing device in accordance with some embodiments of the present disclosure.

FIG. 36 is a conceptual diagram for illustrating training and inference operations of a neural network of a neural processing device in accordance with some embodiments of the present disclosure.

Referring to FIG. 36, the training phase may be subjected to a process in which a large number of pieces of training data TD are passed forward to the artificial neural network model NN and are passed backward again. Through this, the weights and biases of each node of the artificial neural network model NN are tuned, and training may be performed so that more and more accurate results can be derived through this. Through the training phase as such, the artificial neural network model NN may be converted into a trained neural network model NN_T.

In the inference phase, new data ND may be inputted into the trained neural network model NN_T again. The trained neural network model NN_T may derive result data RD through the weights and biases that have already been used in the training, with the new data ND as input. For such result data RD, it may be important what training data TD were used in training and how many pieces of training data TD were used, in the training phase.

FIG. 37 is a diagram illustrating a method of performing a multiplication operation by using a processing element, according to some embodiments of the present disclosure. For the sake of convenience of description, contents identical to or similar to the contents described above are omitted or simply described.

Referring to FIGS. 11 and 37, the path determination unit PDU may receive the weight Weight and the input activation Act_In. In addition, the path determination unit PDU may receive the calculation mode signal Mode (S100).

A plurality of divided weights D_W may be generated by dividing the weight Weight (S110). According to some embodiments, the path determination unit PDU may generate the plurality of divided weights D_W by dividing the weight Weight in units of the first precision Pr1. For example, when the weight is 32-bit data, the path determination unit PDU may divide the weight Weight into 4-bit units to generate 8 divided weights D_W.

In addition, the plurality of divided input activations D_A may be generated by dividing the input activation Act_In (S120). According to some embodiments, the path determination unit PDU may generate the plurality of divided input activations D_A by dividing the input activation Act_In in units of the first precision Pr1. For example, when the input activation Act_In is 32-bit data, the path determination unit PDU may divide the input activation Act_In into 4-bit units to generate 8 divided input activations D_A.

A multiplier to which the plurality of divided weights D_W and the plurality of divided input activations D_A are to be provided may be determined in response to the calculation mode signal Mode (S130). According to some embodiments, when the calculation mode signal Mode is the first mode signal Mode(Pr1), the path determination unit PDU may generate the first path determination signal PD1 and provide the generated first path determination signal PD1 to the demultiplexer Dx. The demultiplexer Dx may provide the plurality of divided weights D_W and the plurality of divided input activations D_A to the first multiplier Mul1 in response to the first path determination signal PD1. If the calculation mode signal Mode is the second mode signal Mode(Pr2), the path determination unit PDU may generate the second path determination signal PD2 and provide the generated second path determination signal PD2 to the demultiplexer Dx. The demultiplexer Dx may provide some of the plurality of divided weights D_W and the plurality of divided input activations D_A to the first multiplexer Mul1 in response to the second path determination signal PD2 and provide the others thereof to the second multiplexer Mul2.

A plurality of partial multiplication groups may be generated by calculating the plurality of divided weights D_W and the plurality of divided input activations D_A (S140). According to some embodiments, the first multiplier Mul1 and/or the second multiplier Mul2 may generate the plurality of partial multiplication groups by calculating the plurality of divided weights D_W and the plurality of divided input activations D_A.

When the calculation mode signal Mode is the first mode signal Mode(Pr1) (S150, Y), first result data may be generated by using the plurality of partial multiplication groups (S160). According to some embodiments, the first booth reduction tree BRT1 may generate a plurality of modified partial multiplication groups by reducing depths of the plurality of partial multiplication groups and may generate the first result data by performing an addition operation on the plurality of modified partial multiplication groups.

When the calculation mode signal Mode is the second mode signal Mode(Pr2) (S150, N), a plurality of aligned partial multiplication groups may be generated by aligning the plurality of partial multiplication groups (S170). According to some embodiments, the aligner ALNR may generate the plurality of aligned partial multiplication groups by performing alignment based on digits of the plurality of partial multiplication groups.

Next, first result data and second result data may be generated by performing independent calculation on the plurality of aligned partial multiplication groups (S180). According to some embodiments, the aligner ALNR may provide the aligned partial multiplication group having the greatest depth among the plurality of aligned partial multiplication groups to the first booth reduction tree BRT1 and provide the other aligned partial multiplication groups to the second booth reduction tree BRT2. The first booth reduction tree BRT1 and the second booth reduction tree BRT2 may respectively generate the first result data and the second result data by performing parallel and independent calculations.

The above description is merely illustrative of the technical idea of the present embodiments, and various modifications and changes may be made without departing from the essential characteristics of the present embodiments by those skilled in the art to which this embodiments belong. Accordingly, the present embodiments are intended to describe rather than limit the technical idea of the present embodiments, and the scope of the technical idea of the present embodiments is not limited thereto. The protection scope of the present embodiments should be interpreted according to the following claims, and all technical ideas within the scope equivalent thereto should be interpreted as being included in the scope of the present embodiments.

What is claimed is:

1. A processing element, included in a neural processor, the processing element, comprises:
    a weight register configured to store a weight;
    an input activation register configured to store input activation;
    a flexible multiplier, comprising:
        a first multiplier of a first precision;
        a second multiplier of the first precision; and
        digit aligning circuit, configured to generate result data by performing a multiplication operation of the weight and the input activation by using the first multiplier or using both the first multiplier and the second multiplier in response to a calculation mode signal,
    wherein the first multiplier generates a first partial multiplication group using the multiplication operation of the weight and the input activation wherein the first partial multiplication has a first digit, the second multiplier generates a second partial multiplication group using the multiplication operation of the weight and the input activation wherein the second partial multiplication has a second digit different from the first digit, the second multiplier generates a third partial multiplication group that has the first digit, and the digit aligning circuit generates a first aligned partial multiplication group including the first partial multiplication group and the third partial multiplication group and a second aligned partial multiplication group including the second partial multiplication group when the calculation mode is a first mode signal associated with a second precision greater than the first precision; and
    a saturating adder configured to generate a partial sum by using the result data.

2. The processing element of claim 1, wherein the flexible multiplier performs the multiplication operation of the weight and the input activation by using the first multiplier when the calculation mode signal is a second mode signal associated with the first precision.

3. The processing element of claim 1,
    wherein the flexible multiplier further comprises:
        a first booth reduction tree configured to calculate the first aligned partial multiplication group and a second booth reduction tree configured to calculate the second aligned partial multiplication group, and
    wherein a depth of the first aligned partial multiplication group is greater than a depth of the second aligned partial multiplication group.

4. The processing element of claim 1,
    wherein the flexible multiplier further comprises:
        a first booth reduction tree configured to calculate the first aligned partial multiplication group and a second booth reduction tree configured to calculate the second aligned partial multiplication group, and
    wherein a calculable depth of the first booth reduction tree is greater than a calculable depth of the second booth reduction tree.

5. The processing element of claim 1, wherein the flexible multiplier further comprises:
    one first booth reduction tree configured to calculate the first aligned partial multiplication group and a plurality of second booth reduction trees configured to calculate the second aligned partial multiplication group.

6. The processing element of claim 1, wherein, when the weight and the input activation are each 32-bit data, the first precision is INT4, and the second precision is INT8, the flexible multiplier further comprises:
    one first booth reduction tree that calculates the first aligned partial multiplication group and four second booth reduction trees that calculate the second aligned partial multiplication group.

7. The processing element of claim 1,
    wherein the flexible multiplier further comprises:
        a booth reduction tree that generates the result data by using partial multiplication groups generated by the first multiplier and the second multiplier.

8. The processing element of claim 7,
    wherein the booth reduction tree comprises:
        a depth reducer that reduces depths of the partial multiplication groups and an adder that performs an additional operation of the partial multiplication groups of which depths are greatly reduced by the depth reducer.

9. The processing element of claim 1, wherein each of the first multiplier and the second multiplier is composed of k multipliers.

10. The processing element of claim 9, wherein k is 8 if the weight and the input activation are each 32-bit data, the first precision is INT4, and the second precision is INT8.

11. The processing element of claim 1,
    wherein the flexible multiplier further comprises:
        a first booth reduction tree that calculates the first aligned partial multiplication group;
        a second booth reduction tree that calculates the second aligned partial multiplication group; and a pre-adder that performs an additional operation on an operation result of the second booth reduction tree, and wherein a calculation result of the first booth reduction tree and a calculation result of the pre-adder are provided to the saturating adder.

12. The processing element of claim 1, wherein the flexible multiplier further comprises:
a weight/input activation bit division circuit that generates a first divided weight of the first precision by using the weight and generates a first divided input activation of the first precision by using the input activation.

13. The processing element of claim 12, wherein, when the calculation mode signal is a second mode signal associated with the first precision, the first multiplier generates the result data by using the first divided weight and the first divided input activation.

14. The processing element of claim 12, wherein, when the calculation mode signal is the first mode signal, the weight/input activation bit division circuit generates a first high-order divided weight and a first low-order divided weight by using the first divided weight, and generates a first high-order divided input activation and a first low-order divided input activation by using the first divided input activation.

15. The processing element of claim 14, wherein the first low-order divided weight and the first low-order divided input activation each comprise an extra bit for having a positive value.

16. A neural processing device, comprising:
at least one neural core, comprising:
a processing unit that performs calculations and a L0 memory for storing input/output data of the processing unit,
wherein the processing unit comprises a processing element (PE) array including at least one processing element, and
wherein the PE array comprises a flexible multiplier that:
receives a weight and an input activation,
generates a first partial multiplication group having a first digit and a second partial multiplication group having a second digit different from the first digit using a multiplication operation of a first weight included in the weight and a first input activation included in the input activation by a first multiplier of a first precision,
generates a third partial multiplication group having the first digit using a multiplication operation of a second weight included in the weight and a second input activation included in the input activation by a second multiplier of the first precision,
generates a first aligned partial multiplication group, including the first partial multiplication group and the third partial multiplication group, by using a digit aligning circuit,
generates a second aligned partial multiplication group, including the second partial multiplication group, by using the digit aligning circuit when a calculation mode is a first mode signal associated with a second precision greater than the first precision, and
generates result data by using the first aligned partial multiplication group and the second aligned partial multiplication group; and
a saturating adder that receives the result data and generates a partial sum.

17. The neural processing device of claim 16, wherein the flexible multiplier generates the result data by performing an addition operation of the first aligned partial multiplication group and the second aligned partial multiplication group by using a Booth algorithm.

18. The neural processing device of claim 16, wherein the digit aligning circuit generates the first aligned partial multiplication group based on digits of the first and the second partial multiplication group, and the digit aligning circuit generates the second aligned partial multiplication group based on digits of the third partial multiplication group.

19. A multiplication operation method, which is performed by a neural processor, comprising:
receiving a weight, an input activation, and a calculation mode signal at a flexible multiplier of the neural processor;
generating a plurality of divided weights by using the weight;
generating a plurality of divided input activations by using the input activation;
determining a multiplier to which the plurality of divided weights and the plurality of divided input activations are to be provided in response to the calculation mode signal;
generating a first partial multiplication group having a first digit and a second partial multiplication group having a second digit different from the first digit by performing a multiplication operation of a first divided weight and a first divided input activation using a first multiplier;
generating a third partial multiplication group having the first digit by performing a multiplication operation of a second divided weight and a second divided input activation using a second multiplier;
generating a first aligned partial multiplication group including the first partial multiplication group and the third partial multiplication group, and a second aligned partial multiplication group including the second partial multiplication group, based on digits of the first partial multiplication group through the third partial multiplication group by using a digit aligning circuit; and
generating result data by independently calculating the first aligned partial multiplication group and the second aligned partial multiplication group.

* * * * *